(12) United States Patent
Shirakawa et al.

(10) Patent No.: US 11,347,584 B2
(45) Date of Patent: May 31, 2022

(54) MEMORY SYSTEM

(71) Applicant: Kioxia Corporation, Minato-ku (JP)

(72) Inventors: Masanobu Shirakawa, Chigasaki (JP); Hideki Yamada, Yokohama (JP); Marie Takada, Yokohama (JP); Ryo Yamaki, Yokohama (JP); Osamu Torii, Minato (JP); Naomi Takeda, Yokohama (JP)

(73) Assignee: Kioxia Corporation, Minato-ku (JP)

(*) Notice: Subject to any disclaimer, the term of this patent is extended or adjusted under 35 U.S.C. 154(b) by 207 days.

(21) Appl. No.: 16/807,220

(22) Filed: Mar. 3, 2020

(65) Prior Publication Data
US 2021/0089392 A1 Mar. 25, 2021

(30) Foreign Application Priority Data

Sep. 19, 2019 (JP) .................... JP2019-170436

(51) Int. Cl.
| G06F 11/10 | (2006.01) |
| G06F 13/28 | (2006.01) |
| G06F 11/30 | (2006.01) |
| G06F 11/16 | (2006.01) |
| G06F 3/06  | (2006.01) |
| G06F 9/30  | (2018.01) |

(52) U.S. Cl.
CPC ...... *G06F 11/1068* (2013.01); *G06F 9/30134* (2013.01)

(58) Field of Classification Search
CPC ............ G06F 11/1012; G06F 11/1068; G06F 9/30134; G06F 12/1009
See application file for complete search history.

(56) References Cited

U.S. PATENT DOCUMENTS

| 2004/0205442 | A1* | 10/2004 | Chuang .............. G11B 20/1833 714/784 |
| 2016/0224242 | A1  | 8/2016  | Kondo et al. |
| 2019/0312600 | A1* | 10/2019 | Khayat ............. H03M 13/1575 |
| 2020/0089567 | A1* | 3/2020  | Takeda ................ G06F 11/1068 |
| 2020/0293400 | A1* | 9/2020  | Steiner ................ G06F 11/1048 |
| 2021/0294527 | A1* | 9/2021  | Aiba ..................... G06F 3/0659 |

FOREIGN PATENT DOCUMENTS

| JP | 2016-143432 A | 8/2016 |
| JP | 2020-46916 A  | 3/2020 |

* cited by examiner

*Primary Examiner* — Guy J Lamarre
(74) *Attorney, Agent, or Firm* — Oblon, McClelland, Maier & Neustadt, L.L.P.

(57) ABSTRACT

A memory system controls a shift register memory and writes encoded data including a plurality of error correction code frames into a block of the shift register memory. The memory system is configured to store, into a location corresponding to a first layer in a first data storing shift string, first data included in a first error correction code frame, to store, into a location corresponding to a second layer in the first data storing shift string, second data included in a second error correction code frame, and to store, into a location corresponding to the second layer in a second data storing shift string, third data included in the first error correction code frame.

14 Claims, 40 Drawing Sheets

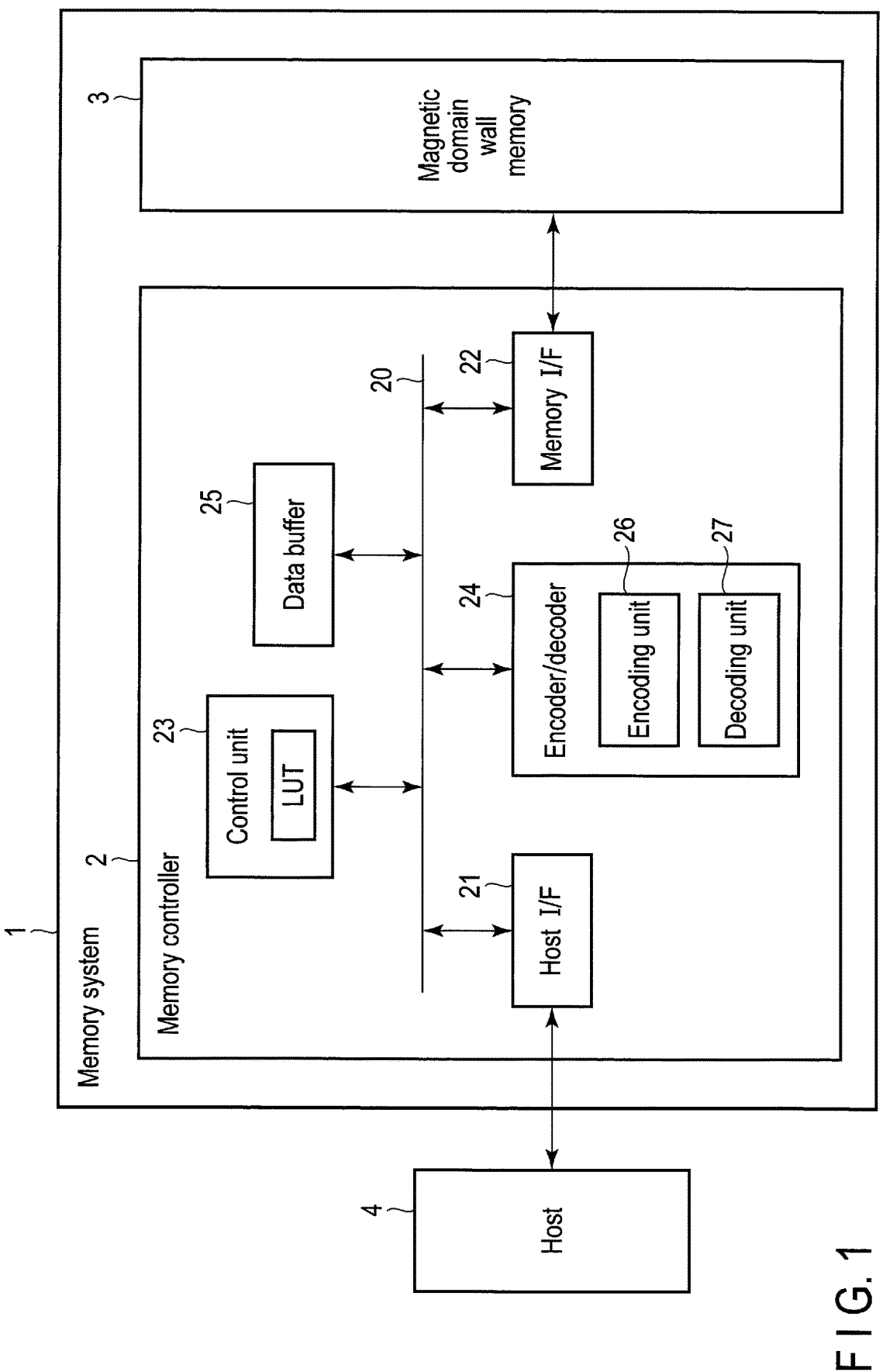
F I G. 1

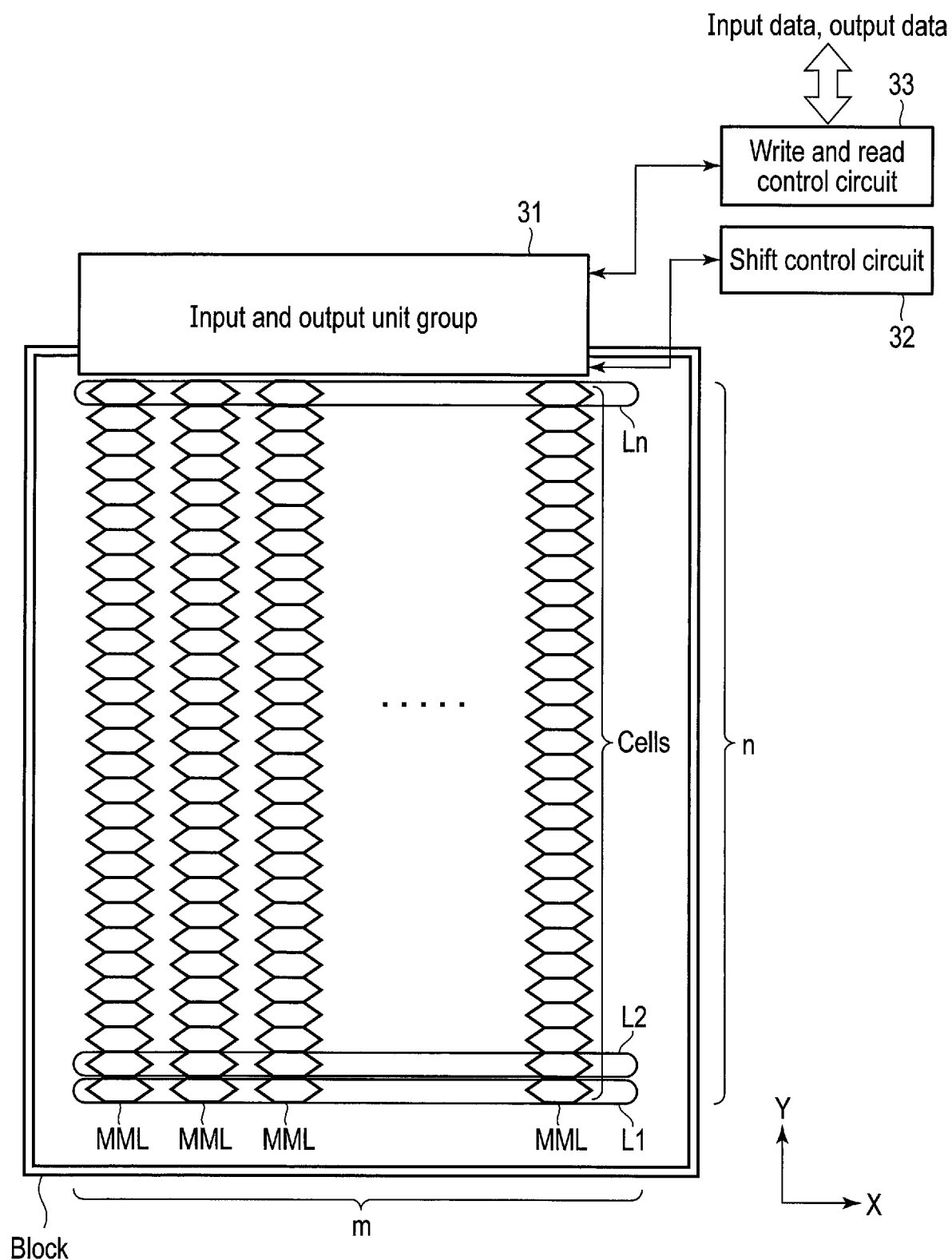
F I G. 3

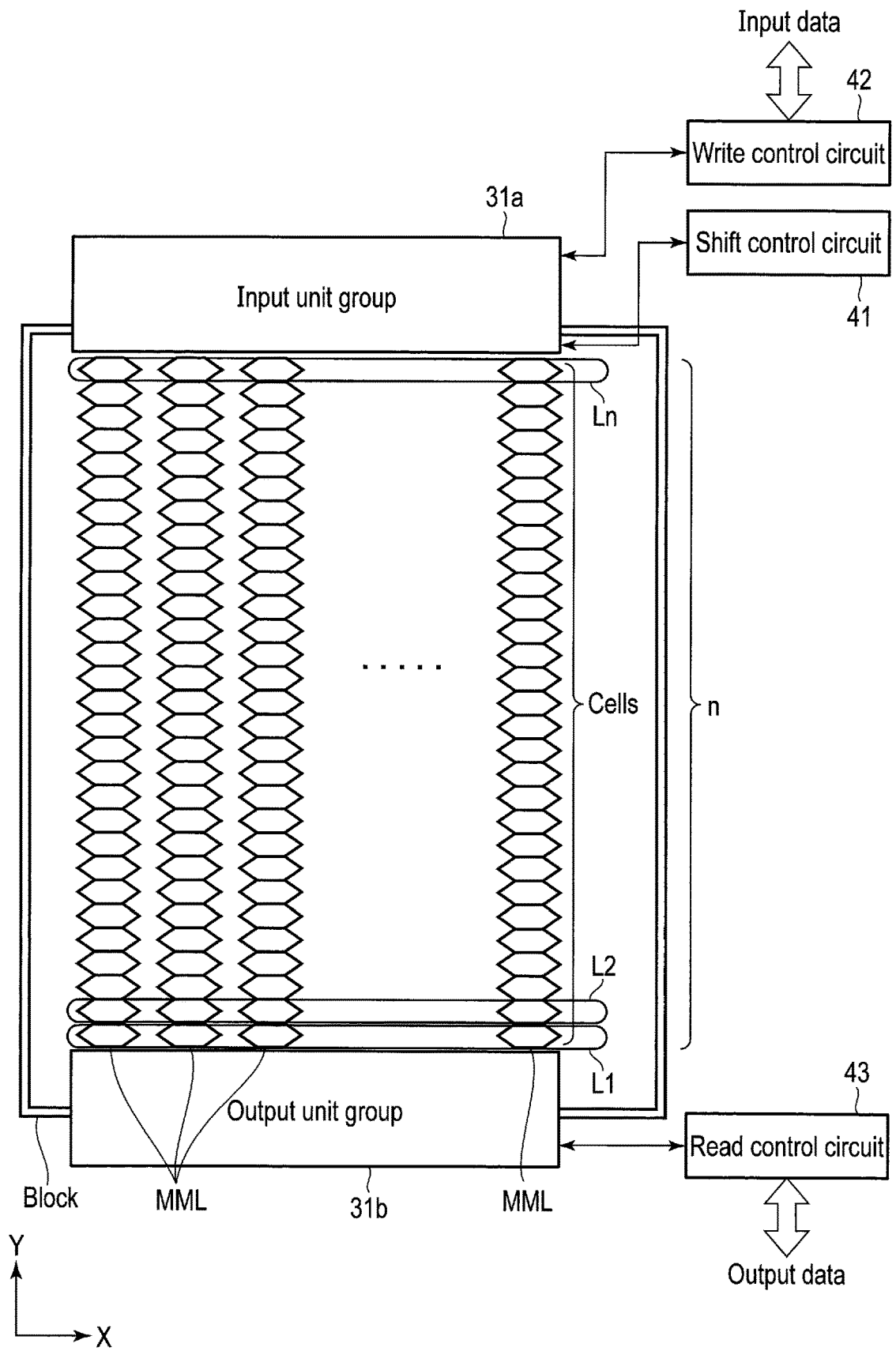
F I G. 4

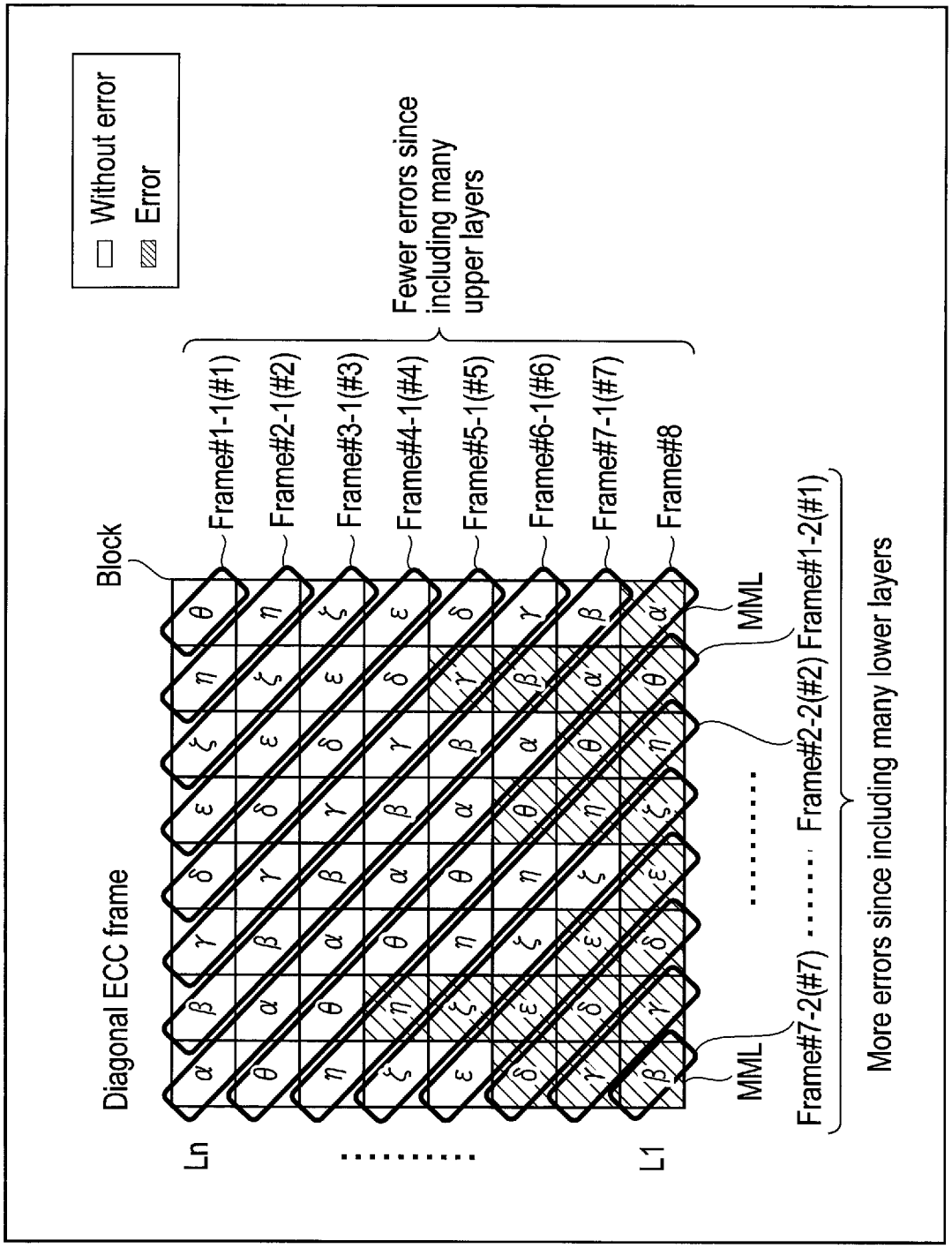
F I G. 10

Physical arrangement of product code (A)

| MML | 1 | 2 | 3 | 4 | 5 | 6 | 7 | 8 | 9 |
|---|---|---|---|---|---|---|---|---|---|
| L9 | a | b | c | d | e | f | g | h | P |
| L8 | P | a | b | c | d | e | f | g | h |
| L7 | h | P | a | b | c | d | e | f | g |
| L6 | g | h | P | a | b | c | d | e | f |
| L5 | f | g | h | P | a | b | c | d | e |
| L4 | e | f | g | h | P | a | b | c | d |
| L3 | d | e | f | g | h | P | a | b | c |
| L2 | c | d | e | f | g | h | P | a | b |
| L1 | b | c | d | e | f | g | h | P | a |

Frame#2-2(#2), Frame#2-1(#2), Frame#1

Physical arrangement of product code (B)

| MML | 1 | 2 | 3 | 4 | 5 | 6 | 7 | 8 | 9 |
|---|---|---|---|---|---|---|---|---|---|
| L9 | a2 | b3 | c4 | d5 | e6 | f7 | g8 | h9 | P1 |
| L8 | P3 | a4 | b5 | c6 | d7 | e8 | f9 | g1 | h2 |
| L7 | h4 | P5 | a6 | b7 | c8 | d9 | e1 | f2 | g3 |
| L6 | g5 | h6 | P7 | a8 | b9 | c1 | d2 | e3 | f4 |
| L5 | f6 | g7 | h8 | P9 | a1 | b2 | c3 | d4 | e5 |
| L4 | e7 | f8 | g9 | h1 | P2 | a3 | b4 | c5 | d6 |
| L3 | d8 | e9 | f1 | g2 | h3 | P4 | a5 | b6 | c7 |
| L2 | c9 | d1 | e2 | f3 | g4 | h5 | P6 | a7 | b8 |
| L1 | b1 | c2 | d3 | e4 | f5 | g6 | h7 | P8 | a9 |

Frame#8'-2(#8'), Frame#8'-1(#8'), Frame#9'

Physical arrangement of product code

| MML | 1 | 2 | 3 | 4 | 5 | 6 | 7 | 8 | 9 |
|---|---|---|---|---|---|---|---|---|---|
| L9 | a2 | b3 | c4 | d5 | e6 | f7 | g8 | h9 | P1 |
| L8 | P3 | a4 | b5 | c6 | d7 | e8 | f9 | g1 | h2 |
| L7 | h4 | P5 | a6 | b7 | c8 | d9 | e1 | f2 | g3 |
| L6 | g5 | h6 | P7 | a8 | b9 | c1 | d2 | e3 | f4 |
| L5 | f6 | g7 | h8 | P9 | a1 | b2 | c3 | d4 | e5 |
| L4 | e7 | f8 | g9 | h1 | P2 | a3 | b4 | c5 | d6 |
| L3 | d8 | e9 | f1 | g2 | h3 | P4 | a5 | b6 | c7 |
| L2 | c9 | d1 | e2 | f3 | g4 | h5 | P6 | a7 | b8 |
| L1 | b1 | c2 | d3 | e4 | f5 | g6 | h7 | P8 | a9 |

(B)

Physical arrangement of product code

| MML | 1 | 2 | 3 | 4 | 5 | 6 | 7 | 8 | 9 |
|---|---|---|---|---|---|---|---|---|---|
| L9 | a2 | b3 | c4 | d5 | e6 | f7 | g8 | h9 | P1 |
| L8 | P3 | a4 | b5 | c6 | d7 | e8 | f9 | g1 | h2 |
| L7 | h4 | P5 | a6 | b7 | c8 | d9 | e1 | f2 | g3 |
| L6 | g5 | h6 | P7 | a8 | b9 | c1 | d2 | e3 | f4 |
| L5 | f6 | g7 | h8 | P9 | a1 | b2 | c3 | d4 | e5 |
| L4 | e7 | f8 | g9 | h1 | P2 | a3 | b4 | c5 | d6 |
| L3 | d8 | e9 | f1 | g2 | h3 | P4 | a5 | b6 | c7 |
| L2 | c9 | d1 | e2 | f3 | g4 | h5 | P6 | a7 | b8 |
| L1 | b1 | c2 | d3 | e4 | f5 | g6 | h7 | P8 | a9 |

F I G. 35A

(A) Physical arrangement of product code

| MML | 1 | 2 | 3 | 4 | 5 | 6 | 7 | 8 | 9 | |
|---|---|---|---|---|---|---|---|---|---|---|
| L1 | a2 | b3 | c4 | d5 | e6 | f7 | g8 | h9 | i1 | Lowermost layer |
| L2 | i3 | a4 | b5 | c6 | d7 | e8 | f9 | g1 | h2 | |
| L3 | h4 | i5 | a6 | b7 | c8 | d9 | e1 | f2 | g3 | |
| L4 | g5 | h6 | i7 | a8 | b9 | c1 | d2 | e3 | f4 | |
| L5 | f6 | g7 | h8 | i9 | a1 | b2 | c3 | d4 | e5 | |
| L6 | e7 | f8 | g9 | h1 | i2 | a3 | b4 | c5 | d6 | |
| L7 | d8 | e9 | f1 | g2 | h3 | i4 | a5 | b6 | c7 | |
| L8 | 9P | 1P | 2P | 3P | 4P | 5P | 6P | 7P | 8P | |
| L9 | bP | cP | dP | eP | fP | gP | hP | iP | aP | Uppermost layer |

(B) Logical image of product code

| | col. 1 | 2 | 3 | 4 | 5 | 6 | 7 | 8 | 9 |
|---|---|---|---|---|---|---|---|---|---|
| Row1 | a1 | a2 | a3 | a4 | a5 | a6 | 7P | a8 | aP |
| Row2 | bP | b2 | b3 | b4 | b5 | b6 | b7 | 8P | b9 |
| Row3 | c1 | cP | c3 | c4 | c5 | c6 | c7 | c8 | 9P |
| Row4 | 1P | d2 | dP | d4 | d5 | d6 | d7 | d8 | d9 |
| Row5 | e1 | 2P | e3 | e4 | e5 | e6 | e7 | e8 | e9 |
| Row6 | f1 | f2 | 3P | f4 | fP | f6 | f7 | f8 | f9 |
| Row7 | g1 | g2 | g3 | 4P | g5 | gP | g7 | g8 | g8 |
| Row8 | h1 | h2 | h3 | h4 | 5P | h6 | hP | h8 | h9 |
| Row9 | i1 | i2 | i3 | i4 | i5 | 6P | i7 | iP | i9 |

F I G. 35B

Physical arrangement of product code (A)

| MML | 1 | 2 | 3 | 4 | 5 | 6 | 7 |
|---|---|---|---|---|---|---|---|
| L7 | a | b | c | d | e | f | g |
| L6 | g | a | b | c | d | e | f |
| L5 | f | g | a | b | c | d | e |
| L4 | e | f | g | a | b | c | d |
| L3 | d | e | f | g | a | b | c |
| L2 | c | d | e | f | g | a | b |
| L1 | b | c | d | e | f | g | a |

Physical arrangement of product code (B)

| MML | 1 | 2 | 3 | 4 | 5 | 6 | 7 |
|---|---|---|---|---|---|---|---|
| L7 | a2 | b3 | c4 | d5 | e6 | f7 | g1 |
| L6 | g3 | a4 | b5 | c6 | d7 | e1 | f2 |
| L5 | f4 | g5 | a6 | b7 | c1 | d2 | e3 |
| L4 | e5 | f6 | g7 | a1 | b2 | c3 | d4 |
| L3 | d6 | e7 | f1 | g2 | a3 | b4 | c5 |
| L2 | c7 | d1 | e2 | f3 | g4 | a5 | b6 |
| L1 | b1 | c2 | d3 | e4 | f5 | g6 | a7 |

F I G. 36

| (A) | Example 1 | y=0 | y=1 |
|---|---|---|---|
| | x=0 | 9900 | 100 |
| | x=1 | 100 | 9900 |
| | LLR(y) | +4.6 | −4.6 |

| (B) | Example 2 | y=0 | y=1 |
|---|---|---|---|
| | x=0 | 9999 | 1 |
| | x=1 | 1 | 9999 |
| | LLR(y) | +9.2 | −9.2 | a memory system according to a first embodiment.
MEMORY SYSTEM

CROSS-REFERENCE TO RELATED APPLICATIONS

This application is based upon and claims the benefit of priority from Japanese Patent Application No. 2019-170436, filed Sep. 19, 2019, the entire contents of which are incorporated herein by reference.

FIELD

Embodiments described herein relate generally to a technique of controlling a shift register memory.

BACKGROUND

In recent years, memory systems including a nonvolatile memory are widely used. As an example of such memory systems, a solid state drive (SSD) including a NAND flash memory is known.

Recently, shift register memories are developed as a next generation nonvolatile memory. In the shift register memory, improvement of reliability of data stored in the shift register memory is required.

BRIEF DESCRIPTION OF THE DRAWINGS

FIG. 1 is a block diagram illustrating a structural example of a memory system according to a first embodiment.

FIG. 3 is a diagram illustrating a structural example of a last-in first-out type magnetic domain wall memory (LIFO type magnetic domain wall memory).

FIG. 4 is a diagram illustrating a structural example of a first-in first-out type magnetic domain wall memory (FIFO type magnetic domain wall memory).

FIG. 10 is a diagram illustrating a structural example of ECC frames arranged diagonally in the block of the magnetic domain wall memory (diagonal ECC frames), which are used in the memory system of the first embodiment.

FIG. 13 illustrates a structural example of diagonal ECC frames in a case where the block of the magnetic domain wall memory includes 4 MMLs×16 layers.

FIG. 14 illustrates another structural example of diagonal ECC frames in a case where the block of the magnetic domain wall memory includes 4 MMLs×16 layers.

FIG. 15 illustrates two structural examples of diagonal ECC frames in a case where the block of the magnetic domain wall memory includes 16 MMLs×4 layers.

FIG. 25 is a diagram illustrating a structural example of ECC frames (row ECC frames and diagonal ECC frames) of the product code in a case where the block of the magnetic domain wall memory is structured as 4 MMLs×16 layers.

FIG. 27 is a diagram illustrating two types of structural examples of ECC frames (row ECC frames and diagonal ECC frames) of the product code in a case where the block of the magnetic domain wall memory includes a structure of 16 MMLs×4 layers.

FIG. 34 is a diagram illustrating a physical arrangement of two types of diagonal ECC frames orthogonal to each other.

FIG. 35A is a diagram illustrating an example of parity locations of two types of diagonal ECC frames orthogonal to each other.

FIG. 35B is a diagram illustrating another example of parity locations of two types of diagonal ECC frames orthogonal to each other.

FIG. 36 is a diagram illustrating a structural example of two types of diagonal ECC frames orthogonal to each other in a case where the block of the magnetic domain wall memory has a structure of 7 MMLs×7 layers

DETAILED DESCRIPTION

Figure 2:
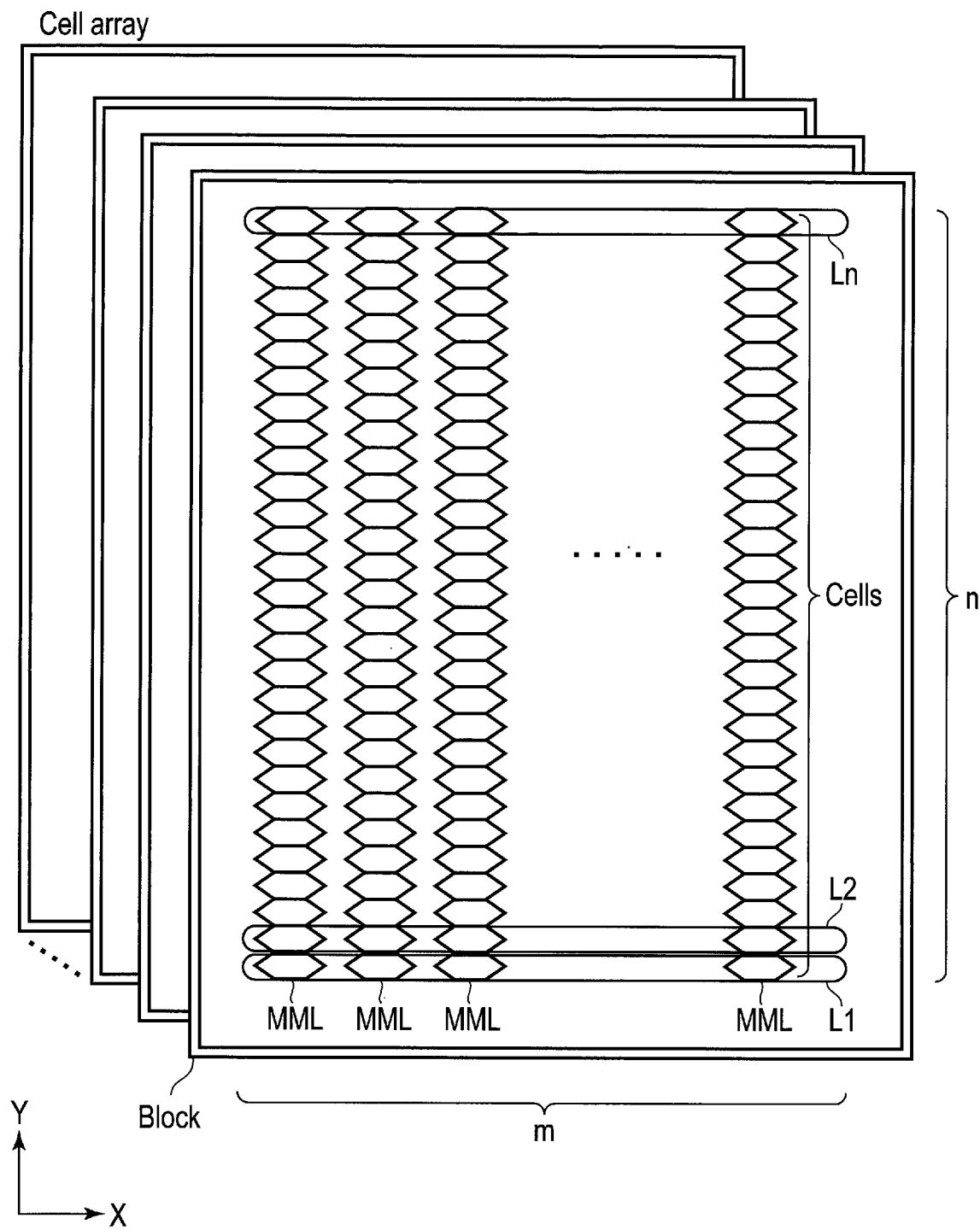
FIG. 2 is a diagram illustrating a structural example of a cell array in a magnetic domain wall memory included in the memory system of the first embodiment.

Various embodiments will be described hereinafter with reference to the accompanying drawings.

In general, according to one embodiment, a memory system includes a shift register memory and a controller. The shift register memory includes a block including a plurality of data storing shift strings each including a plurality of storage portions, The shift register memory is configured to execute a write operation and a read operation in a last-in first-out method (LIFO method) or a first-in first-out method (FIFO method) by shifting data stored in each of a plurality of layers of the block in unit of layer.

The layers are organized by a set of the storage portions included in the data storing shift strings.

The controller is configured to control the shift register memory, to encode data to be written into the block, and to write encoded data into the block, the encoded data including a plurality of error correction code frames each including a codeword.

The controller is configured to store, into a location corresponding to a first layer in a first data storing shift string of the data storing shift strings, first data included in a first error correction code frame of the error correction code frames, to store, into a location corresponding to a second layer in the first data storing shift string, second data included in a second error correction code frame of the error correction code frames, and to store, into a location corresponding to the second layer in a second data storing shift string of the data storing shift string, third data included in the first error correction code frame.

First Embodiment

FIG. 1 illustrates a structural example of a memory system 1 according to a first embodiment. The memory system 1 includes a controller (memory controller) 2 and a magnetic domain wall memory 3. The memory system 1 is connectable to a host 4, and FIG. 1 illustrates that the memory system 1 is connected to the host 4. The host 4 is an electronic device such as a personal computer, a server, a mobile terminal or the like.

The magnetic domain wall memory 3 is an example of a shift register memory. The shift register memory includes a block, the block including a plurality of data storing shift strings. Each data storing shift string includes a plurality of storage portions. A set of the storage portions included in the data storing shift strings in the block organizes a plurality of layers functioning as a plurality of stages of a shift register.

The shift register memory executes a write operation and a read operation in a last-in first-out method (LIFO method) or a first-in first-out method (FIFO method) by shifting data stored in each of the layers in units of layer.

For example, the shift register memory may execute the write operation by shifting data stored in each of the layers in a first direction from a head layer of the block to a last layer of the block in units of layer and putting data having a size of one layer into the head layer of the block. Furthermore, the shift register memory may execute the read operation by shifting data stored in each of the layers in the first direction or in a second direction opposite to the first direction in units of layer.

In the following description, a structure and an operation of the present embodiment will be explained using the magnetic domain wall memory 3 as an example of the shift register memory.

The magnetic domain wall memory 3 is a shift register memory using motion of magnetic domain wall. The magnetic domain wall memory 3 includes a plurality of blocks. Each block includes a plurality of magnetic memory lines. Each magnetic memory line functions as the aforementioned data storing shift string, and each magnetic memory line includes a plurality of magnetic storage portions. Each magnetic storage portion is a unit which can store magnetization. In the following description, each of the magnetic storage portions included in each of the magnetic memory lines will be referred to as a cell.

In each block of the magnetic domain wall memory 3, a set of cells included in magnetic memory lines of the block is organized as a plurality of layers. The layers function as stages of a shift register (magnetic shift register). Each layer is a unit of read/write of data from/to the block.

The magnetic domain wall memory 3 executes a write operation and a read operation a last-in first-out method (LIFO method) or a first-in first-out method (FIFO method) by shifting data stored in each of the layers in units of layer.

For example, the magnetic domain wall memory 3 may execute the write operation by shifting data stored in each of the layers in the block in a first direction from a head layer of the block to a last layer of the block in units of layer and putting write data having a size of one layer into the head layer of the block, and may execute the read operation by shifting data stored in each of the layers in the block in a second direction in units of layer. The second direction is the same as the first direction or is an opposite thereto.

When data is read from the block of the magnetic domain wall memory 3, the data is lost from the magnetic domain wall memory 3.

The magnetic domain wall memory 3 may be realized as a last-in first-out type magnetic domain wall memory (LIFO type magnetic domain wall memory), or may be realized as a first-in first-out type magnetic domain wall memory (FIFO type magnetic domain wall memory).

If the magnetic domain wall memory 3 is realized as the LIFO type magnetic domain wall memory, a direction to which data of each layer is shifted when reading data from the magnetic domain wall memory 3 is opposite to a direction to which data of each layer is shifted when writing data into the magnetic domain wall memory 3.

That is, if the magnetic domain wall memory 3 is realized as the LIFO type magnetic domain wall memory, the magnetic domain wall memory 3 may execute the write operation by shifting data stored in each of the layers in the block in a direction from the head layer of the block to the last layer of the block in units of layer and putting write data having a size of one layer into the head layer of the block. In the write operation, each time when one shifting is executed, write data having a size of one layer is put into the head layer of the block, and at the same time, data stored in each of the layers of the block is shifted to the last layer side by one layer. Furthermore, the magnetic domain wall memory 3 may execute the read operation by shifting data stored in each of the layers in the block in a direction from the last layer to the head layer in units of layer. In the read operation, each time when one shifting is executed, data having a size of one layer existing in the head layer is read from the block, and at the same time, data stored in each layer of the block is shifted to the head layer side by one layer.

Thus, in a state where data of block size have been written into the block, data having a size of one layer initially written into the block is in the last layer, and data having a size of one layer finally written into the block is in the head layer. The block size corresponds to a capacity of one block.

In the read operation to read the data of block size from the block, since the data having a size of one layer finally written into the block is in the head layer, this data is read from the block by one shifting. Since the data having a size of one layer initially written into the block is in the last layer, this data is moved from the last layer to the head layer when shifting of total layers-1 times are executed, and is read from the block by the following one shifting.

On the other hand, if the magnetic domain wall memory 3 is realized as the FIFO type magnetic domain wall memory, a direction to which data of each layer is shifted for the read operation is the same as a direction to which data of each layer is shifted for the write operation.

That is, if the magnetic domain wall memory 3 is realized as the FIFO type magnetic domain wall memory, the magnetic domain wall memory 3 may execute the write operation by shifting data stored in each of the layers in the block in a direction from the head layer to the last layer in units of layer and putting write data having a size of one layer into the head layer. Furthermore, the magnetic domain wall memory 3 may execute the read operation by shifting data stored in each layer of the block in a direction form the head layer to the last layer in units of layer.

In the read operation to read data of block size from the block, since data having a size of one layer initially written into the block is in the last layer, this data is read from the block by one shifting. Since data having a size of one layer finally written into the block is in the head layer, this data is moved from the head layer to the last layer when shifting of total layers-1 times are executed, and is read from the block by the following one shifting.

The memory system 1 may be realized as a solid state drive (SSD), or may be realized as a memory card in which the memory controller 2 and the magnetic domain wall memory 3 are formed as one package.

The memory controller 2 controls writing of data into the magnetic domain wall memory 3 in accordance with a write request (write command) received from the host 4. Furthermore, the memory controller 2 controls reading of data from the magnetic domain wall memory 3 in accordance with a read request (read command) received from the host 4.

The memory controller 2 may be realized as a controller circuit such as a system-on-a-chip (SoC). The memory controller 2 includes a host interface 21, memory interface 22, a control unit 23, encoder/decoder 24, and data buffer 25. The host interface 21, memory interface 22, control unit 23, encoder/decoder 24, and data buffer 25 are connected to an internal bus 20.

The host interface 21 performs a process based on an interface standard between a host and a device, and outputs to the internal bus 20 a request received from the host 4, user data received from the host 4, and the like. Furthermore, the host interface 21 transmits to the host 4 user data read from the magnetic domain wall memory 3, a response received from the control unit 23, and the like. Note that, in the present embodiment, data to be written into the magnetic domain wall memory 3 in accordance with a write request from the host 4 will be referred to as user data.

The memory interface 22 executes a write operation to write data into the magnetic domain wall memory 3 based on an instruction from the control unit 23. Furthermore, based on the instruction from the control unit 23, the memory interface 22 executes a read operation to read data from the magnetic domain wall memory 3.

The control unit 23 controls components of the memory system 1. The control unit 23 may be realized as a processor (CPU).

Upon receipt of a request from the host 4 via the host interface 21, the control unit 23 performs the control based on the request. For example, based on a write request received from the host 4, the control unit 23 instructs the memory interface 22 to write user data and parity into the magnetic domain wall memory 3. Furthermore, based on a read request received from the host 4, the control unit 23 instructs the memory interface 22 to read user data and parity from the magnetic domain wall memory 3. Here, parity means an error correction code (ECC) which is a part of a codeword obtained by encoding user data. A write request specifies a logical address, size of write data to be written, and the like. A logical address specified by the write request indicates a logical address into which the write data is written. A read request specifies a logical address, size of data to be read, and the like. A logical address specified by the read request indicates a logical address corresponding to the data to be read.

Furthermore, when the control unit 23 receives a write request from the host 4, the control unit 23 determines a storage region (memory region) in the magnetic domain wall memory 3 to which user data accumulated in the data buffer 25 is to be written. That is, the control unit 23 manages a write destination of user data. The control unit 23 manages mapping between a logical address specified by a write request received from the host 4 and a physical address indicative of a storage region in the magnetic domain wall memory 3 in which user data corresponding to the logical address is stored, using a look up table (LUT) functioning as an address translation table. The look up table (LUT) may be stored in a RAM (dynamic RAM (DRAM)) or a static RAM (SRAM), or may be stored persistently in the magnetic domain wall memory 3. In the latter case, the LUT may be loaded from the magnetic domain wall memory 3 to the memory system 1 when the memory system 1 is powered on.

Furthermore, when the control unit 23 receives a read request from the host 4, the control unit 23 translates a logical address specified by the read request into a physical address using the aforementioned LUT (address translation table), and instructs the memory interface 22 to read data from the physical address.

The data buffer 25 temporarily stores user data received from the host 4. Furthermore, the data buffer 25 temporarily stores user data which is read from the magnetic domain wall memory 3. Furthermore, the data buffer 25 temporarily stores a codeword (user data+ECC) generated by encoding the user data received from the host 4. The data buffer 25 is implemented by, for example, the aforementioned RAM (SRAM or DRAM).

The user data transmitted from the host 4 is transferred to the internal bus 20 and is stored in the data buffer 25. The encoder/decoder 24 generates a codeword by encoding data to be written to the magnetic domain wall memory 3. Any method of encoding can be used here, and it is, for example, Read Solomon (RS) encoding, Bose-Chaudhuri-Hocquenghem (BCH) encoding, or Low density parity check (LDPC) encoding. The encoder/decoder 24 includes an encoding unit 26 and a decoding unit 27. Encoding and decoding of the present embodiment will be detailed later.

For simplicity of explanation, in the present embodiment, it is assumed that the magnetic domain wall memory 3 includes one magnetic domain wall memory chip. However, the present embodiment is applicable to a configuration in which the magnetic domain wall memory 3 includes a plurality of magnetic domain wall memory chips.

FIG. 2 illustrates a structural example of a memory cell array included in the magnetic domain wall memory 3. In the following description, for easier understanding, the structural example of the memory cell array will be explained using specific numerical values; however, such numerical values are an example, and any numerical value can be applied to the structure of the memory cell array of the present embodiment.

The memory cell array includes a plurality of blocks. In this example, each block includes a total of n layers of layers L1 to Ln. Here, n is a natural integer which is two or more. These n layers function as stages of the aforementioned shift register. The layer Ln corresponds to the first stage of the shift register, and the layer L1 corresponds to the last stage of the shift register.

The layers L1 to Ln of one block can be realized by a plurality of magnetic memory lines MML included in the block. The number of the magnetic memory lines MML included in one block is not limited, and in this example, each block includes m magnetic memory lines MML. Here, m is a natural integer which is two or more.

The magnetic memory line MML is a magnetic shift register, and functions as the data storing shift string of the shift register memory. For example, the magnetic memory line MML is formed of an elongated magnetic substance extending in one direction. The magnetic memory line MML may be also referred to as magnetic line, magnetic narrow wire, or magnetic memory string.

In the block, the magnetic memory lines MML extend in Y (column) direction, and include a plurality of cells each of which can store magnetization. Each of micro regions arranged in the longitudinal direction of elongated magnetic substance forming the magnetic memory line MML functions as a cell.

The cells of each magnetic memory line MML are elements of the layers L1 to Ln of the block. Cells included in m magnetic memory lines MML are organized as layers (L1 to Ln) extending in an X (row) direction. For example, the layer Ln of the block includes a set of m cells positioned at one end side of m magnetic memory lines MML, and the layer L1 of the block includes a set of m cells positioned at the other end side of m magnetic memory lines MML.

In FIG. 2, a set of hexagons continuous in the Y (column) direction indicates one magnetic memory line MML. One hexagon indicates one cell in the magnetic memory line MML. Rounded squares extending in the X direction over m magnetic memory lines MML indicate layers L1 to Ln of the block.

Note that FIG. 2 and the other drawings illustrate the structure of the block so as to be easily understandable, that is, magnetic memory lines MML included in one block are arranged in one line along the X direction, but the positions of the magnetic memory lines MML with relative to each other and the order thereof in the arrangement are irrespective of the actual physical positions of the magnetic memory lines MML included in the block. In actual cases, the magnetic memory lines MML included in one block may be arranged in various manners at physical positions different from each other, and the physical positions of the magnetic memory lines MML with relative to each other and the order thereof in the arrangement are not limited to those illustrated in the respective figures.

For example, of a great number of magnetic memory lines MML, those located at physical positions close to each other may be included in different blocks, or those located at physical positions distant from each other may be included in the same block. Similarly, FIG. 2 and the other drawings illustrate the structure of the block so as to be easily understandable, that is, the layer Ln is located at the uppermost position, and the layer L1 is located at the lowermost position, but, in actual cases, the layer Ln may be located at the lowermost position, and the layer Ln is located at the uppermost position.

A set of layers included in the block, i.e., a set of cells included in the block functions as a physical storage region of the block. A magnetization direction of magnetization stored in each cell may be used as information indicative of "1" or "0". In that case, if one magnetic memory line MML includes n layers, one magnetic memory line MML can store n bits of data at the maximum.

Or, instead of a case where the magnetization direction of single magnetization corresponds to "1" or "0", a combination of magnetization directions of two adjacent magnetizations may be used as information indicative of "1" or "0". In that case, a combination of two adjacent magnetizations having the same magnetization direction may correspond to "0", and a combination of two adjacent magnetizations having different magnetization directions may correspond to "1". If one magnetic memory line MML includes n layers, one magnetic memory line MML can store "n−1" bits of data at the maximum.

FIG. 3 is a diagram illustrating a structural example of LIFO type magnetic domain wall memory.

In the LIFO type magnetic domain wall memory, each magnetic memory line MML is accessed in the last-in first-out method in which a stored location of data previously written is moved to a deeper location side when next data is written, and the data on the deeper location side cannot be read before data written later is read.

One ends of m magnetic memory lines MML included in each block are connected to m input and output units, respectively. In FIG. 3, the m input and output units are represented as an input and output unit group 31. Writing data into the block and reading data from the block are performed through the input and output unit group 31.

The input and output unit group 31 is connected to each of a shift control circuit 32 and a write and read control circuit 33. In the write operation, the shift control circuit 32 shifts data of each layer in the block in a direction which goes from layer Ln to layer L1. In the read operation, the shift control circuit 32 shifts data of each layer in the block in a direction which goes from layer L1 to layer Ln.

In the magnetic domain wall memory 3, the shift control circuit 32 shifts (moves) each magnetic domain wall in each magnetic memory line MML by supplying a current pulse to each magnetic memory line MML in the block. The magnetic domain wall is a boundary between magnetizations having different polarities. In each magnetic memory line MML, each magnetic domain (magnetization) is shifted (moved) in units layer (that is, in units of one bit) by movement of magnetic domain walls. The write and read control circuit 33 controls write and read of data with respect to this block via the input and output unit group 31.

FIG. 4 is a diagram illustrating a structural example of a FIFO type magnetic domain wall memory.

In the FIFO type magnetic domain wall memory, each magnetic memory line MML is accessed in a first-in first-out method in which a stored location of data previously written is moved to a deeper location side when next data is written, and the data are read from the block in the same order that the data are written into the block.

One ends of m magnetic memory lines MML included in each block are connected to m input units, respectively. In FIG. 4, the m input units are represented as an input unit group 31a. Writing of data for the block is performed through the input unit group 31a.

Other ends of m magnetic memory lines MML included in each block are connected to m output units, respectively. In FIG. 4, the m output units are represented as an output unit group 31b. Reading of data from the block is performed through the output unit group 31b.

The input unit group 31a is connected to each of a shift control circuit 41 and a write control circuit 42. In the write operation, the shift control circuit 41 shifts data of each layer in the block in a direction which goes from layer Ln to layer L1. In the read operation, the shift control circuit 41 shifts data of each layer in the block in the direction which goes from layer Ln to layer L1. The write control circuit 42 controls write of data into the block through the input unit group 31a.

An output unit group 31b is connected to a read control circuit 43. The read control circuit 43 controls read of data from the block through the output unit group 31b.

Figure 5:
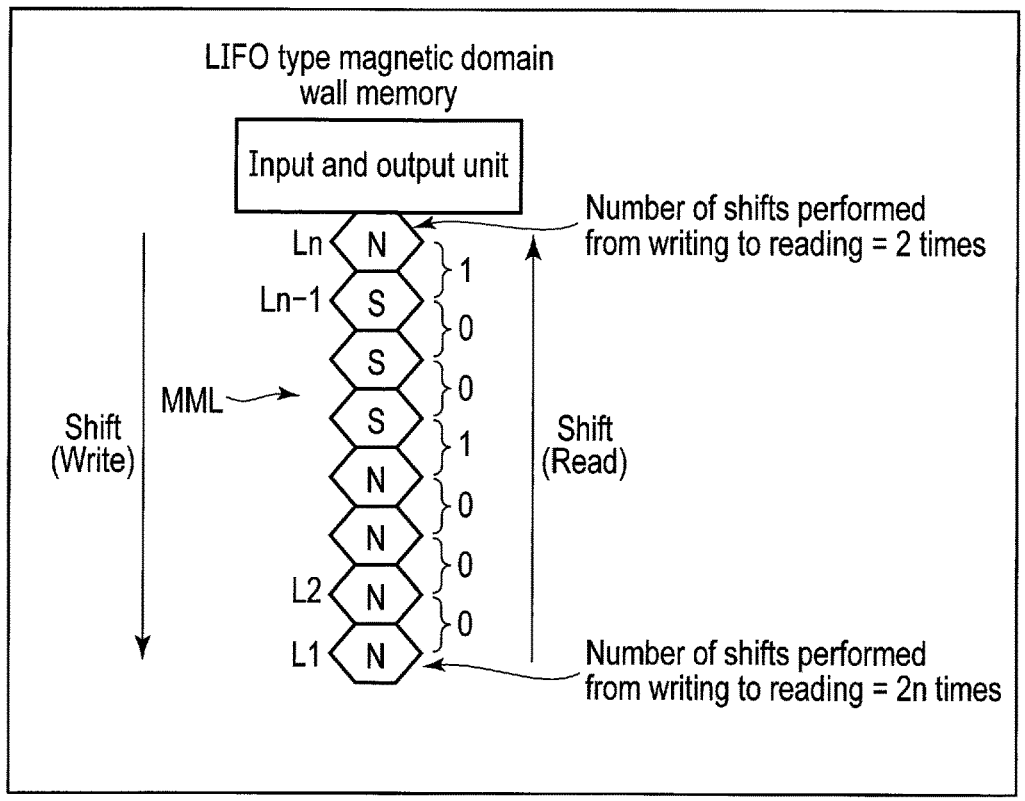
FIG. 5 is a diagram illustrating a shift operation where one magnetic memory line (MML) in the LIFO type magnetic domain wall memory is focused.

FIG. 5 is a diagram illustrating a shift operation where one magnetic memory line MML in the LIFO type magnetic domain wall memory is focused.

In FIG. 5, polarization (magnetization direction) of each magnetization stored in the magnetic memory line MML is indicated by S or N. As mentioned above, polarization of single magnetization may represent "1" or "0" of data, or a combination of two adjacent magnetizations may represent "1" or "0" of data. In FIG. 5, the latter case is illustrated. For example, magnetization stored in the cell of layer L2 of the magnetic memory line MML (magnetization N in this case) has the same magnetization direction as the magnetization stored in the cell of layer L1 (magnetization N in this case), and thus, they are parallel, and a combination of the two magnetizations corresponds to, for example, "0". Furthermore, magnetization stored in the cell of layer Ln of the magnetization memory line MML (magnetization N in this case) has a magnetization direction opposite to that of the magnetization stored in layer Ln-1 (magnetization S in this case), and thus, they are antiparallel, and the combination of the two magnetizations corresponds to, for example, "1".

For example, in a write operation of writing data "1" into the magnetic memory line MML, magnetization of polarity opposite to that of magnetization of cell of layer Ln is put into layer Ln as write data. In that case, a shift operation to shift magnetization of each layer downward by one layer is executed. Through this operation, magnetization of each layer is shifted in a direction which goes from layer Ln to layer L1 (down direction) by one layer, and magnetization corresponding to the write data is put into layer Ln.

In a read operation, whether or not read data is "1" or "0" can be determined based on, for example, whether or not a resistance state of a magnetoresistance element is changed when two magnetizations are continuously read from the magnetic memory line MML. In the read operation, initially, a shift operation in which magnetization of each layer is shifted upward by one layer is executed. Through this shift operation, magnetization of layer Ln is read from the magnetic memory line MML and magnetizations of layers L1 to Ln-1 are shifted to layers L2 to Ln, respectively.

Then, the shift operation to shift magnetization of each layer upward by one layer is executed again. Since the magnetization which was originally in layer Ln-1 is now in layer Ln, this magnetization of layer Ln is read from the magnetic memory line MML, and magnetizations of layers L2 to Ln-1 are shifted to layers L3 to Ln, respectively.

In the write operation to write data of block size into the block, the number of shifts of data to be finally stored in layer L1 is n times. In the read operation to read data of block size from the block, the number of shifts of data stored in layer L1 is n times. Thus, the total number of shifts of data performed from writing of the data to reading of the data will be 2n times. For example, if the number of layers in the block is 512, the total number of shifts of data performed from writing of the data to reading of the data will be 1024 times.

On the other hand, with regard to data to be finally stored in layer Ln, the total number of shifts of data performed from writing of the data to reading of the data will be 2 times.

As can be understood from the above, in the LIFO type magnetic domain wall memory, the numbers of shifting of data are significantly different between the data of layers closer to layer Ln (hereinafter may be referred to as upper layer side) and the data of layers closer to layer L1 (hereinafter may be referred to as lower layer side), and there is a bias that the number of shifts of data increases in the layers closer to layer L1.

Figure 6:
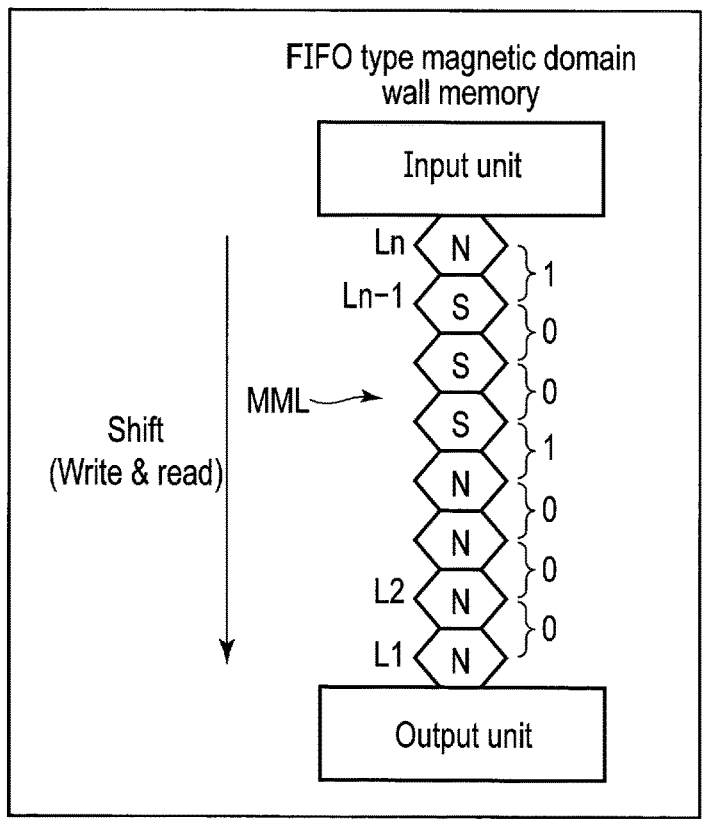
FIG. 6 is a diagram illustrating a shift operation where one MML in the FIFO type magnetic domain wall memory is focused.

FIG. 6 is a diagram illustrating a shift operation where one magnetic memory line MML of the FIFO type magnetic domain wall memory is focused.

In FIG. 6, similarly to FIG. 5, polarization (magnetization direction) of each magnetization stored in the magnetic memory line MML is indicated by S or N. In the FIFO type magnetic domain wall memory, polarization of single magnetization may represent "1" or "0" of data, or a combination of two adjacent magnetizations may represent "1" or "0" of data. In FIG. 6, the latter case is illustrated.

In a write operation of the FIFO type magnetic domain wall memory, similarly to the LIFO type magnetic domain wall memory, a shift operation to shift magnetization of each layer downward by one layer is executed, thus, magnetization of each layer is shifted downward by one layer, and magnetization corresponding to write data is put into layer Ln. Thus, in in the write operation to write data of block size into the block, the number of shifts of data to be finally stored in layer L1 is n times, and the number of shifts of data to be finally stored in layer Ln is one.

In a read operation of the FIFO type magnetic domain wall memory, as in the write operation, a shift operation to shift magnetization of each layer downward in units of layer is executed. Through this operation, data stored in layer L1 is read from the magnetic memory line MML, and data stored in each of layers L2 to Ln is shifted downward by one layer.

As can be understood from the above, in the magnetic domain wall memory 3, write and read of data is performed by shifting data stored in each of layers L1 to Ln in units of layer. Thus, when persistently storing data in the magnetic domain wall memory 3, a defective shift operation may occur. The defective shift operation is also referred to as a "shift miss".

Figure 7:
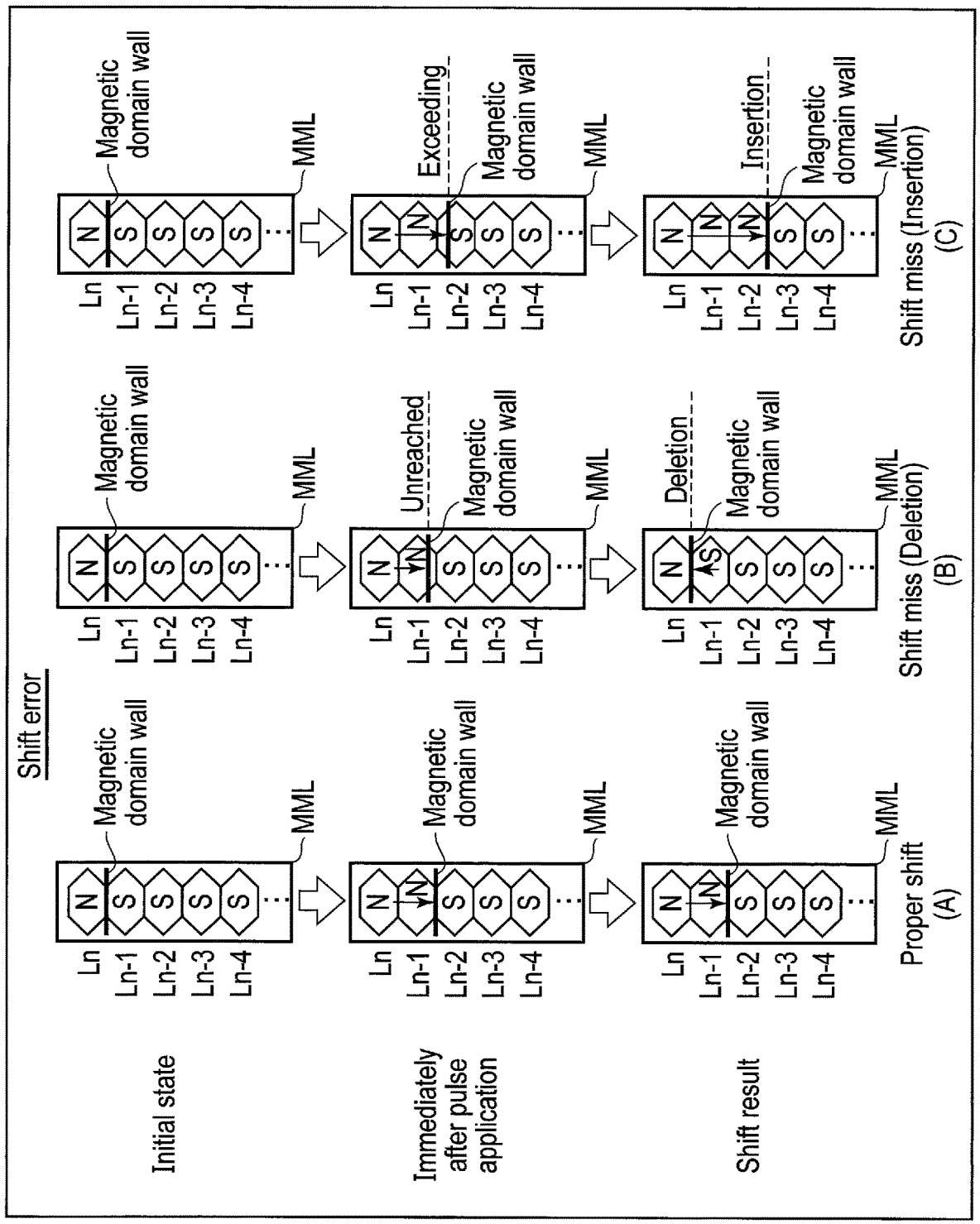
FIG. 7 is a diagram illustrating a defective shift operation in the magnetic domain wall memory.

FIG. 7 is a diagram illustrating a defective shift operation in the magnetic domain wall memory 3.

(A) of FIG. 7 illustrates a proper shift operation. In this example, in an initial state before write of next data is started, magnetization N has been stored in layer Ln, and magnetization S has been stored in each of layers Ln-1 to Ln-4. The magnetic domain wall is in the boundary between layer Ln and layer Ln-1.

In order to write next write data (magnetization N in this example) into the magnetic memory line MML, a pulse current for shifting data of each layer downward is applied to the magnetic memory line MML. If the proper shift operation is executed, the magnetic domain wall is shifted (moved) by one layer, and thus, the magnetic domain wall reaches the boundary between layer Ln-1 and layer Ln-2. As a result of the shift, data stored in each of layers Ln to Ln-3 is shifted to each of layers Ln-1 to Ln-4, and the next write data (magnetization N in this example) is put into layer Ln.

(B) of FIG. 7 illustrates a defective shift operation in which data is lost ("deletion").

In an initial state before write of next data is started, magnetization N has been stored in layer Ln, and magnetization S has been stored in each of layers Ln-1 to Ln-4. The magnetic domain wall is in the boundary between layers Ln and Ln-1.

In order to write next write data (magnetization N in this example) into the magnetic memory line MML, a pulse current for shifting data of each layer downward is applied to the magnetic memory line MML. At that time, the magnetic domain wall may not reach the boundary between layers Ln-1 and Ln-2. In that case, the location of the magnetic domain wall may return to the original location where it was before application of the pulse current. As a result, a shift miss where data of one layer is lost occurs ("deletion").

(C) of FIG. 7 illustrates a defective shift operation in which unnecessary data is inserted ("insertion").

In an initial state before write of next data is started, magnetization N has been stored in layer Ln, and magnetization S has been stored in each of layers Ln-1 to Ln-4. The magnetic domain wall is in the boundary between layers Ln and Ln-1.

In order to write next write data (magnetization N in this example) into the magnetic memory line MML, a pulse current for shifting data of each layer downward is applied to the magnetic memory line MML. At that time, the magnetic domain wall may exceed the boundary between layers Ln-1 and Ln-2. In that case, the location of the magnetic domain wall may reach the boundary between layers Ln-2 and Ln-3. As a result, a shift miss where excessive data of one layer is inserted occurs ("insertion").

The above shift miss causes a deviation of the location of data stored before the shift miss or a deviation of the location of data to be stored after the shift miss. Since an affecting of the shift miss occurring in the upper layer side propagates to the lower layer side, the shift miss cause burst errors in which many bit errors occur in specific locations.

Figure 8:
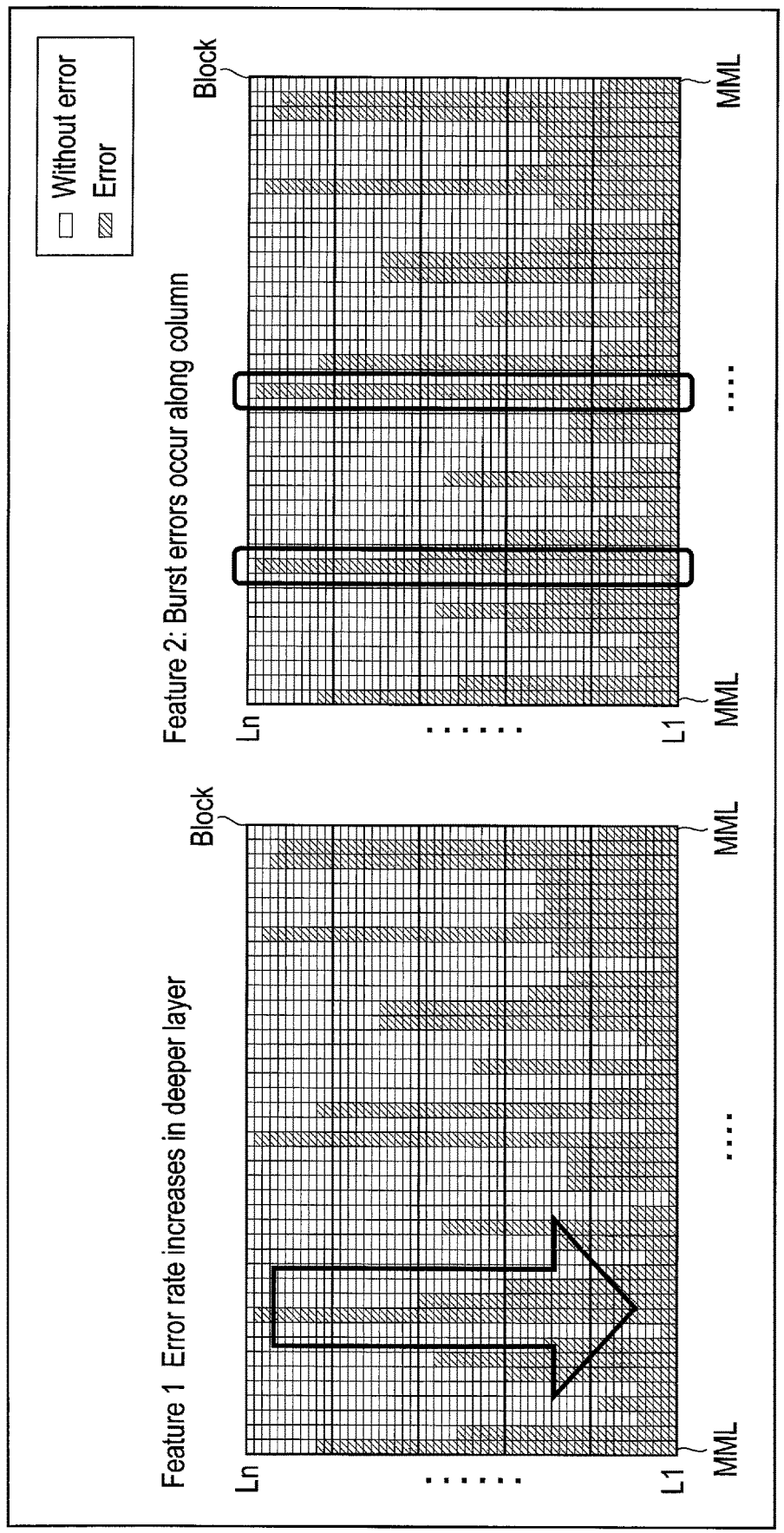
FIG. 8 is a diagram illustrating two types of features (feature 1 and feature 2) of error locations in the magnetic domain wall memory.

FIG. 8 is a diagram illustrating two types of features (feature 1 and feature 2) of error locations of the magnetic domain wall memory 3. Note that, in FIG. 8 and subsequent Figures, each cell of the magnetic memory line MML is represented by a square.

In FIG. 8, each column extending in a perpendicular direction indicates one magnetic memory line MML included in the block, and each row extending in a horizontal direction indicates one layer included in the block. Many squares arranged in a matrix indicate a set of cells (magnetic storage portions) forming the physical storage region of the block.

A blank square indicates a cell in which an error (bit error) does not occur, and a hatched square indicates a cell in which a bit error occurs.

In the magnetic domain wall memory 3, a bias of the number of shifts in which the number of necessary shifting increases in the layers closer to layer L1 occurs, and as illustrated in the left part of FIG. 8, an error rate of data increases in the layers closer to layer L1 (deeper layers) (feature 1). Since the bias of the number of shifts especially increases in the LIFO type magnetic domain wall memory, a bias of error locations in which an error rate of data increases in the lower layer side becomes significant. Note that, in the following description, layer L1 may be also referred to as the lowermost layer and layer Ln may be also referred to as the uppermost layer.

Furthermore, in the magnetic domain wall memory 3, as illustrated in the right part of FIG. 8, burst errors occur along the columns (feature 2). Movement characteristics of the magnetic domain wall may vary from MML to MML. Thus, in some of the magnetic memory lines MML included in the block, the burst errors may occur along the magnetic memory lines MML.

The two types of features (feature 1 and feature 2) of the error locations are related not only to the magnetic domain wall memory 3 but also to various shift register memories.

Figure 9:
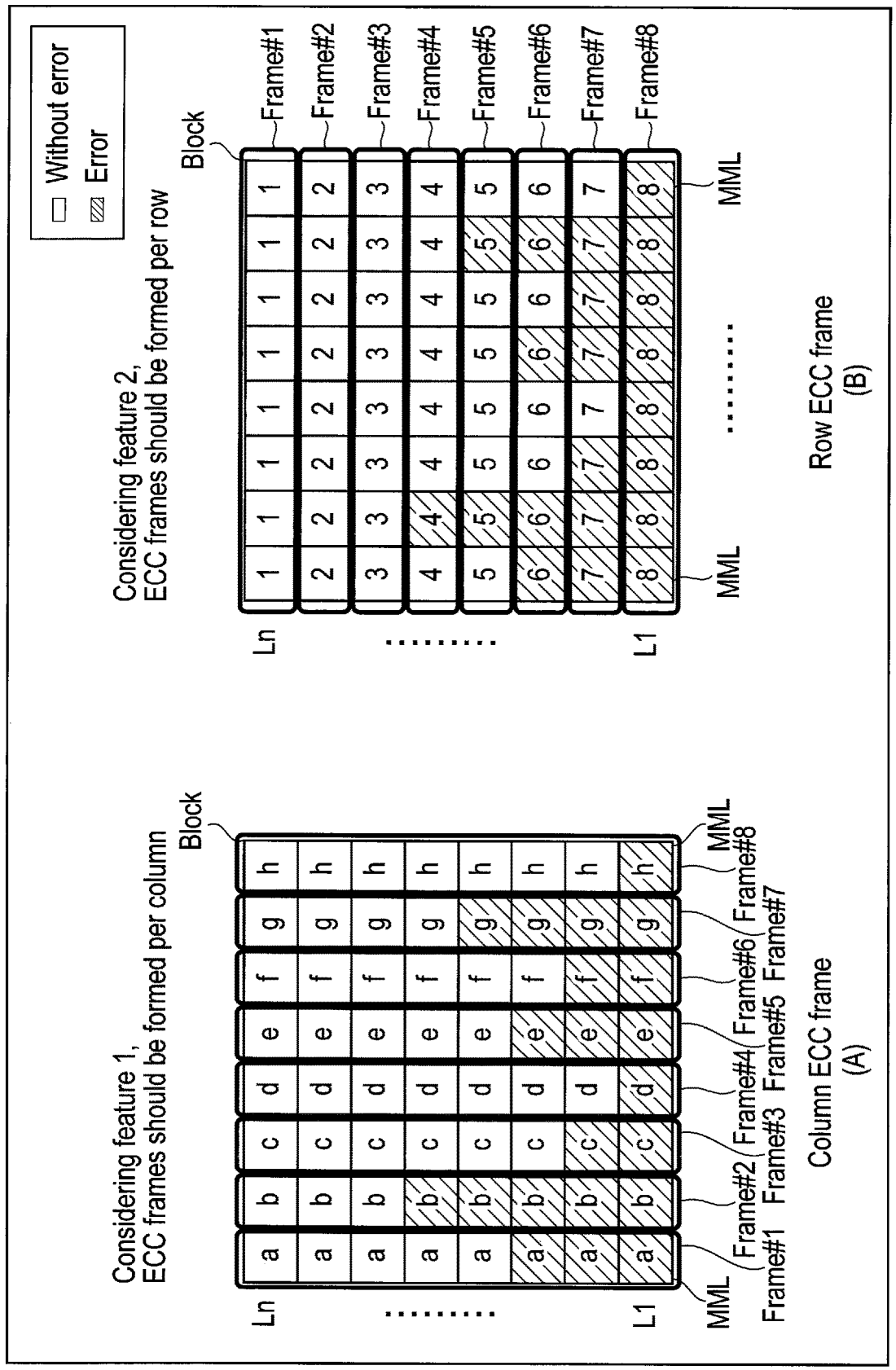
FIG. 9 is a diagram illustrating a structural example of ECC frames arranged in a column direction of a block of the magnetic domain wall memory (column ECC frames) and a structural example of ECC frames arranged in a row direction of the block of the magnetic domain wall memory (row ECC frames).

FIG. 9 is a diagram illustrating a structural example of ECC frames arranged in the column direction of the block of the magnetic domain wall memory 3 (column ECC frames), and a structural example of ECC frames arranged in the row direction of the block of the magnetic domain wall memory 3 (row ECC frames).

To be easily understandable, FIG. 9 illustrates magnetic memory lines MML arranged in one line along the lateral direction so as to depict a set of magnetic memory lines MML included in one block, but, as described above, in actual cases, the magnetic memory lines MML included in one block may be arranged in various manners at physical positions different from each other, and the physical positions of the magnetic memory lines MML with relative to each other and the order thereof in the arrangement are not limited to those illustrated in FIG. 9. As also described above, of a great number of magnetic memory lines MML, those located at physical positions close to each other may be included in different blocks, or those located at physical positions distant from each other may be included in the same block.

In consideration of feature 1, as (A) of FIG. 9, it is to be desired that each FCC frame is formed of one or more columns by arranging a plurality of ECC frames (for example, frames #1 to #8) in the column direction in the physical storage region of the block of the magnetic domain wall memory 3 (column ECC frames). (A) of FIG. 9 illustrates a structure example where each ECC frame is formed of one magnetic memory line MML. Furthermore, (A) of FIG. 9 illustrates a case where one block includes eight magnetic memory lines MML and eight layers. The number of magnetic memory lines MML included in each FCC frame may be two or more. For example, each ECC frame may be formed of a set of several magnetic memory lines MML. By forming each ECC frame of one or more columns (one or more magnetic memory lines MML) as above, one ECC frame includes data of the upper layer side and data of the lower layer side evenly, and thus, the number of errors (bit errors) included in the these ECC frames can be uniformed.

Note that, in (A) of FIG. 9, a set of data elements represented by the same alphabet forms one ECC frame. For example, data elements represented by "a" are a set of data elements forming ECC frame #1.

In consideration of feature 2, as (B) of FIG. 9, it is to be desired that each ECC frame is formed of one or more rows by arranging a plurality of ECC frames (for example, frames #1 to #8) in the row direction in the physical storage region of the block of the magnetic domain wall memory 3 (row ECC frames). (B) of FIG. 9 illustrates a structure example where each ECC frame is formed of one layer. Furthermore, (B) of FIG. 9 illustrates a case where one block includes eight magnetic memory lines MML and eight layers. The number of layers included in each ECC frame may be two or more. For example, each ECC frame may be formed of a set of several layers. By forming each ECC frame of one or more rows (one or more layers) as above, burst errors occurring along the columns (magnetic memory lines MML) can be spread over these ECC frames, and thus, the number of errors (bit errors) included in these ECC frames can be uniformed.

FIG. 10 is a diagram illustrating a structural example of ECC frames (diagonal ECC frames) used in the memory system 1 of the present embodiment.

In FIG. 10, a case where one block includes eight magnetic memory lines MML and eight layers. In order to deal with both an error location pattern of feature 1 and an error location pattern of feature 2, as shown in FIG. 10, each of ECC frames (for example, frames #1 to #8) is arranged in a diagonal direction in the physical storage region of the block of the magnetic domain wall memory 3.

In FIG. 10, a set of data elements indicated by the same alphabet (same Greek character in this example) forms one ECC frame. For example, data elements indicated by "0" are a set of data elements forming ECC frame #1.

Note that, basically, an ECC frame should be formed of a combination of a frame element including many upper layer side data (i.e., data elements of the layer Ln side) and a frame element including many lower layer side data (i.e., data elements of the layer L1 side). This is because there is a difference in the error rate between upper layer side and lower layer side. Furthermore, the number of data included in one frame element may be one or more. Thus, in a case where one block includes N magnetic memory lines MML and N layers, and the number of data forming one ECC frame is N, an ECC frame may be formed by frame elements of any arrangement pattern as long as N data forming one ECC frame are included in N layer one by one, and are included in N magnetic memory lines MML one by one.

For example, one ECC frame may be formed of N frame elements each of which includes one data. And these N frame elements may be distributed over N magnetic memory lines MML and N layers. That is, one ECC frame may include at least one in each group of first data elements of the layer Ln side of the block and second data elements of the layer L1 side of the block.

In the following description, for easier understanding, a case where each ECC frame is formed of one or more frame elements arranged diagonally in different regions of a physical storage region of the block will be used as an example; however, arrangement of frame elements forming each ECC frame is not limited thereto, and various patterns of frame elements can be used. In the following description, both ECC frame formed of one or more frame elements arranged diagonally and ECC frame formed of other patterns of frame elements are referred to as the diagonal ECC frames.

In the example of FIG. 10, each of ECC frames (for example, frames #1 to #8) is arranged diagonally in a physical storage region of the block of the magnetic domain wall memory 3 such that the upper layer side data and the lower layer side data which have different error rates are included evenly in each of ECC frames (frames #1 to #8), and burst errors occurring along the magnetic memory lines MML are spread evenly over the ECC frames (frames #1 to #8). Here, a diagonal direction is not a row direction (horizontal direction) or a perpendicular direction (column direction) with respect to the physical storage region of the block, but is an angle inclined with respect to the horizontal direction (or perpendicular direction) in a whole view. Note that, as long as each ECC frame includes various MMLs and various layers of various depths, an angle of each ECC frame with respect to the horizontal direction (or perpendicular direction) is not limited to a specific degree.

ECC frames #1 to #8 (diagonal ECC frames #1 to #8) have the same frame size. That is, each of the diagonal ECC frames #1 to #8 includes a codeword having a size equal to this frame size.

In FIG. 10, one diagonal ECC frame may include the upper layer side data and the lower layer side data evenly. Thus, even if there is a bias that the error rate increases in lower layers, the number of errors (bit errors) included in these diagonal ECC frames can be even.

Furthermore, one diagonal ECC frame may include a plurality of columns (a plurality of magnetic memory lines MML) evenly. Thus, burst errors occurring along the columns (magnetic memory lines MML) can be spread over the diagonal ECC frames, and thus, the number of errors (bit errors) included in these diagonal ECC frames can be even.

In FIG. 10, diagonal ECC frame #8 is formed of one frame element arranged diagonally along a diagonal line of the physical storage region of the block. Other diagonal ECC frames #1 to #7 are each formed of a combination of two frame elements (may be referred to as diagonal frame elements) arranged diagonally in the physical storage region of the block.

Diagonal ECC frame #1 includes diagonal frame element #1-1 and diagonal frame element #1-2. Here, in each diagonal frame element, a reference number (#n) is added to a reference number #n-1 indicating the diagonal frame element. The reference number (#n) represents the diagonal ECC frame to which this diagonal frame element belongs. For example, frame #1-1(#1) represents a first diagonal frame element belonging to diagonal ECC frame #1.

Diagonal frame element #1-1 is a frame element including many upper layer side data, and diagonal frame element #1-2 is a frame element including many lower layer side data.

Similarly, diagonal ECC frame #2 includes diagonal frame element #2-1 including many upper layer side data and frame element #2-2 including many lower layer side data, diagonal ECC frame #3 includes diagonal frame element #3-1 including many upper layer side data and frame element #3-2 including many lower layer side data, diagonal ECC frame #4 includes diagonal frame element #4-1 including many upper layer side data and frame element #4-2 including many lower layer side data, diagonal ECC frame #5 includes diagonal frame element #5-1 including many upper layer side data and frame element #5-2 including many lower layer side data, diagonal ECC frame #6 includes diagonal frame element #6-1 including many upper layer side data and frame element #6-2 including many lower layer side data, and diagonal ECC frame #7 includes diagonal frame element #7-1 including many upper layer side data and frame element #7-2 including many lower layer side data.

As can be understood from the above, one diagonal ECC frame is formed of a combination of a frame element including many upper layer side data and a frame element including many lower layer side data, these frame element having different error rates. Thus, each diagonal ECC frame can include various layers (cells) having different error rates evenly and the number of errors (bit errors) included in the diagonal ECC frames #1 to #8 can be even.

Figure 11:
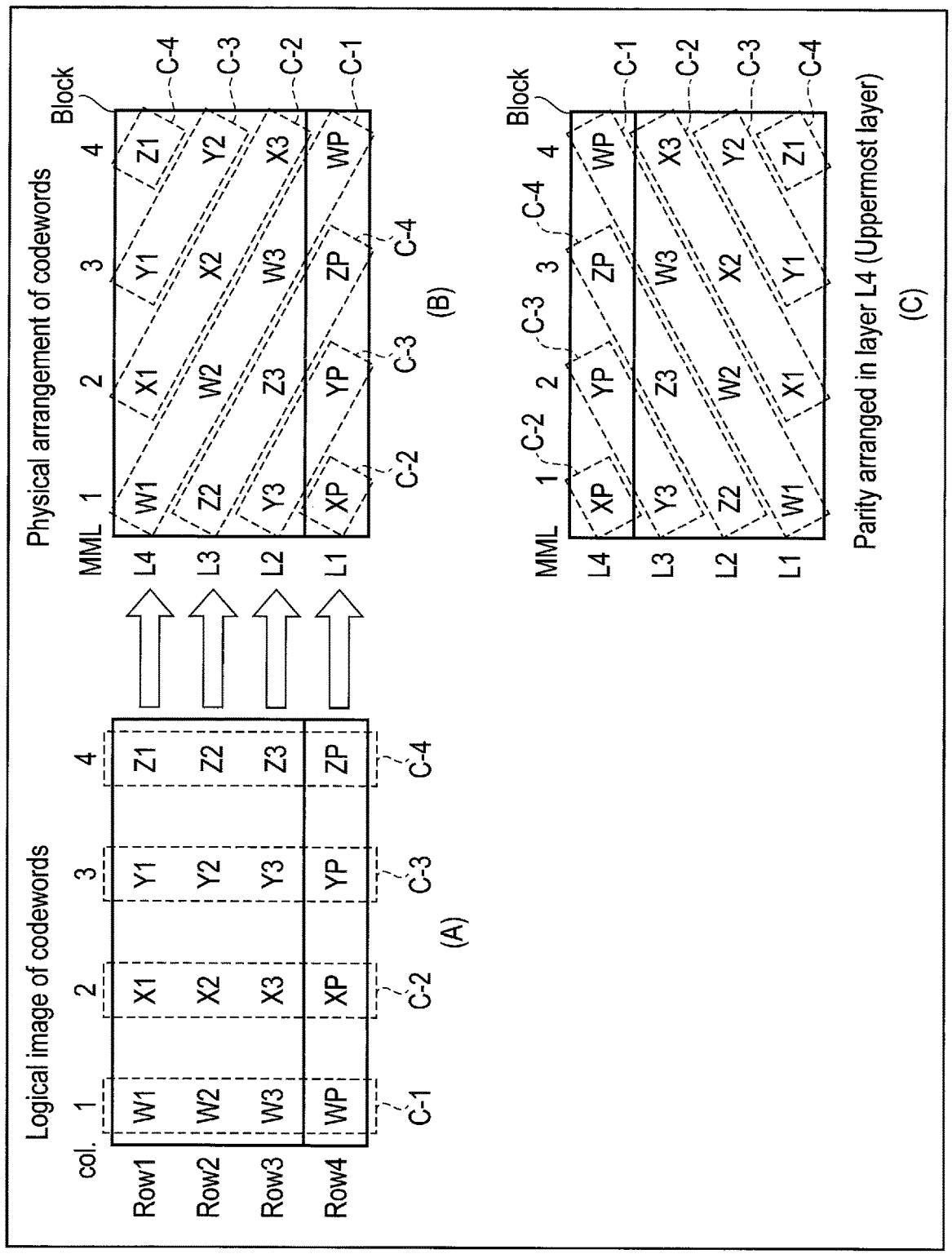
FIG. 11 is a diagram illustrating a logical image of a plurality of codewords which form a plurality of diagonal ECC frames and a physical arrangement of these codewords in the block of the magnetic domain wall memory.

FIG. 11 illustrates a relationship between a logical image of a plurality of codewords forming a plurality of diagonal ECC frames and a physical arrangement of these codewords in the block of the magnetic domain wall memory 3.

FIG. 11 illustrates a case where a physical storage region of the block includes a structure of 4 rows (4 layers)×4 columns (4 MMLs), for simplicity of explanation.

(A) of FIG. 11 illustrates a logical image of codewords forming the diagonal ECC frames arranged diagonally in the physical storage region of the block. Data portion (W1, X1, Y1, Z1), data portion (W2, X2, Y2, Z2), and data portion (W3, X3, Y3, Z3) are data to be written into the block. The encoding unit 26 of the memory controller 2 arranges data portion (W1, X1, Y1, Z1), data portion (W2, X2, Y2, Z2), and data portion (W3, X3, Y3, Z3) in the perpendicular direction (column direction), and generates two dimensional array data indicated in (A) of FIG. 11. W1, X1, Y1, and Z1 are data elements of the data portion arranged in the first row (Row1). W2, X2, Y2, and Z2 are data elements of the data portion arranged in the second row (Row2). W3, X3, Y3, and Z3 are data elements of the data portion arranged in the third row (Row3).

Furthermore, the encoding unit 26 encodes two dimensional array data column-by-column and generates 4 ECC frames (column ECC frames) C-1, C-2, C-3, and C-4 each including a codeword.

The codeword included in ECC frame C-1 includes data (W1, W2, and W3) and parity (WP), the codeword included in ECC frame C-2 includes data (X1, X2, and X3) and parity (XP), the codeword included in ECC frame C-3 includes data (Y1, Y2, and Y3) and parity (YP), and the codeword included in ECC frame C-4 includes data (Z1, Z2, and Z3) and parity (ZP).

(B) of FIG. 11 illustrates a physical arrangement of ECC frames C-1, C-2, C-3, and C-4 in the block of the magnetic domain wall memory 3.

In the data portion (W1, X1, Y1, and Z1) corresponding to the first row (Row1), the order of data elements N1, X1, Y1, and Z1 included in the data portion is maintained.

In the data portion (W2, X2, Y2, and Z2) corresponding to the second row (Row2), the order of data elements W2, X2, Y2, and Z2 is changed such that the data elements W2, X2, Y2, and Z2 included in the data portion are shifted to the right by one data element, and thus, the order of the data elements becomes Z2, W2, X2, and Y2.

In the data portion (W3, X3, Y3, and Z3) corresponding to the third row (Row3), the order of data elements W3, X3, Y3, and Z3 is changed such that the data elements W3, X3, Y3, and Z3 included in the data portion are shifted to the right by two data elements, and thus, the order of the data elements becomes Y3, Z3, W3, and X3.

The data portion corresponding to the fourth row (Row4) is a set of four parities corresponding to ECC frames C-1 to C-4. In the data portion (WP, XP, YP, and ZP), the order of data elements WP, XP, YP, and ZP is changed such that the data elements WP, XP, YP, and ZP included in the data portion are shifted to the right by three data elements, and thus, the order of the data elements becomes XP, YP, ZP, and WP.

The data portion corresponding to the first row (Row1), the reordered data portion corresponding to the second row (Row2), the reordered data portion corresponding to the third row (Row3), and the reordered data portion corresponding to the fourth row (Row4) are arranged in continuous layers (L4 to L1) on the physical storage region of the block as shown in (B) of FIG. 11. As a result, each of ECC frame C-1 (W1, W2, W3, WP), ECC frame C-2 (X1, X2, X3, XP), ECC frame C-3 (Y1, Y2, Y3, YP), and ECC frame C-4 (Z1, Z2, Z3, ZP) can be arranged diagonally in the physical storage region of the block. That is, the memory controller 2 stores W1, Z2, Y3, and XP into four locations corresponding to four layers (L4 to L1) in the magnetic memory line MML (MML1) corresponding to the first column (Col.1), stores X1, W2, Z3, and YP into four locations corresponding to four layers (L4 to L1) in the magnetic memory line MML (MML2) corresponding to the second column (Col.2), stores Y1, X2, W3, and ZP into four locations corresponding to four layers (L4 to L1) in the magnetic memory line MML (MML3) corresponding to the third column (Col.3), and stores Z1, Y2, X3, and WP into four locations corresponding to four layers (L4 to L1) in the magnetic memory line MML (MML4) corresponding to the fourth column (Col.4).

As can be understood from the above, the encoding unit 26 arranges each of ECC frames C-1 to C-4 diagonally in the physical storage region of the block, by regularly changing the order of four data elements included in each of the four data portions corresponding to the four layers (i.e., layers L4 to L1) such that magnetic memory lines MML (MML1, MML2, MML3, MML4) in which data elements belonging to the same ECC frame (that is, the same codeword) are stored are shifted between the four data portions corresponding to the four layers. Four MMLs (MML1 to MML4) correspond to four column locations, respectively.

(C) of FIG. 11 illustrates another example of the physical arrangement of ECC frames C-1, C-2, C-3, and C-4 in the block of the magnetic domain wall memory 3.

In (C) of FIG. 11, parity XP, parity YP, parity ZP, and parity WP are arranged in the uppermost layer L4 of the block. In that case, parity XP, parity YP, parity ZP, and parity WP are written into the block for the last, and thus, write of data to the block can be started without waiting for a calculation to obtain parity XP, parity YP, parity ZP, and parity WP. For example, the memory controller 2 writes data into the block in parallel to an encoding process to generate each ECC frame. The write of data into the block is performed in the order of data portion (W1, X1, Y1, Z1), data portion (Z2, W2, X2, and Y2), and data portion (Y3, Z3, W3, and X3). Then, after the calculation to obtain parity XP, parity YP, parity ZP, and parity WP is completed, parity XP, parity YP, parity ZP, and parity WP are written into the block.

Also in that case, ECC frame C-1 (W1, W2, W3, and WP), ECC frame C-2 (X1, X2, X3, and XP), ECC frame C-3 (Y1, Y2, Y3, and YP), and ECC frame C-4 (Z1, Z2, Z3, and ZP) can be each arranged diagonally in the physical storage region of the block.

Note that, in FIG. 11, a process of encoding two dimensional array data column-by-column to obtain each of BCC frames C-1 to C-4 and arranging each of ECC frames C-1 to C-4 diagonally in the physical storage region of the block has been described. However, each of ECC frames may be obtained by encoding the two dimensional array data row-by-row, and each of these ECC frames may be arranged diagonally in the physical storage region of the block.

Figure 12:
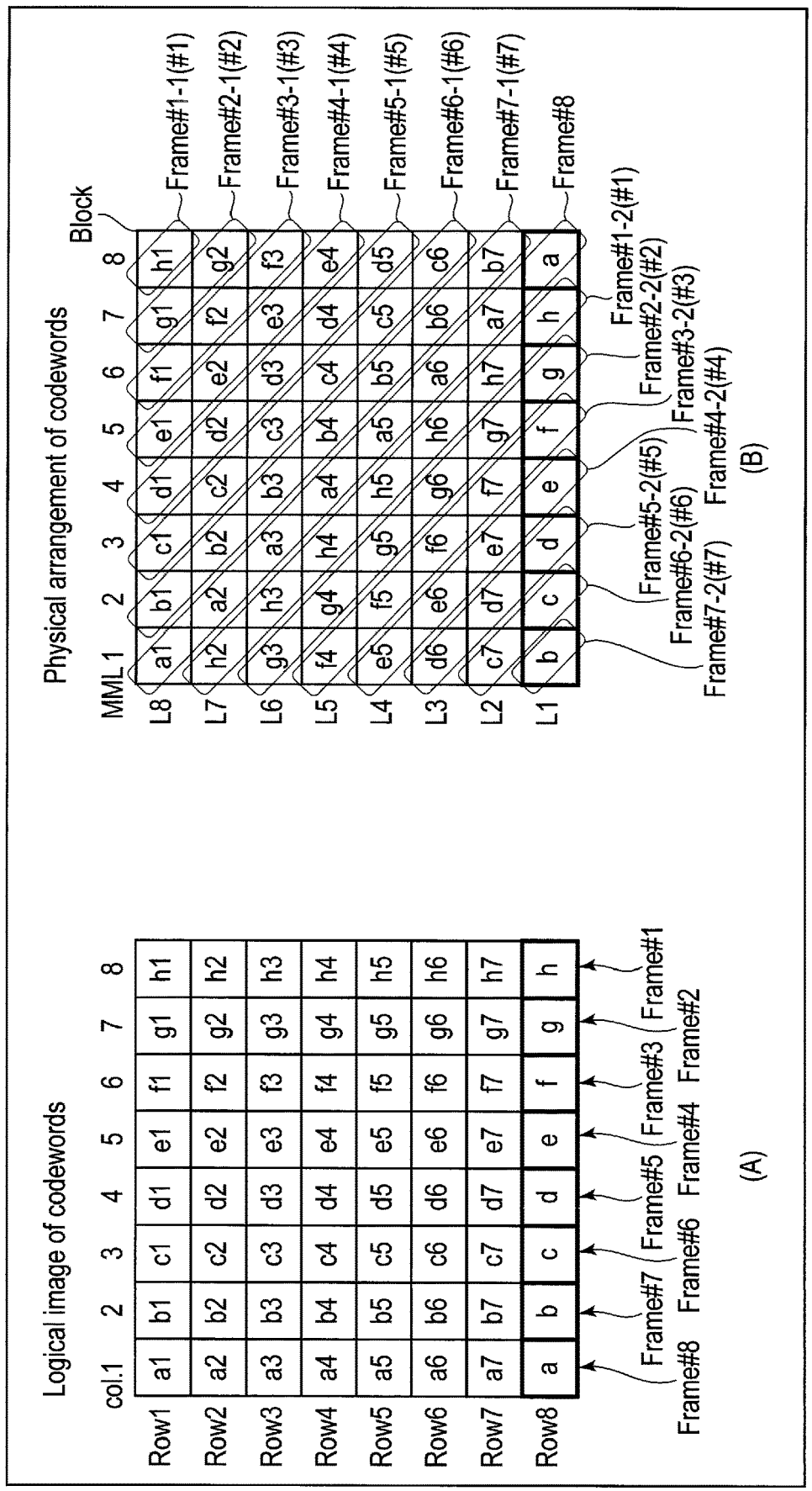
FIG. 12 is a diagram illustrating a structural example of diagonal ECC frames in a case where the block of the magnetic domain wall memory includes 8 MMLs×8 layers.

FIG. 12 illustrates a structural example of diagonal ECC frames in a case where the block of the magnetic domain wall memory 3 includes 8 MMLs×8 layers. In this example, a size of each diagonal ECC frame (frame length) is 8.

(A) of FIG. 12 illustrates a logical image of eight codewords corresponding to eight diagonal ECC frames (frames #1 to #8). (B) of FIG. 12 illustrates a physical arrangement of the eight diagonal ECC frames in the physical storage region of the block. In (B) of FIG. 12, one column corresponds to one magnetic memory line MML in the block, and one row corresponds to one layer in the block.

In FIG. 12, a set of data elements indicated by the same alphabet forms one diagonal ECC frame. Furthermore, data elements indicated with bold frames indicate data elements storing parities.

Eight diagonal ECC frames (frames #1 to #8) are formed such that various columns (various magnetic memory lines MML) are evenly included in each diagonal ECC frame and rows (cells) of various depths are evenly included in each diagonal ECC frame. Here, a depth of a specific row indicates the number of rows (layers) from a row corresponding to layer Ln to the specific row. For example, layer Ln is a row with 1 depth, and layer Ln-1 is a row with 2 depths, and layer L1 is a row with n depths.

As shown in (A) of FIG. 12, initially, two dimensional array data are encoded column-by-column, and eight ECC frames (frames #1 to #8) are generated. The ECC frames (frames #1 to #8) are ECC frames obtained by encoding two dimensional array data column-by-column (column ECC frames). However, since the ECC frames (frames #1 to #8) are used as ECC frames arranged diagonally in the block, they will be referred to as diagonal ECC frames in the following description.

Diagonal ECC frame (frame #1) includes one codeword containing data (h1, h2, h3, h4, h5, h6, and h7) and parity (h). Diagonal ECC frame (frame #2) one codeword containing data (g1, g2, g3, g4, g5, g6, and g7) and parity (g). Diagonal ECC frame (frame #3) one codeword containing data (f1, f2, f3, f4, f5, f6, and f7) and parity (f). Diagonal ECC frame (frame #4) one codeword containing data (e1, e2, e3, e4, e5, e6, and e7) and parity (e). Diagonal ECC frame (frame #5) one codeword containing data (d1, d2, d3, d4, d5, d6, and d7) and parity (d). Diagonal ECC frame (frame #6) one codeword containing data (c1, c2, c3, c4, c5, c6, and c7) and parity (c). Diagonal ECC frame (frame #7) one codeword containing data (b1, b2, b3, b4, b5, b6, and b7) and parity (b). Diagonal ECC frame (frame #8) one codeword containing data (a1, a2, a3, a4, a5, a6, and a7) and parity (a).

As shown in (B) of FIG. 12, eight diagonal ECC frames (frames #1 to #8) are each arranged diagonally in the physical storage region of the block. It will be understandable from (B) of FIG. 12 that a set of data elements represented by the same alphabet is arranged diagonally.

For example, codeword (a1, a2, a3, a4, a5, a6, a7, and a) of diagonal ECC frame (frame #8) is arranged along a diagonal line of the physical storage region of the block. Furthermore, for example, diagonal ECC frame (frame #1) includes diagonal frame element #1-1 and diagonal frame element #1-2. Diagonal frame element #1-1 is a frame element including many of upper layer side data, and in the example of (B) of FIG. 12, diagonal frame element #1-1 only includes data element h1 which is in the layer L8 of the magnetic memory line (MML8). Diagonal frame element #1-2 is a frame element including many of lower layer side data, and in the example of (B) of FIG. 12, diagonal frame element #1-2 includes seven data elements h2, h3, h4, h5, h6, h7, and h.

In (B) of FIG. 12, in eight diagonal ECC frames (frames #1 to #8), all columns (i.e., MML1 to MML8) are included in each diagonal ECC frame by one cell, and rows of all depths (i.e., L8 to L1) are included in each diagonal ECC frame.

Note that, FIG. 12 illustrates a case where a size of parity included in one codeword is one bit; however, in general, a size of parity included in one codeword is few bits or one or more bytes. In FIG. 12, each of 64 squares of 8×8 is one cell, and a size of parity included in one codeword is one bit. However, for example, the block may include 4096 squares (cells) of 64×64, and parity included in one codeword may be stored in a set of cells which has a size of one byte (eight cells).

A process to arrange each of eight diagonal ECC frames (frames #1 to #8) diagonally in the physical storage region of the block will be executed easily if, for example, data are rearranged per layer as follows.

In (A) of FIG. 12, data portion (a1, b1, c1, d1, e1, f1, g1, and h1) corresponding to the first row (Row1) is not rearranged. Data portion (a2, b2, c2, d2, e2, f2, g2, and h2)

corresponding to the second row (Row2) is rearranged as h2, a2, b2, c2, d2, e2, f2, and g2. Data portion (a3, b3, c3, d3, e3, f3, g3, and h3) corresponding to the third row (Row3) is rearranged as g3, h3, a3, b3, c3, d3, e3, and f3. Data portion (a4, b4, c4, d4, e4, f4, g4, and h4) corresponding to the fourth row (Row4) is rearranged as f4, g4, h4, a4, b4, c4, d4, and e4. Similarly, data portion (a, b, c, d, e, f, g, and h) corresponding to the eighth row (Row8) is rearranged as b, c, d, e, f, g, h, and a.

As can be understood from the above, eight diagonal ECC frames (frames #1 to #8) are each arranged diagonally in the physical storage region of the block as shown in (B) of FIG. 12 by regularly changing the order of data elements included in the data portion of each layer such that magnetic memory lines MML (i.e., MML1 to MML8) in which the data elements belonging to the same diagonal ECC frame (data elements indicated by the same alphabet) are stored are shifted between layers.

Features of such diagonal ECC frames (frames #1 to #8) can be represented by the following data arrangements.

Here, first and second MMLs (for example, MML1 corresponding to Col.1 and MML3 corresponding to Col.3) selected freely from the magnetic memory lines MML (MML1 to MML8) included in the block and first and second layers (for example, layer L8 corresponding to Row1 and layer L6 corresponding to Row3) selected freely from the layers L8 to L1 included in the block will be focused. As shown in (B) of FIG. 12, the memory controller 2 stores first data (a1 in this example) into a location (cell) corresponding to the first layer (layer L8 in this example) in the first MML (MML1 in this example), stores second data (g3 in this example) into a location corresponding to the second layer (layer L6 in this example) in the first MML (MML1 in this example), and stores third data (a3 in this example) into a location corresponding to the second layer (layer L6 in this example) in the second MML (MML3 in this example).

In that case, first ECC frame (ECC frame #8) includes the first data (a1) and the third data (a3), and the second data (g3) is included in second ECC frame (ECC frame #2) which is different from the first ECC frame (data arrangement feature 1).

Furthermore, the arrangement of diagonal ECC frames (frames #1 to #8) has the following feature. That is, the number of data (1 in this example) included in the first layer (layer L8) among data included in the first ECC frame (ECC frame #8) matches the number of data (1 in this example) included in the first layer (layer L8) among data included in the second ECC frame (ECC frame #2). The number of data (1 in this example) included in the second layer (layer L6) among data included in the first ECC frame (ECC frame #8) matches the number of data (1 in this example) included in the second layer (layer L6) among data included in the second ECC frame (ECC frame #2) (data arrangement feature 2).

Furthermore, the arrangement of diagonal ECC frames (frames #1 to #8) has the following feature. That is, the number of data (1 in this example) included in the first MML (MML1) among data included in the first ECC frame (ECC frame #8) matches the number of data (1 in this example) included in the firs MML (MML1) among data included in the second ECC frame (ECC frame #2). The number of data (1 in this example) included in the second MML (MML3) among data included in the first ECC frame (ECC frame #8) matches the number of data (1 in this example) included in the second MML (MML3) among data included in the second ECC frame (ECC frame #2 in this example) (data arrangement feature 3).

Figure 13:
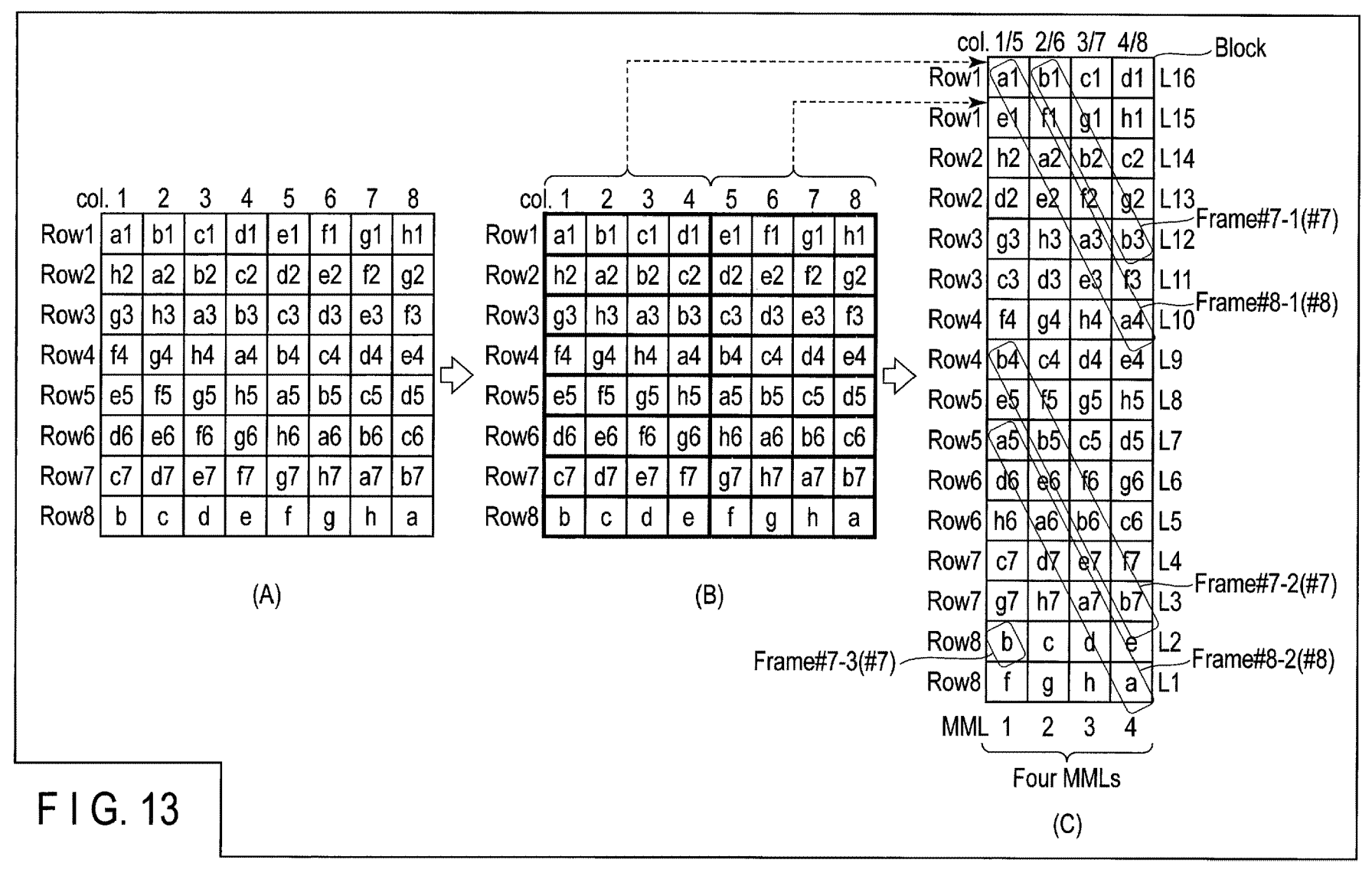

FIG. 13 illustrates a structural example of diagonal ECC frames in a case where the block of the magnetic domain wall memory 3 includes 4 MMLs×16 layers. In this example, a size of each diagonal ECC frame (frame length) is 8.

(A) of FIG. 13 illustrates a physical arrangement of eight diagonal ECC frames explained with reference to (B) of FIG. 12. A set of data elements indicated by the same alphabet forms one diagonal ECC frame.

Each of rows of data elements of 8×8 in (A) of FIG. 13 are divided, as shown in (B) of FIG. 13, into four data elements belonging to the first four columns and four data elements belonging to the remaining four columns. Then, as shown in (C) of FIG. 13, first four data elements (a1, b1, c1, and d1) of the first row (Row1) included in data elements of 8×8 are arranged in layer L16 of the physical storage region (4 MMLs×16 layers) of the block, and remaining four data elements (e1, f1, g1, and h1) of the first row (Row1) included in data elements of 8×8 are arranged in layer L15 of the physical storage regions (4 MMLs×16 layers). First four data elements (h2, a2, b2, and c2) of the second row (Row2) included in data elements of 8×8 are arranged in layer (L14) of the physical storage region (4 MMLs×16 layers) of the block, and remaining four data elements (d2, e2, f2, and g2) of the second row (Row2) included in data elements of 8×8 are arranged in layer (L13) of the physical storage regions (4 MMLs×16 layers). The arrangement goes on in a similar manner, and lastly, first four data elements (b, c, d, and e) of the eighth row (Row8) included in data elements of 8×8 are arranged in layer (L2) of the physical storage region (4 MMLs×16 layers) of the block, and remaining four data elements (f, g, h, and a) of the eighth row (Row8) included in data elements of 8×8 are arranged in layer (L1) of the physical storage regions (4 MMLs×16 layers).

In (C) of FIG. 13, each of the four magnetic memory lines MML1 to MML4 corresponds to the two columns in each of (A) and (B) of FIG. 13, and a pair of two layers corresponds to the one row in each of (A) and (B) of FIG. 13.

As a result, eight diagonal ECC frames (frames #1 to #8) are formed such that all MMLs (MML1 to MML4) are included in each diagonal ECC frame by two cells, and approximately half of the layers L16 to L1 of all depths are included evenly in each diagonal ECC frame. Thus, also such diagonal ECC frames (frames #1 to #8) have the data arrangement features 1, 2, and 3 as explained with reference to FIG. 12.

In the physical storage region (4 MMLs×16 layers), for example, a diagonal ECC frame (frame #8) formed of a set of data elements indicated by alphabet "a" includes a diagonal frame element #8-1 and a diagonal frame element #8-2. The diagonal frame element #8-1 includes many upper layer side data, and the diagonal frame element #8-2 includes many lower layer side data.

Diagonal frame element #8-1 includes data element "a1" stored in the layer L16 of the magnetic memory line MML1, data element "a2" stored in the layer L14 of the magnetic memory line MML2, data element "a3" stored in the layer L12 of the magnetic memory line MML3, and data element "a4" stored in the layer L10 of the magnetic memory line MML4.

Diagonal frame element #8-2 includes data element "a5" stored in the layer L7 of the magnetic memory line MML1, data element "a6" stored in the layer L5 of the magnetic memory line MML2, data element "a7" stored in the layer L3 of the magnetic memory line MML3, and data element "a" stored in the layer L1 of the magnetic memory line MML4.

Furthermore, a diagonal ECC frame (frame #7) formed of a set of data elements indicated by alphabet "b" includes a diagonal frame element #7-1, diagonal frame element #7-2, and diagonal frame element #7-3.

Diagonal frame element #7-1 includes data element "b1" stored in the layer L16 of the magnetic memory line MML2, data element "b2" stored in the layer L14 of the magnetic memory line MML3, and data element "b3" stored in the layer L12 of the magnetic memory line MML4.

Diagonal frame element #7-2 includes data element "b4" stored in the layer L9 of the magnetic memory line MML1, data element "b5" stored in the layer L7 of the magnetic memory line MML2, data element "b6" stored in the layer L5 of the magnetic memory line MML3, and data element "b7" stored in the layer L3 of the magnetic memory line MML4.

Diagonal frame element #7-3 includes only one data element "b" stored in the layer L2 of the magnetic memory line MML1.

Figure 14:
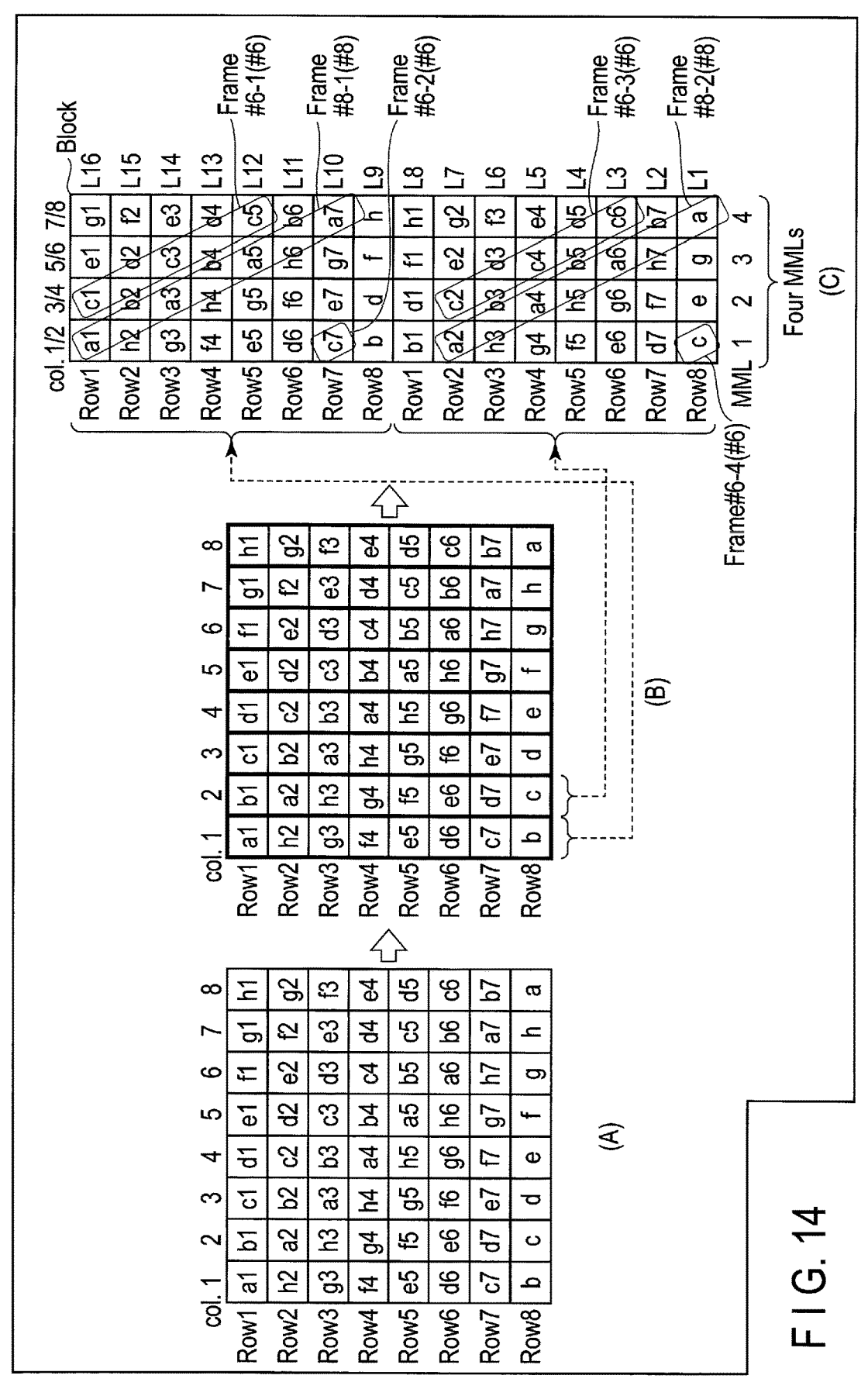

FIG. 14 illustrates another structural example of diagonal ECC frames in a case where the block of the magnetic domain wall memory 3 includes 4 MMLs×16 layers.

(A) of FIG. 14 illustrates a physical arrangement of eight diagonal ECC frames explained above with reference to (B) of FIG. 12. A set of data elements indicated by the same alphabet forms one diagonal BCC frame.

The data elements of 8×8 in (A) of FIG. 14 are divided into eight data portions corresponding to eight columns as shown in (B) of FIG. 14. Then, as shown in (C) of FIG. 14, data portion (a1, h2, g3, f4, e5, d6, c7, and b) of the first column (Col.1) included in data elements of 8×8 is arranged as upper eight data elements of the magnetic memory line MML1 of the physical storage region (4 MMLs×16 layers) of the block. Data portion (b1, a2, h3, g4, f5, e6, d7, and c) of the second column (Col.2) included in data elements of 8×8 is arranged as lower eight data elements of the magnetic memory line MML1 of the physical storage region (4 MMLs×16 layers) of the block, data portion (c1, b2, a3, h4, g5, f6, e7, and d) of the third column (Col.3) included in data elements of 8×8 is arranged as upper eight data elements of the magnetic memory line MML2 of the physical storage region (4 MMLs×16 layers) of the block, and data portion (d1, c2, b3, a4, h5, g6, f7, and e) of the fourth column (Col.4) included in data elements of 8×8 is arranged as lower eight data elements of the magnetic memory line MML2 of the physical storage region (4 MMLs×16 layers) of the block. The following data portions are arranged similarly, and data portion (g1, f2, e3, d4, c5, b6, a7, and h) of the seventh column (Col.7) included in data elements of 8×8 is arranged as upper eight data elements of the magnetic memory line MML4 of the physical storage region (4 MMLs×16 layers) of the block, and data portion (h1, g2, f3, e4, d5, c6, b7, and a) of the eighth column (Col.8) included in data elements of 8×8 is arranged as lower eight data elements of the magnetic memory line (MML4) of the physical storage region (4 MMLs×16 layers) of the block.

In (C) of FIG. 14, each of the four magnetic memory lines MML1 to MML4 corresponds to the two columns in each of (A) and (B) of FIG. 14, and a pair of two layers corresponds to the one row in each of (A) and (B) of FIG. 14.

As a result, eight diagonal ECC frames (frames #1 to #8) are formed such that all magnetic memory lines MML1 to MML4 are included in each diagonal ECC frame by two cells, and approximately half of the Layers L16 to L1 of all depths are included evenly in each diagonal ECC frame. Thus, also such diagonal ECC frames (frames #1 to #8) have the data arrangement features 1, 2, and 3 as explained with reference to FIG. 12.

In the physical storage region (4 MMLs×16 layers), for example, a diagonal ECC frame (frame #8) formed of a set of data elements indicated by alphabet "a" includes a diagonal frame element #8-1 including many upper layer side data and a diagonal frame element #8-2 including many lower layer side data.

Diagonal frame element #8-1 includes data element "a1" stored in the layer L16 of the magnetic memory line MML1, data element "a3" stored in the layer L14 of the magnetic memory line MML2, data element "a5" stored in the layer L12 of the magnetic memory line MML3, and data element "a7" stored in the layer L10 of the magnetic memory line MML4.

Diagonal frame element #8-2 includes data element "a2" stored in the layer L7 of the magnetic memory line MML1, data element "a4" stored in the layer L5 of the magnetic memory line MML2, data element "a6" stored in the layer L3 of the magnetic memory line MML3, and data element "a" stored in the layer L1 of the magnetic memory line MML4.

Furthermore, a diagonal ECC frame (frame #6) formed of a set of data elements indicated by alphabet "c" includes a diagonal frame element #6-1, diagonal frame element #6-2, diagonal frame element #6-3, and diagonal frame element #6-4.

Diagonal frame element #6-1 includes data element "c1" stored in the layer L16 of the magnetic memory line MML2, data element "c3" stored in the layer L14 of the magnetic memory line MML3, and data element "c5" stored in the layer L12 of the magnetic memory line MML4.

Diagonal frame element #6-2 includes only one data element "c7" stored in the layer L10 of the magnetic memory line MML1.

Diagonal frame element #6-3 includes data element "c2" stored in the layer L7 of the magnetic memory line MML2, data element "c4" stored in the layer L5 of the magnetic memory line MML3, and data element "c6" stored in the layer L3 of the magnetic memory line MML4.

Diagonal frame element #6-4 includes only one data element "c" stored in the layer L1 of the magnetic memory line MML1.

Figure 15:
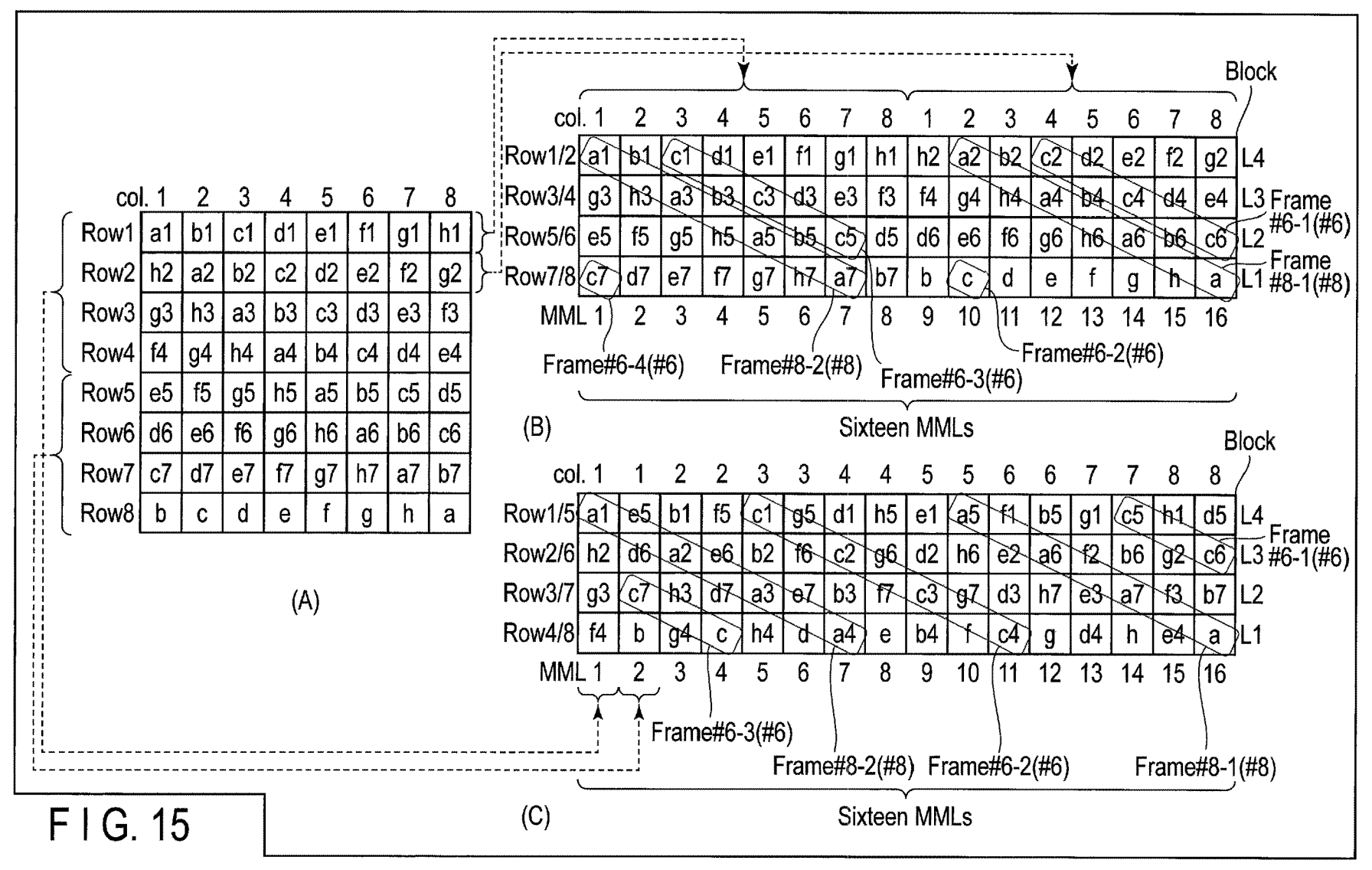

FIG. 15 illustrates two structural examples of diagonal ECC frames in a case where the block of the magnetic domain wall memory 3 includes 16 MMLs×4 layers.

(A) of FIG. 15 illustrates a physical arrangement of eight diagonal ECC frames explained above with reference to (B) of FIG. 12. A set of data elements indicated by the same alphabet forms one diagonal ECC frame.

The data elements of 8×8 in (A) of FIG. 15 are divided into eight data portions corresponding to eight rows. Then, as shown in (B) of FIG. 15, data portion (a1, b1, c1, d1, e1, f1, g1, and h1) of the first row (Row1) included in data elements of 8×8 is arranged as data elements of first eight columns (MML1 to MML8) of layer L4 of the physical storage region (16 MMLs×4 layers) of the block, and data portion (h2, a2, b2, c2, d2, e2, f2, and g2) of the second row (Row2) included in data elements of 8×8 is arranged as data elements of remaining eight columns (MML9 to MML16) of layer L4 of the physical storage region (16 MMLs×4 layers) of the block. The following data portions are arranged in a similar manner, and data portion (c7, d7, e7, f7, g7, h7, a7, and b7) of the seventh row (Row7) included in data elements of 8×8 is arranged as data elements of first eight columns (MML1 to MML8) of layer L1 of the physical storage region (16 MMLs×4 layers) of the block, and data portion (b, c, d, e, f, g, h, and a) of the eighth row (Row8) included in data elements of 8×8 is arranged as data elements of remaining eight columns (MML9 to MML 16) of layer L1 of the physical storage region (16 MMLs×4 layers) of the block.

As a result, eight diagonal ECC frames (frames #1 to #8) are formed such that approximately half of the magnetic memory lines MML1 to MML16 are included evenly in each diagonal ECC frame and layers L4 to L1 of all depths are included in each diagonal ECC frame by two cells. Thus, also such diagonal ECC frames (frames #1 to #8) have the data arrangement features 1 and 2 as explained with reference to FIG. 12.

In the physical storage region (16 MMLs×4 layers) of the block of (B) of FIG. 15, for example, a diagonal ECC frame (frame #8) formed of a set of data elements indicated by alphabet "a" includes a diagonal frame element #8-1 and a diagonal frame element #8-2.

Diagonal frame element #8-1 includes data element "a2" stored in layer L4 of magnetic memory line MML10, data element "a4" stored in layer L3 of magnetic memory line MML12, data element "a6" stored in layer L2 of magnetic memory line MML14, and data element "a" stored in layer L1 of magnetic memory line MML16.

Diagonal frame element #8-2 includes data element "a1" stored in layer L4 of magnetic memory line MML1, data element "a3" stored in layer L3 of magnetic memory line MML3, data element "a5" stored in layer L2 of magnetic memory line MML5, and data element "a7" stored in layer L1 of magnetic memory line MML7.

Furthermore, a diagonal ECC frame (frame #6) formed of a set of data elements indicated by alphabet "c" includes a diagonal frame element #6-1, diagonal frame element #6-2, diagonal frame element #6-3, and diagonal frame element #6-4.

Diagonal frame element #6-1 includes data element "c2" stored in layer L4 of magnetic memory line MML12, data element "c4" stored in layer L3 of magnetic memory line MML14, and data element "c6" stored in layer L2 of magnetic memory line MML16.

Diagonal frame element #6-2 includes only one data element "c" stored in layer L1 of magnetic memory line MML10.

Diagonal frame element #6-3 includes data element "c1" stored in layer L4 of magnetic memory line MML3, data element "c3" stored in layer L3 of magnetic memory line MML5, and data element "c5" stored in layer L2 of magnetic memory line MML7.

Diagonal frame element #6-4 includes only one data element "c7" stored in layer L1 of magnetic memory line MML1.

(C) of FIG. 15 illustrates another structural example of each diagonal ECC frame.

Each diagonal ECC frame of (C) of FIG. 15 is formed through the following process.

Each column of the data elements of 8×8 in (A) of FIG. 15 are divided into four data elements belonging to upper four rows and four data elements belonging to lower four rows. Then, as shown in (C) of FIG. 15, upper four data elements (a1, h2, g3, and f4) of the first column (Col.1) included in data elements of 8×8 are arranged in layers L4 to L1 of magnetic memory line MML1 of the physical storage region (16 MMLs×4 layers) of the block, and lower four data elements (e5, d6, c7, and b) of the first column (Col.1) included in data elements of 8×8 are arranged in layers L4 to L1 of magnetic memory line MML2 of the physical storage regions (16 MMLs×4 layers). Upper four data elements (b1, a2, h3, and g4) of the second column (Col.2) included in data elements of 8×8 are arranged in layers L4 to L1 of magnetic memory line MML3 of the physical storage region (16 MMLs×4 layers) of the block, and lower four data elements (f5, e6, d7, and c) of the second column (Col.2) included in data elements of 8×8 are arranged in layers L4 to L1 of magnetic memory line MML4 of the physical storage regions (16 MMLs×4 layers). The following data elements are arranged in a similar manner, and upper four data elements (h1, g2, f3, and e4) of the eighth column (Col.8) included in data elements of 8×8 are arranged in layers L4 to L1 of magnetic memory line MML15 of the physical storage region (16 MMLs×4 layers) of the block, and lower four data elements (d5, c6, b7, and a) of the eighth column (Col.8) included in data elements of 8×8 are arranged in layers L4 to L1 of magnetic memory line MML16 of the physical storage regions (16 MMLs×4 layers).

As a result, eight diagonal ECC frames (frames #1 to #8) are formed such that approximately half of the magnetic memory lines MML1 to MML16 are included evenly in each diagonal ECC frame and layers L4 to L1 of all depths are included in each diagonal ECC frame by two cells. Thus, also such diagonal ECC frames (frames #1 to #8) have the data arrangement features 1 and 2 as explained with reference to FIG. 12.

In the physical storage region (16 columns×4 rows) of the block of (C) of FIG. 15, for example, a diagonal ECC frame (frame #8) formed of a set of data elements indicated by alphabet "a" includes a diagonal frame element #8-1 and a diagonal frame element #8-2.

Diagonal frame element #8-1 includes data element "a5" stored in layer L4 of magnetic memory line MML10, data element "a6" stored in layer L3 of magnetic memory line MML12, data element "a7" stored in layer L2 of magnetic memory line MML14, and data element "a" stored in layer L1 of magnetic memory line MML16.

Diagonal frame element #8-2 includes data element "a1" stored in layer L4 of magnetic memory line MML1, data element "a2" stored in layer L3 of magnetic memory line MML3, data element "a3" stored in layer L2 of magnetic memory line MML5, and data element "a4" stored in layer L1 of magnetic memory line MML7.

Furthermore, a diagonal ECC frame (frame #6) formed of a set of data elements indicated by alphabet "c" includes a diagonal frame element #6-1, diagonal frame element #6-2, and diagonal frame element #6-3.

Diagonal frame element #6-1 includes data element "c5" stored in layer L4 of magnetic memory line MML14, and data element "c6" stored in layer L3 of magnetic memory line MML16.

Diagonal frame element #6-2 includes data element "c1" stored in layer L4 of magnetic memory line MML5, data element "c2" stored in layer L3 of magnetic memory line MML7, data element "c3" stored in layer L2 of magnetic memory line MML9, and data element "c4" stored in layer L1 of magnetic memory line MML11.

Diagonal frame element #6-3 includes data element "c7" stored in layer L2 of magnetic memory line MML2, and data element "c" stored in layer L1 of magnetic memory line MML4.

Figure 16:
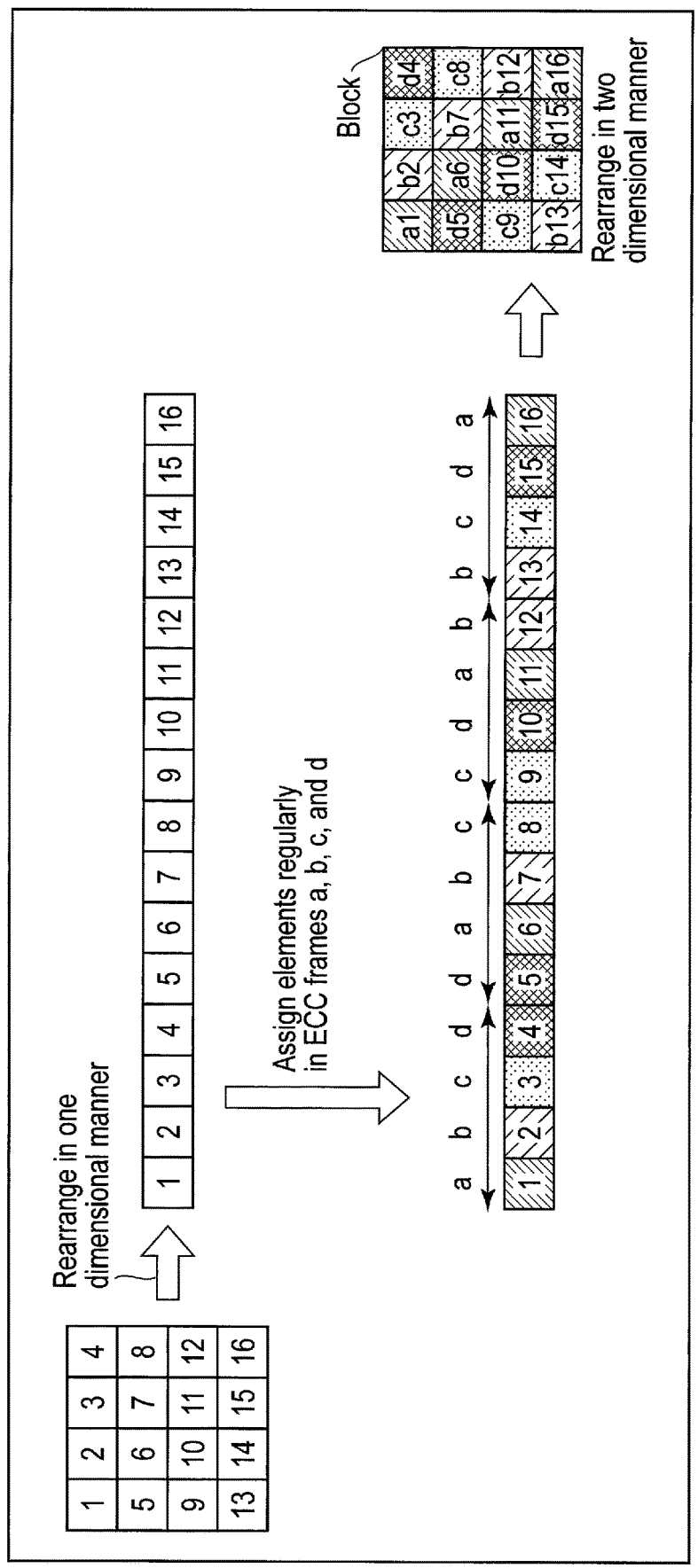
FIG. 16 is a diagram illustrating a process in which two dimensional array data to be stored in the block of the magnetic domain wall memory is rearranged in a one dimensional data sequence, data elements in the one dimensional data sequence are regularly assigned to diagonal ECC frames, and the one dimensional data sequence is rearranged in the two dimensional array data.

FIG. 16 is a diagram illustrating a process in which two dimensional array data to be stored in the block of the magnetic domain wall memory 3 are rearranged in a one dimensional data sequence, data elements in the one dimensional data sequence are regularly assigned to diagonal ECC frames, and the one dimensional data sequence is rearranged in the two dimensional array data.

In this example, the block includes a structure of 4 MMLs×4 layers (=4 columns×4 rows).

Data elements of 4×4 to be stored in the block are rearranged into a one dimensional data sequence. Then, data elements in the one dimensional data sequence are regularly assigned to diagonal ECC frames (in this example, four diagonal ECC frames a, b, c, and d).

In FIG. 16, as to first four data elements "1", "2", "3", and "4", data element "1" is assigned to diagonal ECC frame a, data element "2" is assigned to diagonal ECC frame b, data element "3" is assigned to diagonal ECC frame c, and data element "4" is assigned to diagonal ECC frame d.

As to the following four data elements "5", "6", "7", and "8", data element "5" is assigned to diagonal ECC frame d, data element "6" is assigned to diagonal ECC frame a, data element "7" is assigned to diagonal ECC frame b, and data element "8" is assigned to diagonal ECC frame c.

As to the following four data elements "9", "10", "11", and "12", data element "9" is assigned to diagonal ECC frame c, data element "10" is assigned to diagonal ECC frame d, data element "11" is assigned to diagonal ECC frame a, and data element "12" is assigned to diagonal ECC frame b.

The data elements assigned to the same diagonal ECC frame form one codeword. Then, one dimensional data sequence ("1", "2", "3", "4", "5", "6", "7", "8", "9", "10", "11", "12", "13", "14", "15", and "16") is rearranged into two dimensional array data and stored in the block of the magnetic domain wall memory 3. Thus, each of diagonal ECC frames a, b, c, and d can be arranged diagonally in the physical storage region of the block.

Figure 17:
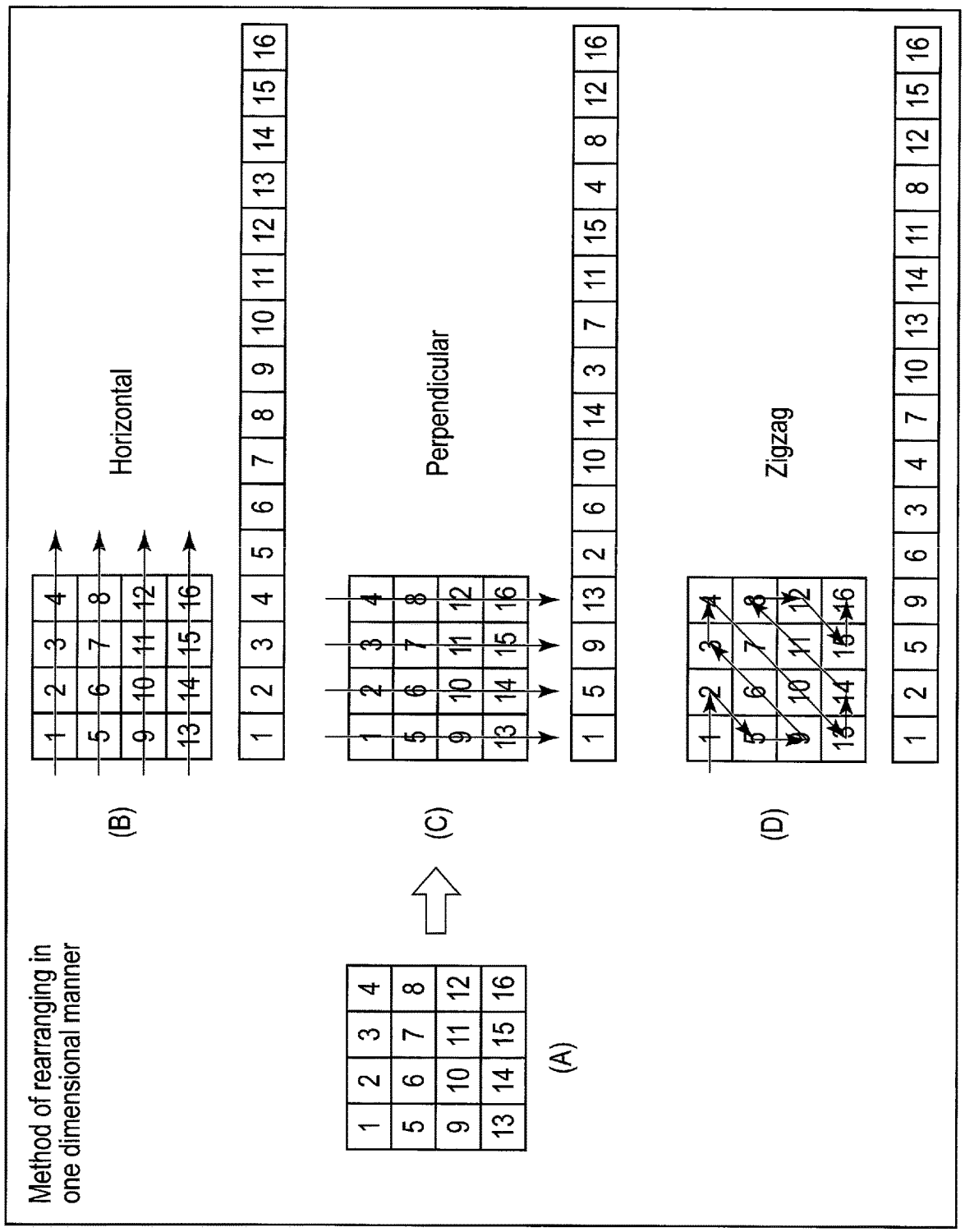
FIG. 17 is a diagram illustrating an example of a process of rearranging two dimensional array data to one dimensional data sequence.

FIG. 17 is a diagram illustrating an example of a process of rearranging two dimensional array data to one dimensional data sequence.

(B) of FIG. 17 illustrates a method in which two dimensional array data (data elements of 4×4 in this example) of (A) of FIG. 17 are scanned horizontally to be rearranged into one dimensional data sequence ("1", "2", "3", "4", "5", "6", "7", "8", "9", "10", "11", "12", "13", "14", "15", and "16").

(C) of FIG. 17 illustrates a method in which two dimensional array data (data elements of 4×4 in this example) of (A) of FIG. 17 are scanned vertically to be rearranged into one dimensional data sequence ("1", "5", "9", "13", "2", "6", "10", "14", "3", "7", "11", "15", "4", "8", "12", and "16").

(D) of FIG. 17 illustrates a method in which two dimensional array data (data elements of 4×4 in this example) of (A) of FIG. 17 are scanned in a zigzag manner to be rearranged into one dimensional data sequence ("1", "2", "5", "9", "6", "3", "4", "7", "10", "13", "14", "11", "8", "12", "15", and "16").

Figure 18:
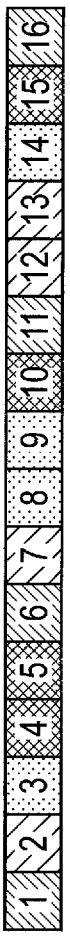
FIG. 18 is a diagram illustrating an example of a process in which data elements included in one dimensional data sequence are regularly assigned to diagonal ECC frames.
Figure 18:
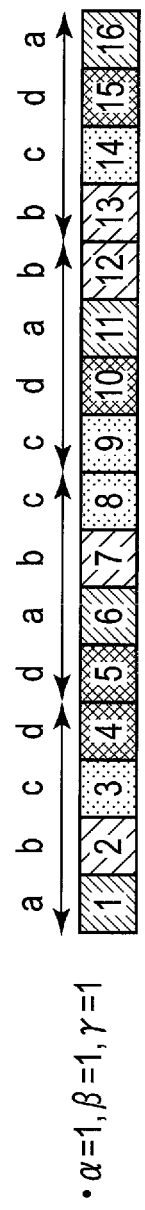
Figure 18:
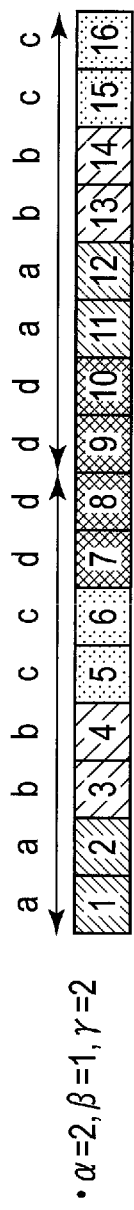
Figure 18:
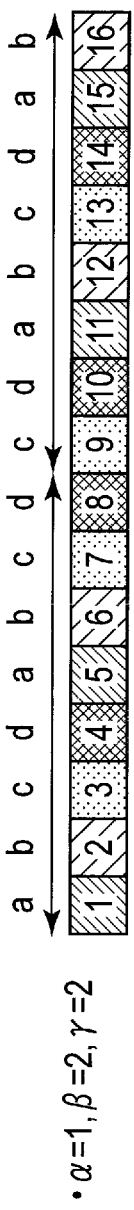
Figure 18:
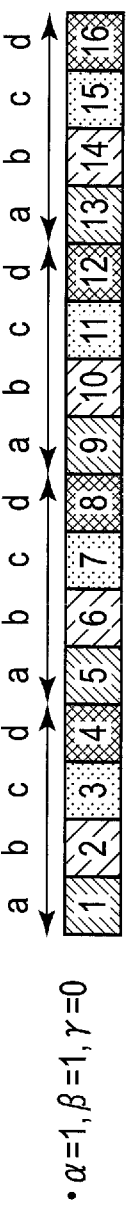

FIG. 18 is a diagram illustrating an example of a process in which data elements included in the one dimensional data sequence are regularly assigned to diagonal ECC frames.

In this example, data elements ("1", "2", "3", "4", "5", "6", "7", "8", "9", "10", "11", "12", "13", "14", "15", and "16") are regularly assigned to four diagonal ECC frames a, b, c, and d.

This process can be executed using three parameters ($\alpha$, $\beta$, and $\gamma$). In this example, a indicates for how many elements the same ECC frame is continued, p indicates how many times the same pattern is repeated before shifting, and $\gamma$ indicates for how many elements the shifting is performed.

(1) Case where $\alpha=1$, $\beta=1$, and $\gamma=1$

In that case, pattern (a, b, c, and d), pattern (d, a, b, and c), pattern (c, d, a, and b), and pattern (b, c, d, and a) are applied to the data elements ("1", "2", "3", "4", "5", "6", "7", "8", "9", "10", "11", "12", "13", "14", "15", and "16").

As a result, as to first four data elements "1", "2", "3", and "4", the data element "1" is assigned to diagonal ECC frame a, the data element "2" is assigned to diagonal ECC frame b, the data element "3" is assigned to diagonal ECC frame c, and the data element "4" is assigned to diagonal ECC frame d.

As to the following four data elements "5", "6", "7", and "8", the data element "5" is assigned to diagonal ECC frame d, the data element "6" is assigned to diagonal ECC frame a, the data element "7" is assigned to diagonal ECC frame b, and the data element "8" is assigned to diagonal ECC frame c.

As to the following four data elements "9", "10", "11", and "12", the data element "9" is assigned to diagonal ECC frame c, the data element "10" is assigned to diagonal ECC frame d, the data element "11" is assigned to diagonal ECC frame a, and the data element "12" is assigned to diagonal ECC frame b.

(2) Case where $\alpha=2$, $\beta=1$, and $\gamma=2$

In that case, pattern (a, a, b, b, c, c, d, and d) and pattern (d, d, a, a, b, b, c, and c) are applied to the data elements ("1", "2", "3", "4", "5", "6", "7", "8", "9", "10", "11", "12", "13", "14", "15", and "16").

As a result, as to first eight data elements "1", "2", "3", "4", "5", "6", "7", and "8", the data elements "1" and "2" are assigned to diagonal ECC frame a, the data elements "3" and "4" are assigned to diagonal ECC frame b, the data elements "5" and "6" are assigned to diagonal ECC frame c, and the data elements "7" and "8" are assigned to diagonal ECC frame d.

As to the following eight data elements "9", "10", "11", "12", "13", "14", "15", and "16", the data elements "9" and "10" are assigned to diagonal ECC frame d, the data elements "11" and "12" are assigned to diagonal ECC frame a, the data elements "13" and "14" are assigned to diagonal ECC frame b, and the data elements "15" and "16" are assigned to diagonal ECC frame c.

(3) Case where $\alpha=1$, $\beta=2$, and $\gamma=2$

In that case, pattern (a, b, c, d, a, b, c, and d) and pattern (c, d, a, b, c, d, a, and b) are applied to the data elements ("1", "2", "3", "4", "5", "6", "7", "8", "9", "10", "11", "12", "13", "14", "15", and "16").

As a result, as to first eight data elements "1", "2", "3", "4", "5", "6", "7", and "8", the data elements "1" and "5" are assigned to diagonal ECC frame a, the data elements "2" and "6" are assigned to diagonal ECC frame b, the data elements "3" and "7" are assigned to diagonal ECC frame c, and the data elements "4" and "8" are assigned to diagonal ECC frame d.

As to the following eight data elements "9", "10", "11", "12", "13", "14", "15", and "16", the data elements "9" and "13" are assigned to diagonal ECC frame c, data elements "10" and "14" are assigned to diagonal ECC frame d, the data elements "11" and "15" are assigned to diagonal ECC frame a, and the data elements "12" and "16" are assigned to diagonal ECC frame b.

(4) Case where $\alpha=1$, $\beta=1$, and $\gamma=0$ In that case, pattern (a, b, c, and d), pattern (a, b, c, and d), pattern (a, b, c, and d), and pattern (a, b, c, and d) are applied to the data elements ("1", "2", "3", "4", "5", "6", "7", "8", "9", "10", "11", "12", "13", "14", "15", and "16").

Figure 19:
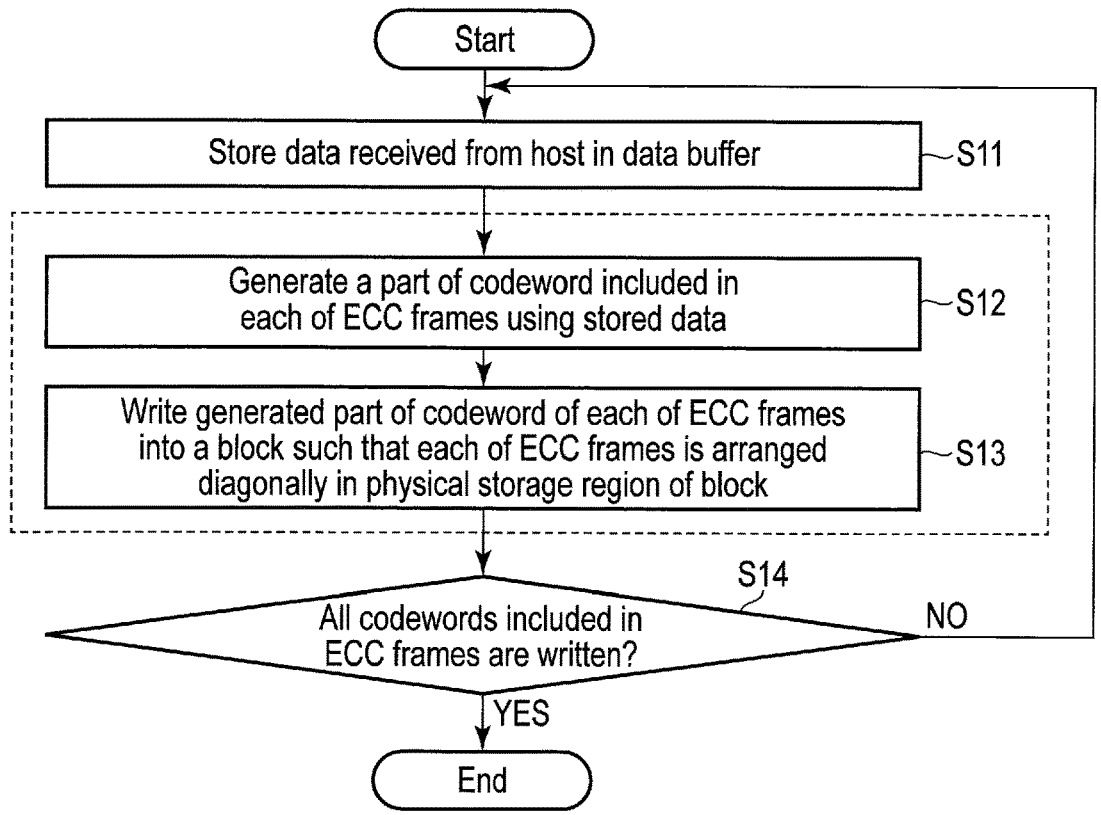
FIG. 19 is a flowchart illustrating a procedure of a write process executed by the memory system.

FIG. 19 is a flowchart illustrating a procedure of a write process executed by the memory system 1.

When the memory controller 2 receives a write request from the host 4, the memory controller 2 starts a write process indicated in the flowchart of FIG. 19.

Write of data into the block of the magnetic domain wall memory 3 may be started after a size of data received from the host 4 becomes one block size; however, as described above, in a case where the data arrangement which can store parities in the upper layer side of the block (for example, uppermost layer Ln) is used, write of data into the block can be performed in parallel to both a process to receive data from the host 4 and a process to encode the received data for each of ECC frames. In the following description, the write process in the latter case will be explained.

The memory controller 2 receives, from the host 4, data associated with the write request received from the host 4, and stores the data into the data buffer 25 (step S11).

The memory controller 2 generates a part of a codeword included in each of ECC frames using the data stored in the data buffer 25 (step S12). In step S12, the encoding unit 26 executes a process of encoding the data stored in the data buffer 25. In the encoding process, a process of calculating parity for each of ECC frames is executed. The codeword includes data (information symbol sequence) and parity (ECC), and thus, the part of codeword is the information symbol or the parity.

Since the parity of the codeword corresponding to each ECC frame may be written into the block last, write of data into the block can be started without waiting for completion of calculation of the parity. Thus, the memory controller 2 writes, in parallel to the encoding process, a part of the codeword of each ECC frame (here, data, i.e., information symbol sequence) into the block (step S13). In step S13, the memory controller 2 writes the generated part of codeword of each ECC frame into the block such that each of ECC frames is arranged diagonally in the physical storage region of the block.

The memory controller 2 determines whether or not all codewords included in the ECC frames are written into the block (step S14). Steps S11 to S13 are repeated until all codewords included in the ECC frames are written into the block.

When the parity of codeword corresponding to each ECC frame is calculated by the encoding unit 26, the parity of the codeword corresponding to each ECC frame is generated in step S12, as a part of the codeword included in each of the ECC frames. Then, in step S13, the memory controller 2 writes the parity into the block.

If all codewords included in the ECC frames are written into the block (YES in step S14), the write process ends.

As a result of write process, each of the ECC frames is arranged diagonally in the physical storage region of the block such that upper layer side data and lower layer side data having different error rates are included evenly in each of the ECC frames, and burst errors occurring along the magnetic memory lines MML are spread evenly over the ECC frames.

Note that data may be written into the block after data of one block size is accumulated in the data buffer 25. In that case, a location of the parity of each codeword is not limited, and the parity of each codeword can be written into any location in the physical storage region of the block.

Figure 20:
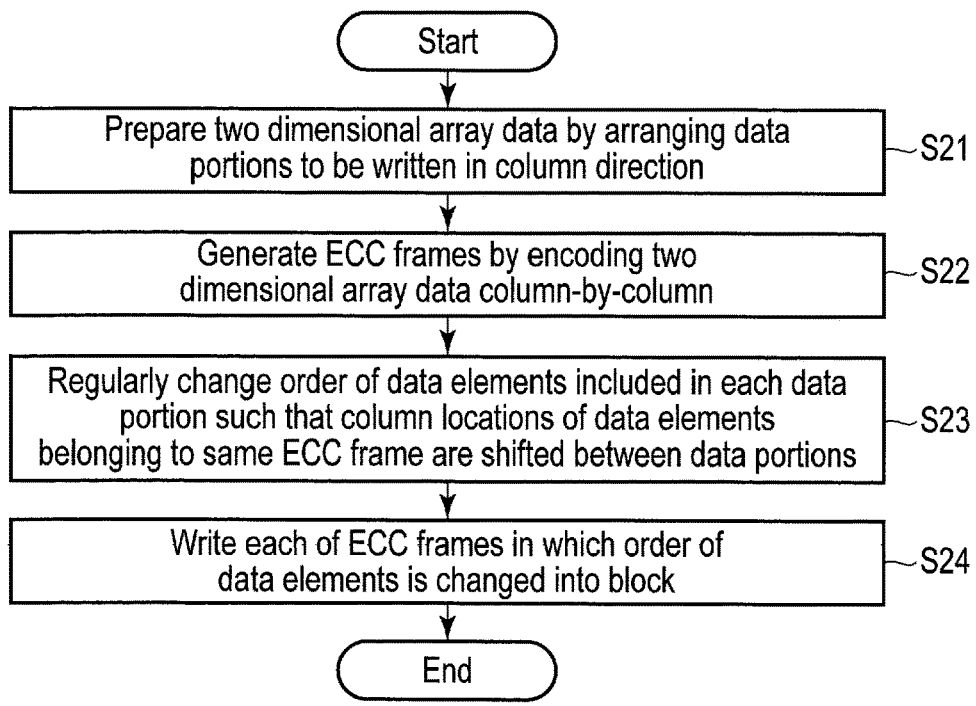
FIG. 20 is a flowchart illustrating a procedure of a process of arranging each of diagonal ECC frames diagonally in a physical storage region of the block of the magnetic domain wall memory.

FIG. 20 is a flowchart illustrating a process of arranging each of diagonal ECC frames diagonally in the physical storage region of the block of the magnetic domain wall memory 3.

Processes of steps S21 and S22 of FIG. 20 are executed in step S12 of FIG. 19, and processes of steps S23 and S24 of FIG. 20 are executed in step S13 of FIG. 19.

The memory controller 2 generates two dimensional array data by arranging data portions to be written into the block in a perpendicular direction (column direction) (step S21). Each of the data portions has, for example, a size of one layer.

The memory controller 2 encodes the two dimensional array data column-by-column using the encoding unit 26 and generates ECC frames each including a codeword (step S22).

The memory controller 2 regularly changes the order of data elements included in each of the data portions such that column locations of data elements belonging to the same ECC frame are shifted between the data portions arranged in the column direction (perpendicular direction) (step S23).

Then, the memory controller 2 writes each of the data portions into the block, and thereby arranges each of the ECC frames diagonally in the physical storage region of the block (step S24). Since various columns (various magnetic memory lines MML) are evenly included in each ECC frame (diagonal ECC frame) arranged diagonally, burst errors occurring along the columns (magnetic memory lines MML) can be spread evenly over the ECC frames. Furthermore, since rows (cells) of various depths are evenly included in each ECC frame (diagonal ECC frame), upper layer side data and lower layer side data having different error rates are evenly included in each of the ECC frames.

Figure 21:
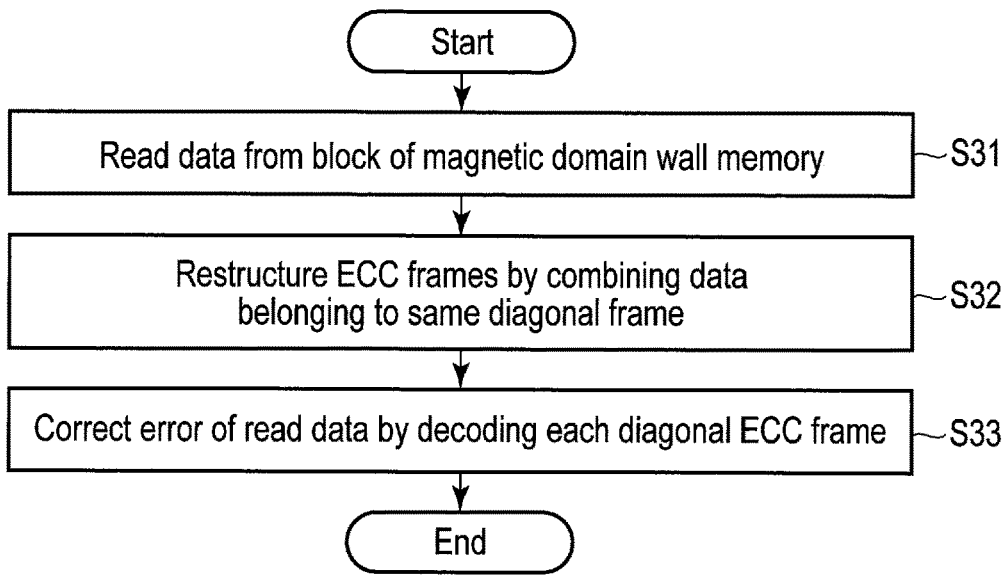
FIG. 21 is a flowchart illustrating a procedure of a decoding process using diagonal ECC frames.

FIG. 21 is a flowchart illustrating a procedure of a decoding process using the diagonal ECC frames.

The memory controller 2 sequentially reads data (data of block size) stored in layers L1 to Ln of the block, from the magnetic domain wall memory 3 (step S31). The reading of the data is performed in units of data having a certain data size.

The memory controller 2 restructures diagonal ECC frames by combining data belonging to the same diagonal ECC frame (step S32).

The memory controller 2 corrects an error included in the data of block size read from the magnetic domain wall memory 3 by decoding each of the restructured diagonal ECC frames (step S33).

As explained above, according to the first embodiment, the following data arrangement is realized. That is, first data is stored in a location corresponding to a first layer of a first magnetic memory line MML (data storing shift string), second data is stored in a location corresponding to a second layer of the first magnetic memory line MML, and third data is stored in a location corresponding to the second layer of a second magnetic memory line MML. In this case, the first data and the third data are included in a first ECC frame, and the second data is included in a second ECC frame which is different from the first ECC frame.

Since the ECC frames are formed as above, the first ECC frame is laid over different magnetic memory lines MML, and the second data and the third data which are included in the same layer are included in different ECC frames.

For example, as explained above with reference to FIG. 10, each of ECC frames (for example, frames #1 to #8) is arranged diagonally in the physical storage region of the block of the magnetic domain wall memory 3 such that upper layer side data and lower layer side data having different error rates are evenly included in each of ECC frames (for example, frames #1 to #8), and burst errors occurring along the magnetic memory lines MML are spread evenly over the ECC frames (for example, frames #1 to #8).

Each ECC frame (diagonal ECC frame) includes the upper layer side data and the lower layer side data evenly. Thus, even if there is a bias that the error rate increases in lower layers, the number of errors included in the diagonal ECC frames can be even. Furthermore, each ECC frame (diagonal ECC frame) includes a plurality of columns (a plurality of magnetic memory lines MML) evenly. Thus, burst errors occurring along the columns (magnetic memory lines MML) can be spread over the diagonal ECC frames, and thus, the number of errors included in the diagonal ECC frames can be even.

As can be understood from the above, the structure of the diagonal ECC frames of the first embodiment can achieve an advantage of column ECC frames of FIG. 9 and an advantage of row ECC frames of FIG. 10. Thus, in the magnetic domain wall memory 3 in which an error rate tends to increase in lower side layers and burst errors tends to occur magnetic memory lines MML, reliability of data stored in the magnetic domain wall memory 3 can be improved.

Second Embodiment

Next, a structure in which a product code which is a combination of a row ECC frame (first type error correction code frame) and a diagonal ECC frame (second type error correction code frame) is used will be described as a second embodiment.

The hardware structure of the memory system 1 of the second embodiment is the same as that of FIG. 1, and the structure of the magnetic domain wall memory 3 used in the memory system 1 of the second embodiment is the same as that of the first embodiment. In the following description, parts different from the first embodiment will be mainly explained.

Figure 22:
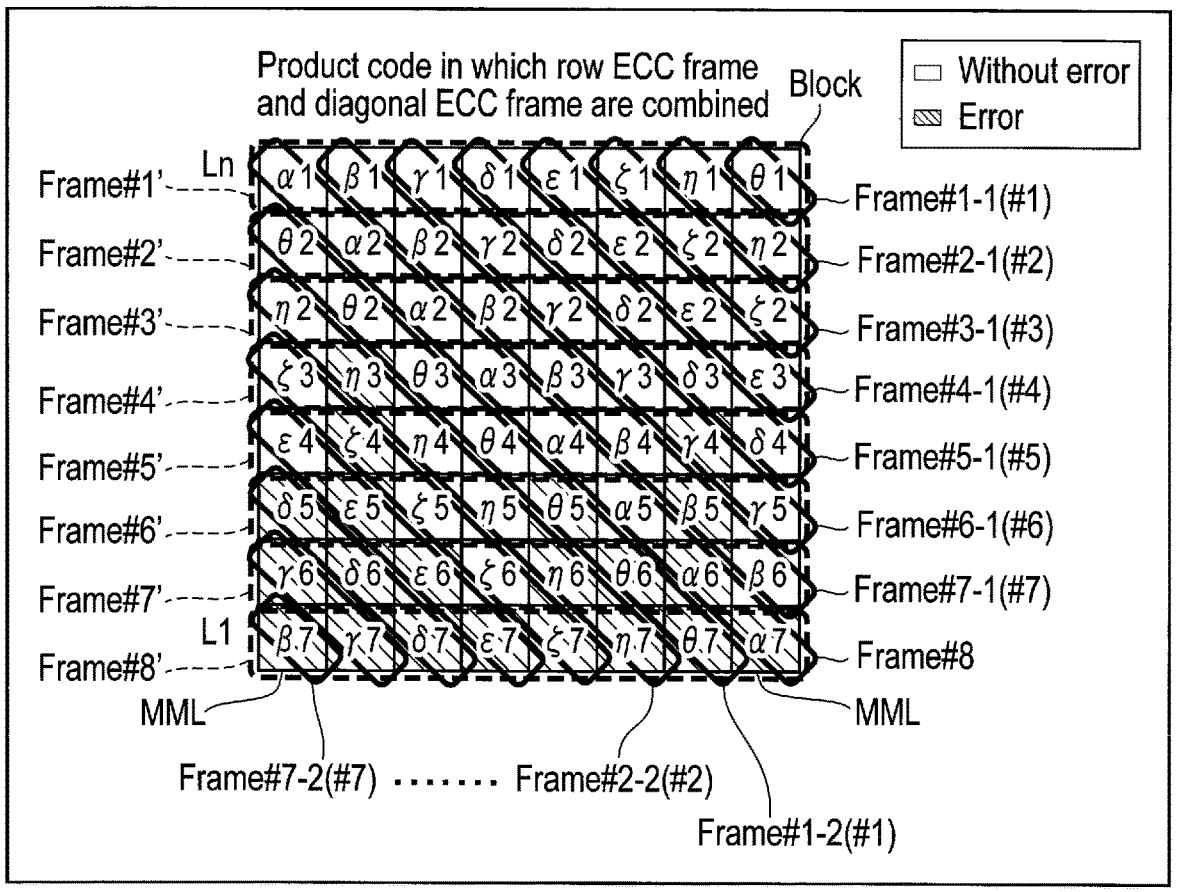
FIG. 22 is a diagram illustrating a structural example of a product code in which a row ECC frame and a diagonal ECC frame are combined, which is used in a memory system of a second embodiment.

FIG. 22 is a diagram illustrating a structural example of the product code of the combination of the row ECC frame and the diagonal ECC frame used in the memory system 1 of the second embodiment.

In FIG. 22, similarly to the first embodiment, diagonal ECC frames (for example, frames #1 to #8) are each arranged diagonally in the physical storage region of the block of the magnetic domain wall memory 3. FIG. 22 illustrates a case where one block includes eight magnetic memory lines MML and eight layers.

That is, each of diagonal ECC frames (for example, frames #1 to #8) is arranged diagonally in the physical storage region of the block of the magnetic domain wall memory 3 such that upper layer side data and lower layer side data having different error rates are evenly included in each of the plural diagonal ECC frames (for example, frames #1 to #8), and burst errors occurring along the magnetic memory lines MML are spread over the plural diagonal ECC frames (for example, frames #1 to #8). The structure of each of the diagonal ECC frames (frames #1 to #8) is the same as that of the first embodiment.

In FIG. 22, in order to reduce latency in the data read process, row ECC frames (for example, frames #1' to #8') are further arranged in the row direction in the physical storage region of the block of the magnetic domain wall memory 3. These row ECC frames #1' to #8' have the same frame size. For example, one row ECC frame has a size corresponding to one or more layers of the block of the magnetic domain wall memory 3. FIG. 22 illustrates an example where the one row ECC frame is formed of one layer. A set of data elements represented by the same alphabet forms one diagonal ECC frame, and a set of data elements represented by the same numeral forms one row ECC frame.

Note that, in FIG. 22, for example, data elements represented by "1" (that is, data elements represented by "α1" to "θ1") are a set of data elements included in the row ECC frame #1'. Furthermore, a set of data elements represented by the same Greek character forms one diagonal ECC frame. For example, data elements represented by "θ" (that is, data elements represented by "θ1" to "θ7") are a set of data elements included in the diagonal ECC frame #1.

The memory controller 2 encodes data to be written to the block using the product code which is a combination of a first code and a second code, and writes, into the block, encoded data of a combination of first ECC frames each including a codeword of the first code and second ECC frames each including a codeword of the second. In this case, ECC frames each including the codeword of the first code are arranged in the row direction in the physical storage region of the block, and are used as row ECC frames #1' to #8'. ECC frames each including the codeword of the second code are arranged in the diagonal direction in the physical storage region of the block, and are used as diagonal ECC frames #1 to #8.

The first code is, for example, a code to encode data to be written into the block in the row direction (C1 code). The second code is, for example, a code to encode the data to be written into the block in the column direction (C2 code).

Figure 23:
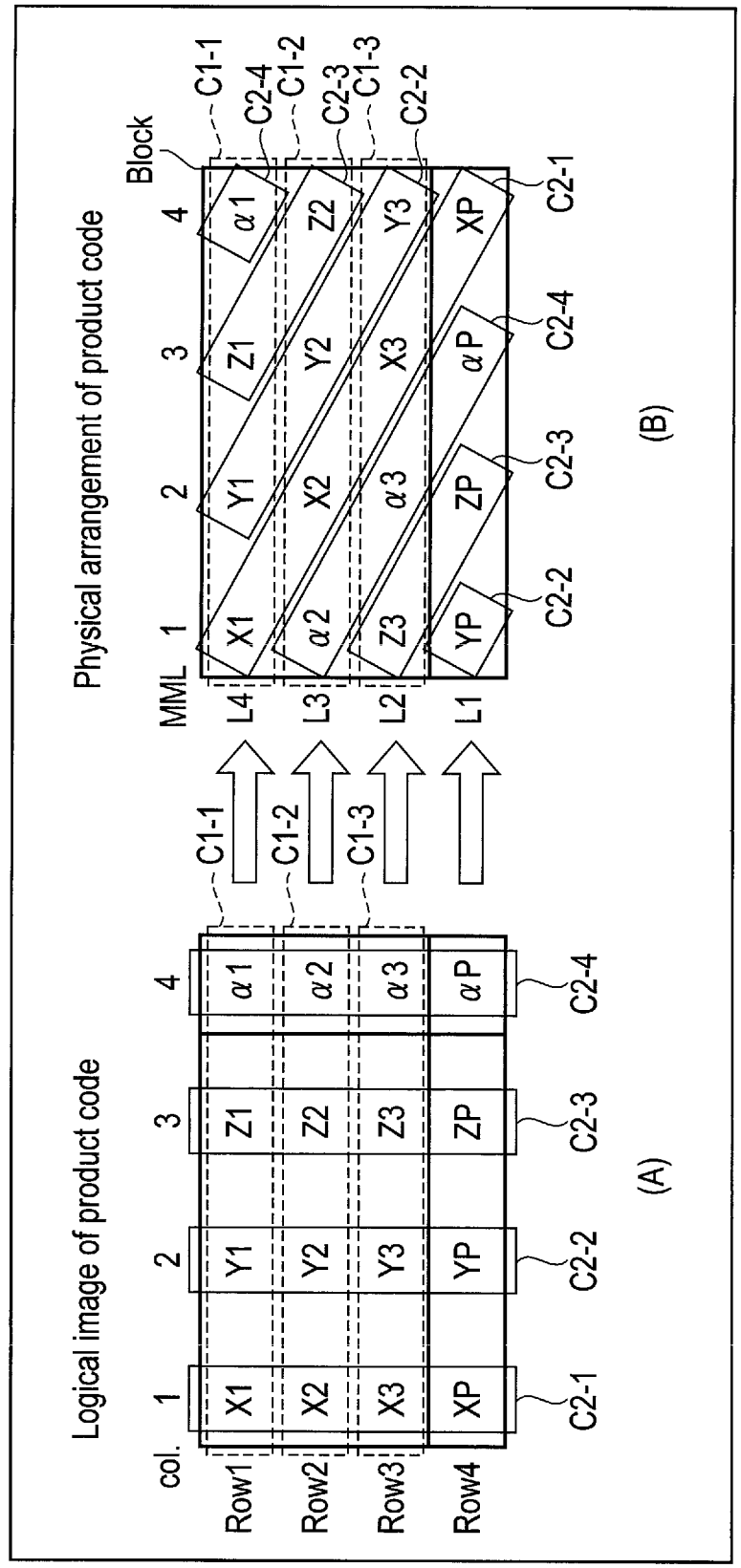
FIG. 23 is a diagram illustrating a relationship between a logical image of the product code and a physical arrangement of the product code in the block of the magnetic domain wall memory.

FIG. 23 is a diagram illustrating a relationship between a logical image of the product code and a physical arrangement of the product code in the block of the magnetic domain wall memory 3.

In FIG. 23, for simplicity of explanation, a case where the physical storage region of the block includes a 4×4 structure is illustrated.

(A) of FIG. 23 illustrates a logical image of the product code used to form row ECC frames and diagonal ECC frames. Data portion (X1, Y1, Z1), data portion (X2, Y2, Z2), and data portion (X3, Y3, Z3) are data (user data) to be written into the block in accordance with a write request from the host 4. The encoding unit 26 of the memory controller 2 arranges data portion (X1, Y1, Z1), data portion (X2, Y2, Z2), and data portion (X3, Y3, Z3) in the perpendicular direction (column direction), and thereby generates two dimensional array data indicated in (A) of FIG. 23. X1, Y1, and Z1 are data elements of the data portion arranged in the first row (Row1). X2, Y2, and Z2 are data elements of the data portion arranged in the second row (Row2). X3, Y3, and Z3 are data elements of the data portion arranged in the third row (Row3).

Furthermore, the encoding unit 26 encodes two dimensional array data using the product code in which the first code (C1 code) to encode the two dimensional array data row-by-row and the second code (C2 code) to encode the two dimensional array data column-by-column are combined, and generates encoded data in which ECC frames C1-1, C1-2, and C1-3 each including a codeword of C1 code and ECC frames C2-1, C2-2, C2-3, and C2-4 each including a codeword of C2 code are combined.

The following description will be directed to an example of the product code, in which the ECC frame of the C1 code and the ECC frame of the C2 code have the same frame size, but the ECC frame of the C1 code and the ECC frame of the C2 code may be different from each other in frame size. For example, the frame size of one of the ECC frame of the C1 code and the ECC frame of the C2 code may be twice as large as the other one of these.

The order of the encoding by C1 code and the encoding by C2 code is not limited. The encoding by C1 code may be performed first and then the encoding by C2 code may be performed, or the encoding by C2 code may be performed first and then the encoding by C1 code may be performed. For example, in a case where the encoding by C1 code is performed first and then the encoding by C2 code is performed, encoded data corresponding to each layer can be obtained first by the encoding by C1 code. Thus, write of data into the block can be started early. Hereinafter, a case where the encoding by C1 code is performed first and then the encoding by C2 code is performed will be explained.

The codeword included in ECC frame C1-1 includes data (X1, Y1, and Z1) and parity ($\alpha$1), the codeword included in ECC frame C1-2 includes data (X2, Y2, and Z2) and parity (a2), and the codeword included in ECC frame C1-3 includes data (X3, Y3, and Z3) and parity (a3).

The codeword included in ECC frame C2-1 includes data (X1, X2, and X3) and parity (XP), the codeword included in ECC frame C2-2 includes data (Y1, Y2, and Y3) and parity (YP), and the codeword included in ECC frame C2-3 includes data (Z3, Z2, and Z3) and parity (ZP). The codeword included in ECC frame C2-4 is a codeword obtained by encoding parities ($\alpha$1, $\alpha$2, and $\alpha$3), and includes parities ($\alpha$1, $\alpha$2, and $\alpha$3) and parity ($\alpha$P) corresponding to parities ($\alpha$1, $\alpha$2, and $\alpha$3).

(B) of FIG. 23 illustrates a physical arrangement of ECC frames C1-1 to C1-3 and ECC frames C2-1 to C2-4 in the block of the magnetic domain wall memory 3.

One of the group of ECC frames C1-1 to 01-3 and the group of ECC frames C2-1 to C2-4 is arranged in the row direction in the physical storage region of the block of the magnetic domain wall memory 3, and used as row ECC frames.

The other of the group of ECC frames C1-1 to C1-3 and the group of ECC frames C2-1 to C2-4 is arranged in the diagonal direction in the physical storage region of the block of the magnetic domain wall memory 3, and used as diagonal ECC frames.

Hereinafter, although it is not limited thereto, a case where ECC frames C1-1 to C1-3 are used as row ECC frames, and ECC frames C2-1 to C2-4 are used as diagonal ECC frames is used to explain a physical arrangement of ECC frames C1-1 to C1-3 and ECC frames C2-1 to C2-4 in the block of the magnetic domain wall memory 3.

As to data portion (X1, Y1, Z1, and $\alpha$1) corresponding to the first row (Row1), the order of data elements X1, Y1, Z1, and $\alpha$1 included in the data portion is maintained.

As to data portion (X2, Y2, Z2, and a2) corresponding to the second row (Row2), the order of data elements X2, Y2, Z2, and $\alpha$2 included in the data portion is shifted to the right by one data element. Thus, the order becomes $\alpha$2, X2, Y2, and Z2.

As to data portion (X3, Y3, Z3, and a3) corresponding to the third row (Row3), the order of data elements X3, Y3, Z3, and a3 included in the data portion is shifted to the right by two data elements. Thus, the order becomes Z3, a3, X3, and Y3.

As to data portion (XP, YP, ZP, and aP) corresponding to the fourth row (Row4), the order of data elements XP, YP, ZP, and $\alpha$P included in the data portion is shifted to the right by three data elements. Thus, the order becomes YP, ZP, $\alpha$P, and XP.

The data portion corresponding to the first row (Row1), reordered data portion corresponding to the second row (Row2), reordered data portion corresponding to the third row (Row3), and reordered data portion corresponding to the fourth row (Row4) are arranged in continuous layers L4 to L1 of the block as shown in (B) of FIG. 23. As a result, each of ECC frames C1-1 to C1-3 can be arranged in the row direction in the physical storage region of the block, and each of ECC frame C2-1 (X1, X2, X3, and XP), ECC frame C2-2 (Y1, Y2, Y3, and YP), ECC frame C2-3 (Z1, Z2, Z3, and ZP), and ECC frame C2-4 ($\alpha$1, $\alpha$2, $\alpha$3, and $\alpha$P) can be arranged in the diagonal direction in the physical storage region of the block. That is, the memory controller 2 stores X1, $\alpha$2, Z3, and YP into four locations corresponding to four layers L4 to L1 in the magnetic memory line MML1 corresponding to the first column (Col.1), respectively, stores Y1, X2, a3, and ZP into four locations corresponding to four layers L4 to L1 in the magnetic memory line MML2 corresponding to the second column (Col.2), respectively, stores Z1, Y2, X3, and $\alpha$P into four locations corresponding to four layers L4 to L1 in the magnetic memory line MML3 corresponding to the third column (Col.3), respectively, and stores $\alpha$1, Z2, X3, and XP into four locations corresponding to four layers L4 to L1 in the magnetic memory line MML4 corresponding to the fourth column (Col.4), respectively.

In FIG. 23, as explained above with reference to (C) of FIG. 11, parity YP, parity ZP, parity $\alpha$P, and parity XP of diagonal ECC frames C2-1 to C2-4 may be stored in the uppermost layer (L4 in this example) of the block. In that case, write into the block is executed in the order of data portion (X1, Y1, Z1, and $\alpha$1), data portion (a2, X2, Y2, and Z2), data portion (Z3, a3, X3, and Y3), and parity portion (YP, ZP, $\alpha$P, and XP). Thus, the data portion (X1, Y1, Z1, and $\alpha$1) initially written is stored in the lowermost layer L1 of the block, and the parity portion (YP, ZP, $\alpha$P, and XP) lastly written is stored in the uppermost layer L4 of the block.

Figure 24:
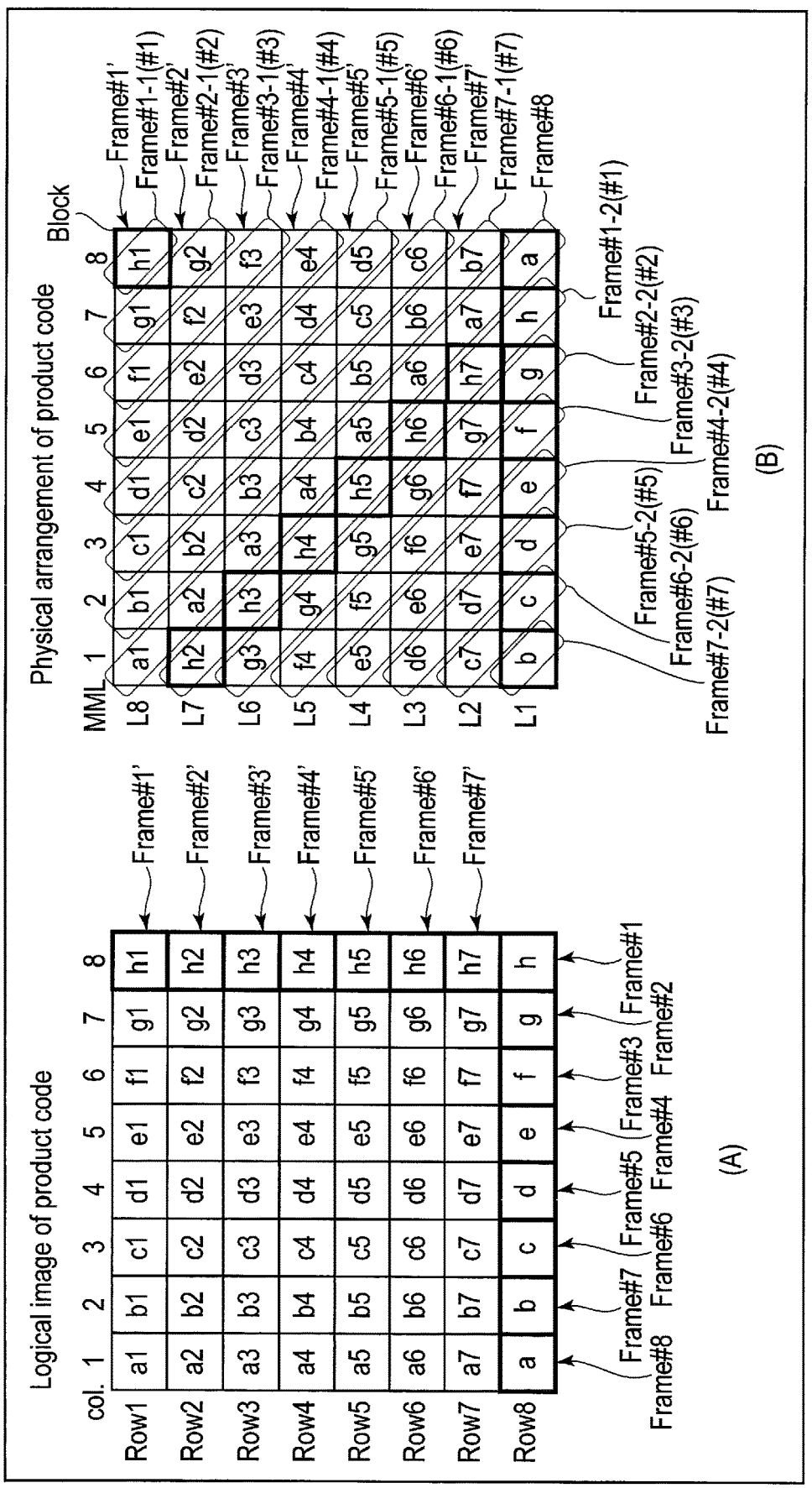
FIG. 24 is a diagram illustrating a structural example of ECC frames (row ECC frames and diagonal ECC frames) of the product code in a case where the block of the magnetic domain wall memory is structured as 8 MMLs×8 layers.

FIG. 24 is a diagram illustrating a structural example of ECC frames (row ECC frames and diagonal ECC frames) of the product code in a case where the block of the magnetic domain wall memory 3 is structured as 8 MMLs×8 layers. In this example, a case where a size of each row ECC frame (frame length) is 8, and a size of each diagonal ECC frame (frame length) is 8 is illustrated.

In FIG. 24, a set of data elements represented by the same numeral forms one row ECC frame. For example, data elements represented by "1" (that is, data elements represented by "$\alpha$1" to "h1") are a set of data elements included in row ECC frame #1'. Furthermore, a set of data elements represented by the same alphabet forms one diagonal ECC frame. For example, data elements represented by "h" (that is, data elements represented by "h1" to "h7" and "h") are a set of data elements included in diagonal ECC frame #1.

(A) of FIG. 24 illustrates a logical image of seven codewords corresponding to seven row ECC frames (frames #1' to #7') and eight codewords corresponding to eight diagonal ECC frames (frames #1 to #8).

(B) of FIG. 24 illustrates a physical arrangement of seven row ECC frames (frames #1 to #7) and eight diagonal ECC frames (frames #1 to #8) in the physical storage region of the block. In (B) of FIG. 24, one column corresponds to one magnetic memory line MML in the block, and one row corresponds to one layer in the block.

In FIG. 24, a set of data elements represented by the same numeral forms one row ECC frame, and a set of data elements represented by the same alphabet forms one diagonal ECC frame. Furthermore, a data element indicated with a bold frame is a data element to store parity. Note that, in each ECC frame, as long as the parity is stored in any one data element of the data elements in the ECC frame, a physical location of the data element to store the parity is not limited.

As shown in (B) of FIG. 24, seven row ECC frames (frames #1' to #7') are arranged in the layers L8 to L2 of the block, respectively.

Eight diagonal ECC frames (frames #1 to #8) are formed such that various columns (various magnetic memory lines MML) are included evenly in each diagonal ECC frame, and layers (cells) with various depths are included evenly in each diagonal ECC frame. Eight diagonal ECC frames (frames #1 to #8) have data arrangement features 1, 2, and 3 as in the first embodiment.

As shown in (A) of FIG. 24, initially, two dimensional array data are encoded row-by-row, and thus, seven row ECC frames (frames #1' to #7') are generated.

Row ECC frame (frame #1') includes one codeword containing data (a1, b1, c1, d1, e1, f1, and g1) and parity (h1). Row ECC frame (frame #2') includes one codeword containing data (a2, b2, c2, d2, e2, f2, and g2) and parity (h2). Row ECC frame (frame #3') includes one codeword containing data (a3, b3, c3, d3, e3, f3, and g3) and parity (h3). Row ECC frame (frame #4') includes one codeword containing data (a4, b4, c4, d4, e4, f4, and g4) and parity (h4). Row ECC frame (frame #5') includes one codeword containing data (a5, b5, c5, d5, e5, f5, and g5) and parity (h5). Row ECC frame (frame #6') includes one codeword containing data (a6, b6, c6, d6, e6, 56, and g6) and parity (h6). Row ECC frame (frame #7') includes one codeword containing data ($\alpha$7, b7, c7, d7, e7, f7, and g7) and parity (h7).

Then, the encoded two dimensional array data are encoded column-by-column, and thus, eight ECC frames (frames #1 to #8) are generated. These ECC frames (frames #1 to #8) are ECC frames obtained by encoding the encoded two dimensional array data column-by-column (column ECC frames). However, since these ECC frames (frames #1 to #8) are used as ECC frames arranged diagonally in the block, they will be referred to as diagonal ECC frames.

Diagonal ECC frame (frame #1) includes one codeword containing data (h1, h2, h3, h4, h5, h6, and h7) and parity (h). Diagonal ECC frame (frame #2) includes one codeword containing data (g1, g2, g3, g4, g5, g6, and g7) and parity (g). Diagonal ECC frame (frame #3) includes one codeword containing data (f1, f2, f3, f4, f5, f6, and f7) and parity (f). Diagonal ECC frame (frame #4) includes one codeword containing data (e1, e2, e3, e4, e5, e6, and e7) and parity (e). Diagonal ECC frame (frame #5) includes one codeword containing data (d1, d2, d3, d4, d5, d6, and d7) and parity (d). Diagonal ECC frame (frame #6) includes one codeword containing data (c1, c2, c3, c4, c5, c6, and c7) and parity (c). Diagonal ECC frame (frame #7) includes one codeword containing data (b1, b2, b3, b4, b5, b6, and b7) and parity (b). Diagonal ECC frame (frame #8) includes one codeword containing data (a1, a2, a3, a4, a5, a6, and a7) and parity (a).

As shown in (B) of FIG. 24, seven row ECC frames (frames #1' to #7') are each arranged in the row direction in the physical storage region of the block, and eight diagonal ECC frames (frames #1 to #8) are each arranged diagonally in the physical storage region of the block. It will be understandable from (B) of FIG. 24 that a set of data elements represented by the same numeral is arranged in the row direction, and a set of data elements represented by the same alphabet is arranged diagonally.

For example, the codeword (a1, a2, a3, a4, a5, a6, a7, and a) of the diagonal ECC frame (frame #8) is arranged along a diagonal line of the physical storage region of the block.

Furthermore, diagonal ECC frame (frame #1) includes diagonal frame element #1-1 and diagonal frame element #1-2. Diagonal frame element #1-1 is a frame element including many of upper layer side data, and in the example of (B) of FIG. 24, diagonal frame element #1-1 includes only one data element "h1" stored in layer L8 of magnetic memory line MML8. Diagonal frame element #1-2 is a frame element including many of lower layer side data, and in the example of (B) of FIG. 24, diagonal frame element #1-2 includes seven data elements "h2", "h3", "h4", "h5", "h6", "h7", and "h".

A process to arrange each of eight diagonal ECC frames (frames #1 to #8) diagonally in the physical storage region of the block will be executed easily if, for example, data portions corresponding to rows are rearranged as follows.

In (A) of FIG. 24, data portion (a1, b1, c1, d1, e1, f1, g1, and h1) corresponding to the first row (Row1) is not rearranged. Data portion (a2, b2, c2, d2, e2, f2, g2, and h2) corresponding to the second row (Row2) is rearranged as h2, a2, b2, c2, d2, e2, f2, and g2. Data portion (a3, b3, c3, d3, e3, f3, g3, and h3) corresponding to the third row (Row3) is rearranged as g3, h3, a3, b3, c3, d3, e3, and f3. Data portion (a4, b4, c4, d4, e4, f4, g4, and h4) corresponding to the fourth row (Row4) is rearranged as f4, g4, h4, a4, b4, c4, d4, and e4. Similarly, data portion (a, b, c, d, e, f, g, and h) corresponding to the eighth row (Row8) is rearranged as b, c, d, e, f, g, h, and a.

As can be understood from the above, seven row ECC frames (frame #1' to #7') are each arranged in the row direction in the physical storage region of the block, and eight diagonal ECC frames (frames #1 to #8) are each arranged diagonally in the physical storage region of the block as shown in (B) of FIG. 24 by regularly changing the order of data elements included in the data portion of each layer such that magnetic memory lines MML in which the data elements belonging to the same diagonal ECC frame (data elements indicated by the same alphabet) are stored are shifted between the data portions corresponding to layers (L8 to L1).

Here, first and second MMLs (for example, MML1 and MML3) selected freely from the magnetic memory lines MML included in the block and first and second layers (for example, layer L8 and layer L3) selected freely from the layers will be focused. As shown in (B) of FIG. 24, the memory controller 2 stores first data ($\alpha$1 in this example) into a location (cell) corresponding to the first layer (layer L8 in this example) in the first MML (MML1 in this example), stores second data (g3 in this example) into a location corresponding to the second layer (layer L6 in this example) in the first MML (MML1 in this example), stores third data ($\alpha$3 in this example) into a location corresponding to the second layer (layer L6 in this example) in the second MML (MML3 in this example), and stores fourth data ($\alpha$1 in this example) into a location corresponding to the first layer (layer L8 in this example) in the second MML (MML3 in this example).

In this case, a first diagonal ECC frame (ECC frame #8) includes the first data ($\alpha$1) and the third data ($\alpha$3), and the second data (g3) is included in a second diagonal ECC frame (ECC frame #2) which is different from the first diagonal ECC frame (data arrangement feature 1).

Furthermore, a first row ECC frame (ECC frame #1') includes the first data ($\alpha$1) and the fourth data (c1), and a second row ECC frame (ECC frame #3') includes the second data (g3) and the third data ($\alpha$3). That is, the first data (a1) is commonly included in both the first diagonal ECC frame (ECC frame #8) and the first row ECC frame (ECC frame

1'), the second data (g3) is commonly included in both the second diagonal ECC frame (ECC frame #2) and the second row ECC frame (ECC frame #3'), and the third data (a3) is commonly included in both the first diagonal ECC frame (ECC frame #8) and the second row ECC frame (ECC frame #3').

Note that, if the first row ECC frame (ECC frame #1') is formed of, for example, three or more layers, the second data (g3) and the third data (a3) are also included in the first row ECC frame (ECC frame #1').

Figure 25:
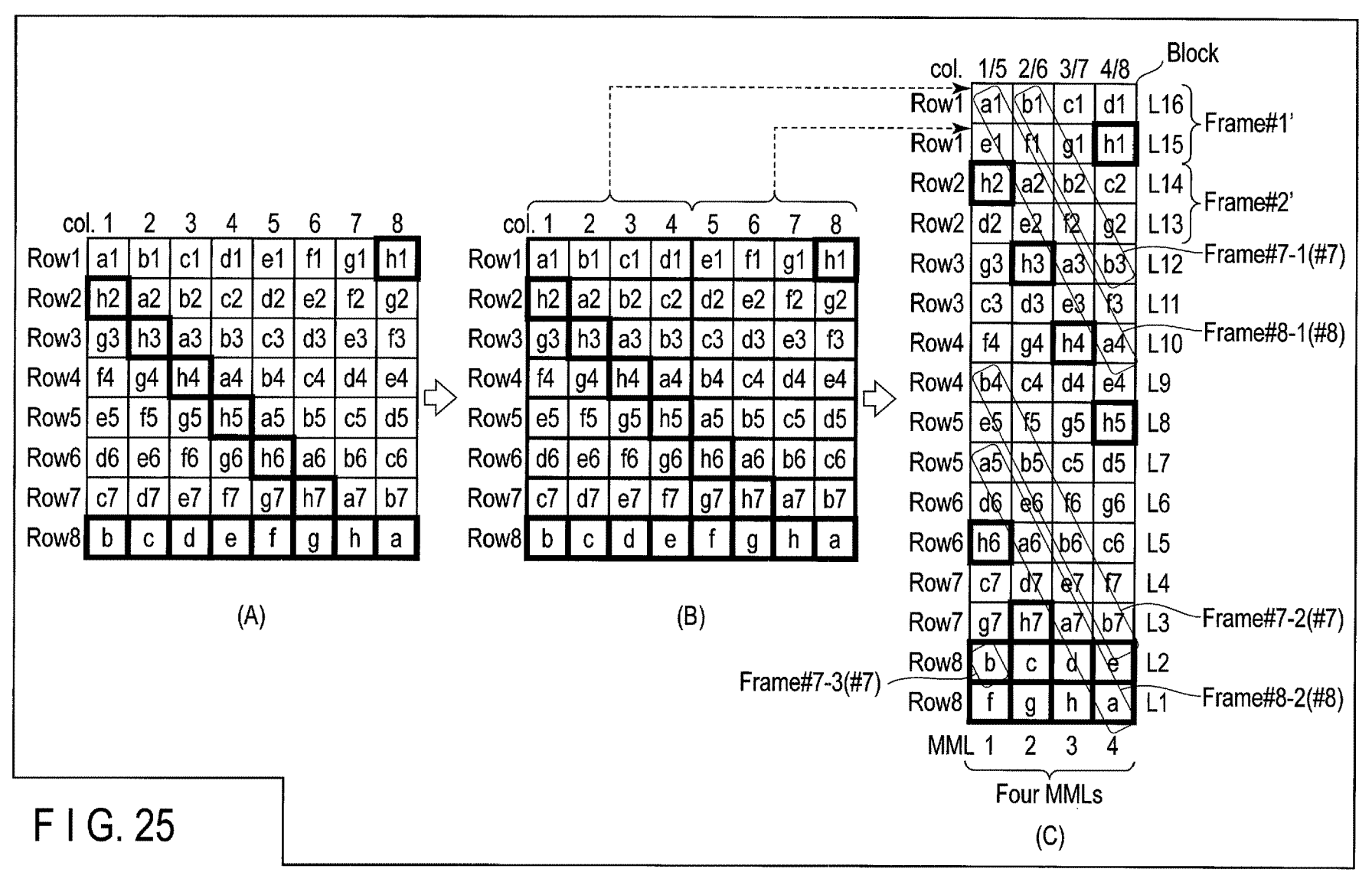

FIG. 25 is a diagram illustrating a structural example of ECC frames (row ECC frames and diagonal ECC frames) of the product code in a case where the block of the magnetic domain wall memory 3 is structured as 4 MMLs×16 layers. In this example, a case where a size of each row ECC frame (frame length) is 8, and a size of each diagonal ECC frame (frame length) is 8 is illustrated.

(A) of FIG. 25 illustrates a physical arrangement of ECC frames (row ECC frames and diagonal ECC frames) of the product code, the physical arrangement being the physical arrangement explained with reference to (B) of FIG. 24. A set of data elements indicated by the same numeral forms one row ECC frame, and a set of data elements indicated by the same alphabet forms one diagonal ECC frame.

Each row of data elements of 8×8 in (A) of FIG. 25 are divided, as shown in (B) of FIG. 25, into four data elements belonging to the first four columns and four data elements belonging to the remaining four columns. Then, as shown in (C) of FIG. 25, first four data elements (a1, b1, c1, and d1) of the first row (Row1) included in data elements of 8×8 are arranged in the layer L16 of the physical storage region (4 MMLs×16 layers) of the block, and remaining four data elements (e1, f1, g1, and h1) of the first row (Row1) included in data elements of 8×8 are arranged in the layer L15 of the physical storage regions (4 MMLs×16 layers). First four data elements (h2, a2, b2, and c2) of the second row (Row2) included in data elements of 8×8 are arranged in the layer L14 of the physical storage region (4 MMLs×16 layers) of the block, and remaining four data elements (d2, e2, f2, and g2) of the second row (Row2) included in data elements of 8×8 are arranged in the layer L13 of the physical storage regions (4 MMLs×16 layers). The arrangement goes on in a similar manner, and lastly, first four data elements (b, c, d, and e) of the eighth row (Row8) included in data elements of 8×8 are arranged in the layer L2 of the physical storage region (4 MMLs×16 layers) of the block, and remaining four data elements (f, g, h, and a) of the eighth row (Row8) included in data elements of 8×8 are arranged in the layer L1 of the physical storage regions (4 MMLs×16 layers).

As a result, each row ECC frame is stored over two layers of the physical storage region (4 MMLs×16 layers). Eight diagonal ECC frames (frames #1 to #8) are formed such that all MMLs are included in each diagonal ECC frame by two cells, and approximately half of the layers of all depths are included evenly in each diagonal ECC frame.

In the physical storage region (4 MMLs×16 layers), for example, a diagonal ECC frame (frame #8) formed of a set of data elements indicated by alphabet "a" includes a diagonal frame element #8-1 including many upper layer side data and a diagonal frame element #8-2 including many lower layer side data.

Diagonal frame element #8-1 includes data element "a1" stored in layer L16 of magnetic memory line MML1, data element "a2" stored in layer L14 of magnetic memory line MML2, data element "a3" stored in layer L12 of magnetic memory line MML3, and data element "a4" stored in layer L10 of magnetic memory line MML4.

Diagonal frame element #8-2 includes data element "a5" stored in layer L7 of magnetic memory line MML1, data element "a6" stored in layer L5 of magnetic memory line MML2, data element "a7" stored in layer L3 of magnetic memory line MML3, and data element "a" stored in layer L1 of magnetic memory line MML4.

Furthermore, a diagonal ECC frame (frame #7) formed of a set of data elements indicated by alphabet "b" includes a diagonal frame element #7-1, diagonal frame element #7-2, and diagonal frame element #7-3.

Diagonal frame element #7-1 includes data element "b1" stored in layer L16 of magnetic memory line MML2, data element "b2" stored in layer L14 of magnetic memory line MML3, and data element "b3" stored in layer L12 of magnetic memory line MML4.

Diagonal frame element #7-2 includes data element "b4" stored in layer L9 of magnetic memory line MML1, data element "b5" stored in layer L7 of magnetic memory line MML2, data element "b6" stored in layer L5 of magnetic memory line MML3, and data element "b7" stored in layer L3 of magnetic memory line MML4.

Diagonal frame element #7-3 includes only one data element "b" stored in layer L2 of magnetic memory line MML1.

Figure 26:
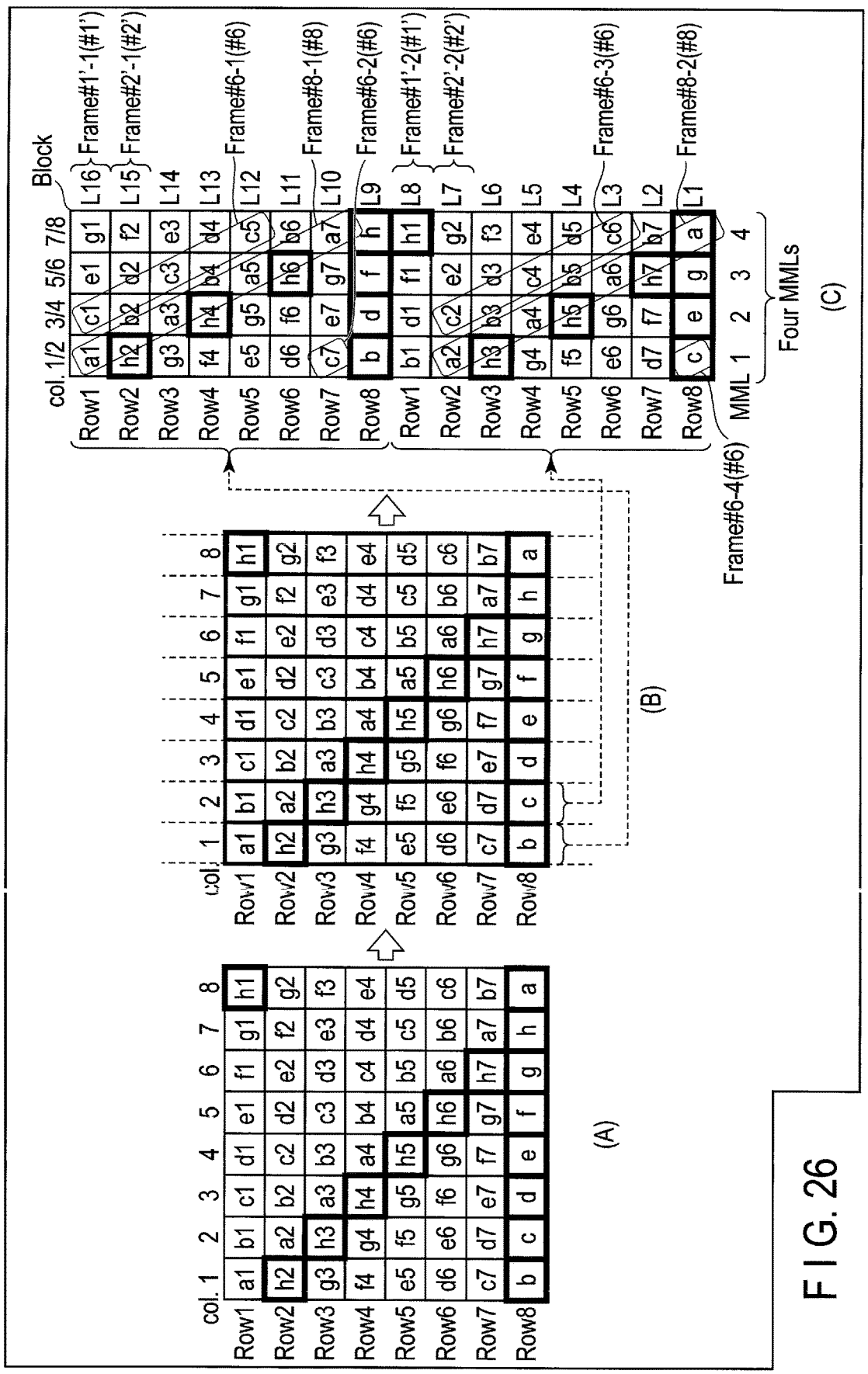
FIG. 26 is a diagram illustrating another structural example of ECC frames (row ECC frames and diagonal ECC frames) of the product code in a case where the block of the magnetic domain wall memory is structured as 4 MMLs×16 layers.

FIG. 26 is a diagram illustrating another structural example of ECC frames (row ECC frames and diagonal ECC frames) of the product code in a case where the block of the magnetic domain wall memory 3 is structured as 4 MMLs×16 layers.

(A) of FIG. 26 illustrates a physical arrangement of ECC frames (row ECC frames and diagonal ECC frames) of the product code, the physical arrangement being explained with reference to (B) of FIG. 24. A set of data elements indicated by the same numeral forms one row ECC frame, and a set of data elements indicated by the same alphabet forms one diagonal ECC frame.

Data elements of 8×8 in (A) of FIG. 26 are divided, as shown in (B) of FIG. 26, into eight data portions corresponding to eight columns. Then, as shown in (C) of FIG. 26, data portion (a1, h2, g3, f4, e5, d6, c7, and b) of the first column (Col.1) included in data elements of 8×8 is arranged as upper eight data elements of MML1 of the physical storage region (4 MMLs×16 layers) of the block. Data portion (b1, a2, h3, g4, f5, e6, d7, and c) of the second column (Col.2) included in data elements of 8×8 is arranged as lower eight data elements of magnetic memory line MML1 of the physical storage region (4 MMLs×16 layers) of the block, data portion (c1, b2, a3, h4, g5, f6, e7, and d) of the third column (Col.3) included in data elements of 8×8 is arranged as upper eight data elements of magnetic memory line MML2 of the physical storage region (4 MMLs×16 layers) of the block, and data portion (d1, c2, b3, a4, h5, g6, f7, and e) of the fourth column (Col.4) included in data elements of 8×8 is arranged as lower eight data elements of magnetic memory line MML2 of the physical storage region (4 MMLs×16 layers) of the block. The following data portions are arranged similarly, and data portion (g1, f2, e3, d4, c5, b6, a7, and h) of the seventh column (Col.7) included in data elements of 8×8 is arranged as upper eight data elements of magnetic memory line MML4 of the physical storage region (4 MMLs×16 layers) of the block, and data portion (h1, g2, f3, e4, d5, c6, b7, and a) of the eighth column (Col.8) included in data elements of 8×8 is arranged as lower eight data elements of magnetic memory line MML4 of the physical storage region (4 MMLs×16 layers) of the block.

As a result, each row ECC frame is dispersed over two layers of the physical storage region (4 MMLs×16 layers). Eight diagonal ECC frames (frames #1 to #8) are formed such that all MMLs are included in each diagonal ECC frame by two cells, and approximately half of the layers of all depths are included evenly in each diagonal ECC frame.

In the physical storage region (4 MMLs×16 layers), for example, a diagonal ECC frame (frame #8) formed of a set of data elements indicated by alphabet "a" includes a diagonal frame element #8-1 including many upper layer side data and a diagonal frame element #8-2 including many lower layer side data.

Diagonal frame element #8-1 includes data element "a1" stored in layer L16 of magnetic memory line MML1, data element "a3" stored in layer L14 of magnetic memory line MML2, data element "a5" stored in layer L12 of magnetic memory line MML3, and data element "a7" stored in layer L10 of magnetic memory line MML4.

Diagonal frame element #8-2 includes data element "a2" stored in layer L6 of magnetic memory line MML1, data element "a4" stored in layer L5 of magnetic memory line MML2, data element "a6" stored in layer L3 of magnetic memory line MML3, and data element "a" stored in layer L1 of magnetic memory line MML4.

Furthermore, a diagonal ECC frame (frame #6) formed of a set of data elements indicated by alphabet "c" includes a diagonal frame element #6-1, diagonal frame element #6-2, diagonal frame element #6-3, and diagonal frame element #6-4.

Diagonal frame element #6-1 includes data element "c1" stored in layer L16 of magnetic memory line MML2, data element "c3" stored in layer L14 of magnetic memory line MML3, and data element "c5" stored in layer L12 of magnetic memory line MML4.

Diagonal frame element #6-2 includes data element "c7" stored in the first column (Col.1) of the seventh row (Row7).

Diagonal frame element #6-3 includes data element "c2" stored in layer L7 of magnetic memory line MML2, data element "c4" stored in layer L5 of magnetic memory line MML3, and data element "c6" stored in layer L3 of magnetic memory line MML4.

Diagonal frame element #6-4 includes only one data element "c" stored in layer L1 of magnetic memory line MML1.

Figure 27:
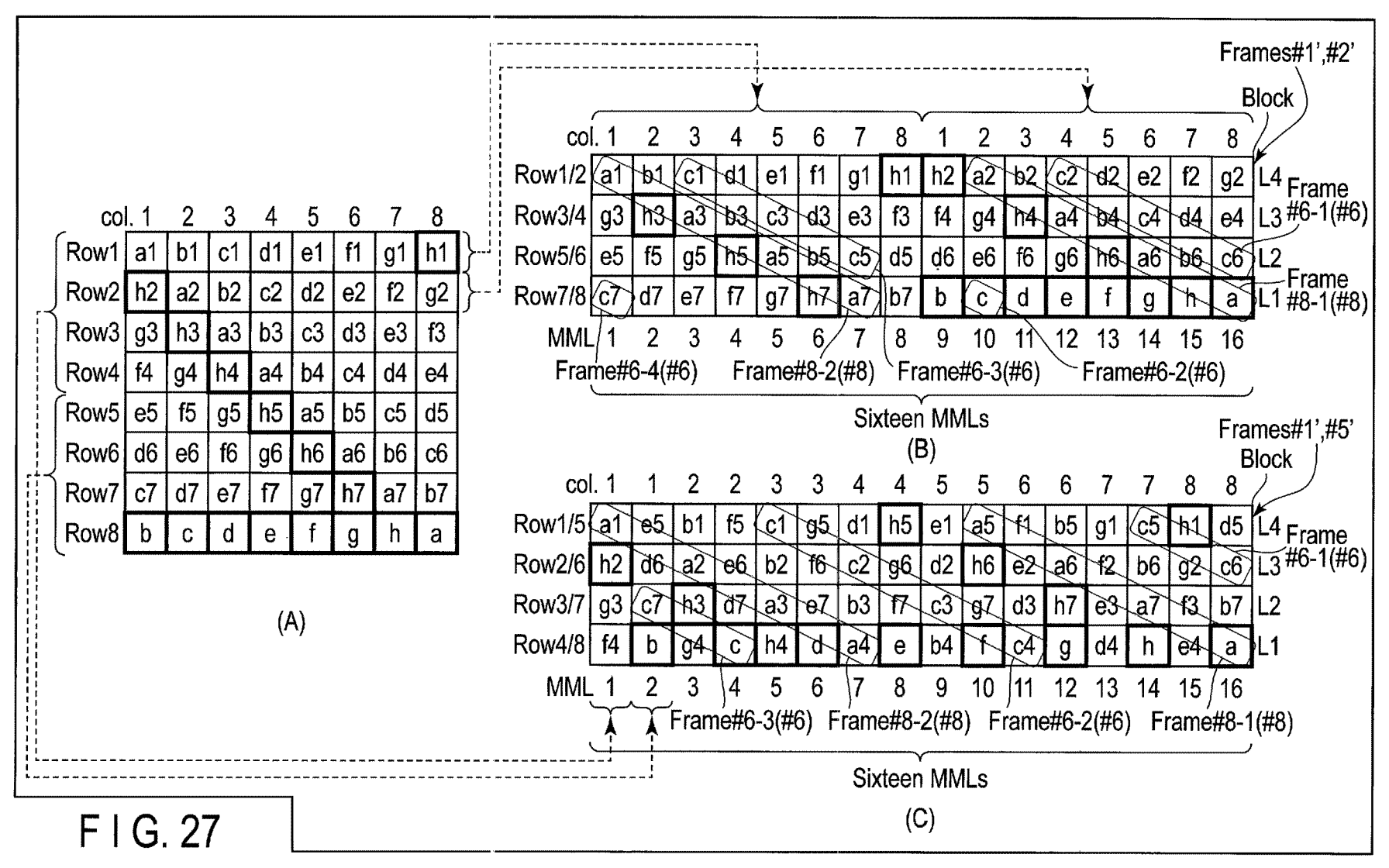

FIG. 27 is a diagram illustrating two types of ECC frames (row ECC frames and diagonal ECC frames) of the product code in a case where the block of the magnetic domain wall memory 3 includes a structure of 16 MMLs×4 layers.

(A) of FIG. 27 illustrates a physical arrangement of ECC frames (row ECC frames and diagonal ECC frames) of the product code, the physical arrangement being explained with reference to (B) of FIG. 24. A set of data elements indicated by the same numeral forms one row ECC frame, and a set of data elements indicated by the same alphabet forms one diagonal ECC frame.

The data elements of 8×8 in (A) of FIG. 27 are divided into eight data portions corresponding to eight rows. Then, as shown in (B) of FIG. 27, data portion (a1, b1, c1, d1, e1, f1, g1, and h1) of the first row (Row1) included in data elements of 8×8 is arranged as data elements of first eight columns (MML1 to MML8) of layer L4 of the physical storage region (16 MMLs×4 layers) of the block, and data portion (h2, a2, b2, c2, d2, e2, f2, and g2) of the second row (Row2) included in data elements of 8×8 is arranged as data elements of remaining eight columns (MML9 to MML16) of layer L4 of the physical storage region (16 MMLs×4 layers) of the block. The following data portions are arranged in a similar manner, and data portion (c7, d7, e7, f7, g7, h7, a7, and b7) of the seventh row (Row7) included in data elements of 8×8 is arranged as data elements of first eight columns (MML1 to MML8) of layer L1 of the physical storage region (16 MMLs×4 layers) of the block, and data portion (b, c, d, e, f, g, h, and a) of the eighth row (Row8) included in data elements of 8×8 is arranged as data elements of remaining eight columns (MML9 to MML16) of layer L1 of the physical storage region (16 MMLs×4 layers) of the block.

As a result, eight diagonal ECC frames (frames #1 to #8) are formed such that approximately half of magnetic memory lines MML are included evenly in each diagonal ECC frame and layers of all depths are included in each diagonal ECC frame by two cells.

In the physical storage region (16 MMLs×4 layers) of the block of (B) of FIG. 27, for example, a diagonal ECC frame (frame #8) formed of a set of data elements indicated by alphabet "a" includes a diagonal frame element #8-1 and a diagonal frame element #8-2.

Diagonal frame element #8-1 includes data element "a2" stored in layer L4 of magnetic memory line MML10, data element "a4" stored in layer L3 of magnetic memory line MML12, data element "a6" stored in layer L2 of magnetic memory line MML14, and data element "a" stored in layer L1 of magnetic memory line MML16.

Diagonal frame element #8-2 includes data element "a1" stored in layer L4 of magnetic memory line MML1, data element "a3" stored in layer L3 of magnetic memory line MML3, data element "a5" stored in layer L2 of magnetic memory line MML5, and data element "a7" stored in layer L1 of magnetic memory line MML7.

Furthermore, a diagonal ECC frame (frame #6) formed of a set of data elements indicated by alphabet "c" includes a diagonal frame element #6-1, diagonal frame element #6-2, diagonal frame element #6-3, and diagonal frame element #6-4.

Diagonal frame element #6-1 includes data element "c2" stored in layer L4 of magnetic memory line MML12, data element "c4" stored in layer L3 of magnetic memory line MML14, and data element "c6" stored in layer L2 of magnetic memory line MML16.

Diagonal frame element #6-2 includes only one data element "c" stored in layer L1 of magnetic memory line MML10.

Diagonal frame element #6-3 includes data element "c1" stored in layer L4 of magnetic memory line MML3, data element "c3" stored in layer L3 of magnetic memory line MML5, and data element "c5" stored in layer L2 of magnetic memory line MML7.

Diagonal frame element #6-4 includes only one data element "c7" stored in layer L1 of magnetic memory line MML1.

(C) of FIG. 27 illustrates another structural example of ECC frames (row ECC frames and diagonal ECC frames) of the product code.

ECC frames (row ECC frames and diagonal ECC frames) of the product code of (C) of FIG. 27 are structured through the following process.

Each column of data elements of 8×8 in (A) of FIG. 27 are divided into four data elements belonging to the upper four rows and four data elements belonging to the lower four rows. Then, as shown in (C) of FIG. 27, upper four data elements (a1, h2, g3, and f4) of the first column (Col.1) included in data elements of 8×8 are arranged in layers L4 to L1 of magnetic memory line MML1 of the physical storage region (16 MMLs×4 layers) of the block, and lower four data elements (e5, d6, c7, and b) of the first column (Col.1) included in data elements of 8×8 are arranged in layers L4 to L1 of magnetic memory line MML2 of the physical storage regions (16 MMLs×4 layers). Upper four data elements (b1, a2, h3, and g4) of the second column (Col.2) included in data elements of 8×8 are arranged in layers L4 to L1 of magnetic memory line MML3 of the physical storage region (16 MMLs×4 layers) of the block, and lower four data elements (f5, e6, d7, and c) of the second column (Col.2) included in data elements of 8×8 are arranged in layers L4 to L1 of magnetic memory line MML4 of the physical storage regions (16 MMLs×4 layers). The arrangement goes on in a similar manner, and lastly, upper four data elements (h1, g2, f3, and e4) of the eighth column (Col.8) included in data elements of 8×8 are arranged in layers L4 to L1 of magnetic memory line MML15 of the physical storage region (16 MMLs×4 layers) of the block, and lower four data elements (d5, c6, b7, and a) of the eighth column (Col.8) included in data elements of 8×8 are arranged in layers L4 to L1 of magnetic memory line MML16 of the physical storage regions (16 MMLs×4 layers).

As a result, eight diagonal ECC frames (frames #1 to #8) are formed such that approximately half of the magnetic memory lines MML are included evenly in each diagonal ECC frame and layers of all depths are included in each diagonal ECC frame by two cells.

In the physical storage region (16 columns×4 rows) of the block of (C) of FIG. 27, for example, a diagonal ECC frame (frame #8) formed of a set of data elements indicated by alphabet "a" includes a diagonal frame element #8-1 and a diagonal frame element #8-2.

Diagonal frame element #8-1 includes data element "a5" stored in layer L4 of magnetic memory line MML10, data element "a6" stored in layer L3 of magnetic memory line MML12, data element "a7" stored in layer L2 of magnetic memory line MML14, and data element "a" stored in layer L1 of magnetic memory line MML16.

Diagonal frame element #8-2 includes data element "a1" stored in layer L4 of magnetic memory line MML1, data element "a2" stored in layer L3 of magnetic memory line MML3, data element "a3" stored in layer L2 of magnetic memory line MML5, and data element "a4" stored in layer L1 of magnetic memory line MML7.

Furthermore, a diagonal ECC frame (frame #6) formed of a set of data elements indicated by alphabet "c" includes a diagonal frame element #6-1, diagonal frame element #6-2, and diagonal frame element #6-3.

Diagonal frame element #6-1 includes data element "c5" stored in layer L4 of magnetic memory line MML14, and data element "c6" stored in layer L3 of magnetic memory line MML16.

Diagonal frame element #6-2 includes data element "c1" stored in layer L4 of magnetic memory line MML5, data element "c2" stored in layer L3 of magnetic memory line MML7, data element "c3" stored in layer L2 of magnetic memory line MML9, and data element "c4" stored in layer L1 of magnetic memory line MML11.

Diagonal frame element #6-3 includes data element "c7" stored in layer L2 of magnetic memory line MML2, and data element "c" stored in layer L1 of magnetic memory line MML4.

Figure 28:
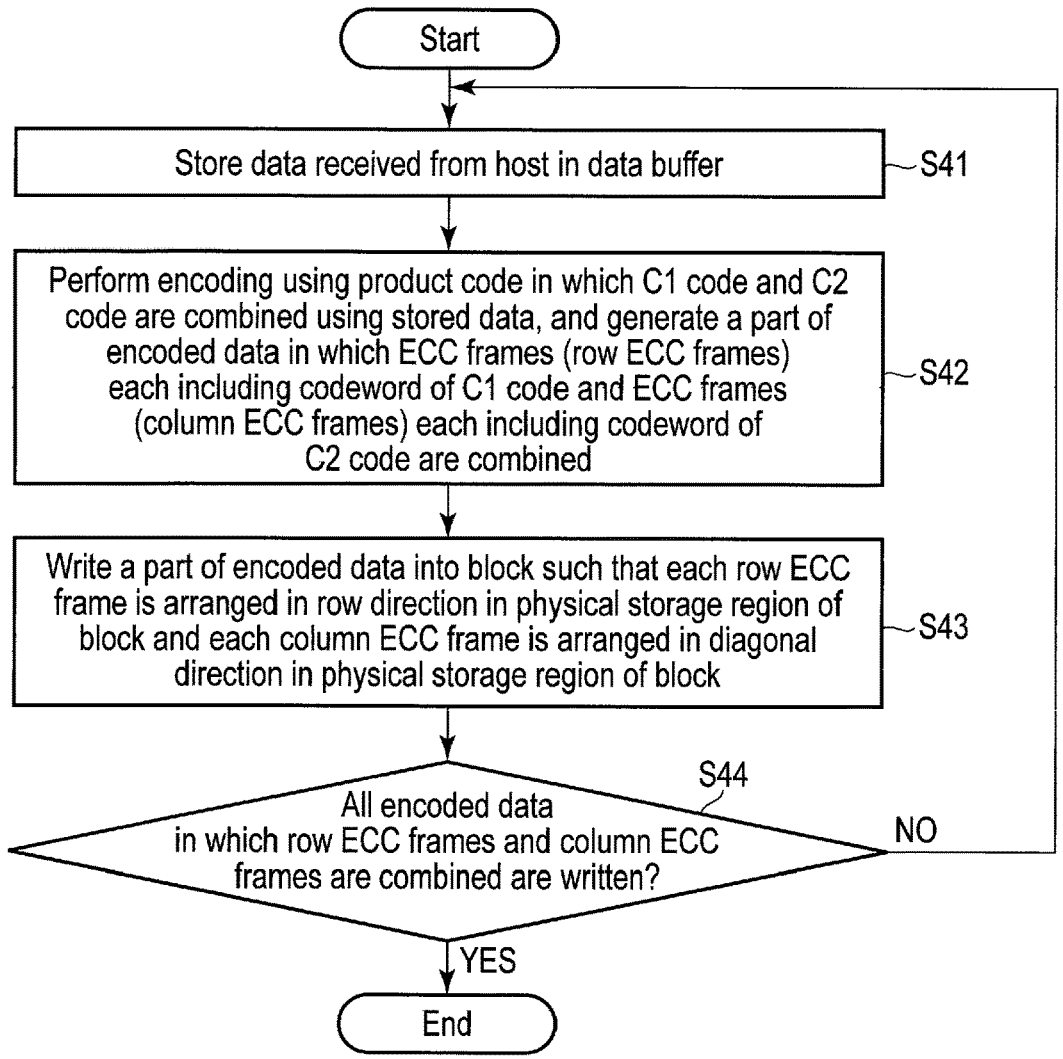
FIG. 28 is a flowchart illustrating a procedure of a write process executed by the memory system of the second embodiment.

FIG. 28 is a flowchart illustrating a procedure of a write process executed by the memory system 1.

Upon receipt of a write request from the host 4, the memory controller 2 starts a write process indicated in the flowchart of FIG. 28.

Write of data into the block of the magnetic domain wall memory 3 may be started after data of one block size are received from the host 4; however, as described above, in a case where the data arrangement which can store parities in the upper layer side of the block (for example, uppermost layer Ln) is used, write of data into the block can be performed in parallel to both a process to receive data from the host 4 and a process to encode the data for each of ECC frames. In the following description, the write process in the latter case will be explained.

The memory controller 2 receives, from the host 4, data associated with a write request received from the host 4, and stores the received data into the data buffer 25 (step S41).

The memory controller 2 encodes the data stored in the data buffer 25 using the product code which is a combination of C1 code and C2 code, and generates a part of encoded data (i.e., encoded data of the product code) in which ECC frames (row ECC frames) each including a codeword of C1 code and ECC frames (column ECC frames) each including a codeword of C2 code are combined (step S42). In step S42, encoding by C1 code may be performed first, and then, encoding by C2 code may be performed. Thus, encoded data corresponding to each layer (codeword of C1 code) is generated first as a part of the encoded data of the product code. Since the parity of codeword corresponding to each column ECC frame (diagonal ECC frame) will be written into the block lastly, write of data into the block can be started without waiting for the completion of calculation of parities by C2 code.

Thus, the memory controller 2 writes a part of the encoded data of the product code (codeword of C1 code in this example) into the block in parallel to the encoding process (step S43). In step S43, the memory controller 2 writes the generated part of the encoded data into the block such that each row ECC frame is arranged in the row direction in the physical storage region and each column ECC frame is arranged diagonally in the physical storage region of the block.

The memory controller 2 determines whether or not all encoded data of the product code in which the row ECC frames and the column ECC frames are combined are written into the block (step S44). Steps S41 to S43 are repeated until all encoded data of the product code are written into the block.

In step S42, when the calculation to obtain parities of C2 codewords corresponding to column ECC frames is completed by the encoding unit 26, the parities of C2 codewords corresponding to column ECC frames are generated as a part of the encoded data of the product code. Then, in step S43, the memory controller 2 writes the parities of C2 codewords corresponding to column ECC frames into the block.

If all codewords of the product code are written into the block (YES in step S44), the write process ends.

As a result of the write process, each of column ECC frames can be arranged diagonally in the physical storage region of the block such that upper layer side data and lower layer side data having different error rates are included evenly in each of the column ECC frames, and burst errors occurring along the magnetic memory lines MML are spread evenly over the column ECC frames. Each column ECC frame arranged diagonally is used as the aforementioned diagonal ECC frame.

Note that, although each of column ECC frames is arranged diagonally in the physical storage region of the block in this example, each of column ECC frames may be arranged in the row direction, and each of row ECC frames may be arranged diagonally.

Figure 29:
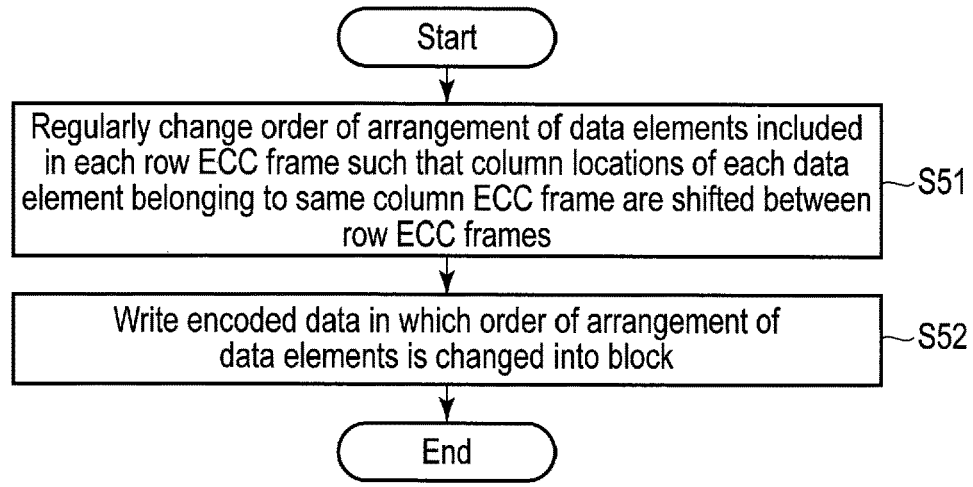
FIG. 29 is a flowchart illustrating a procedure of a process of arranging each of row ECC frames in a row direction of the physical storage region of the block of the magnetic domain wall memory and arranging each of diagonal ECC frames diagonally in the physical storage region of the block of the magnetic domain wall memory.

FIG. 29 is a flowchart illustrating a procedure of a process of arranging each of row ECC frames in the row direction in the physical storage region of the block of the magnetic domain wall memory 3 and arranging each of diagonal ECC frames (column ECC frames) in the diagonal direction in the physical storage region.

Steps S51 and S52 of FIG. 29 are executed in step S43 of FIG. 28.

The memory controller 2 regularly changes the order of data elements included in each of row ECC frames such that column locations of data elements belonging to the same column ECC frame (that is, ECC frame to be arranged as diagonal ECC frame) are shifted between row ECC frames (step S51).

Then, the memory controller 2 writes each of the row ECC frames into the block, and thereby arranges each of the row ECC frames in the row direction in the physical storage region of the block of the magnetic domain wall memory 3 and arranges each of the diagonal ECC frames in the diagonal direction in the physical storage region (step S52).

Figure 30:
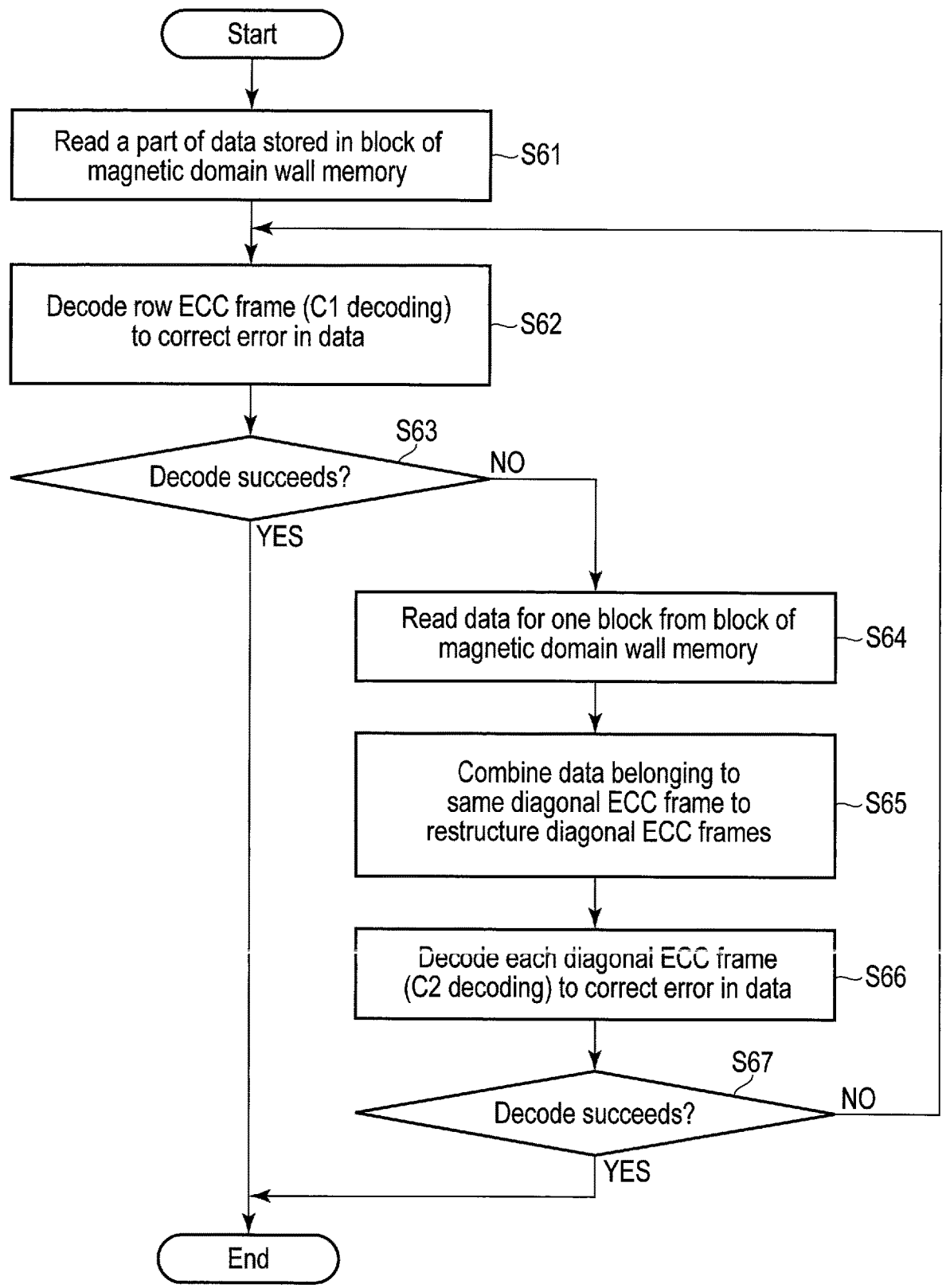
FIG. 30 is a flowchart illustrating a procedure of a decoding process which is executed using the row ECC frames and the diagonal ECC frames.

FIG. 30 is a flowchart illustrating a procedure of a decoding process which is executed using the row ECC frames and the diagonal ECC frames.

The memory controller 2 reads a part of data stored in the block from the magnetic domain wall memory 3 (step S61). For example, when target data designated by the host 4 is to be read from the block, the memory controller 2 reads the entire row ECC frame including the read target data as a part of the data stored in the block. The memory controller 2 executes a first decoding process (c1 decoding) of decoding the row ECC frame corresponding to the read data to correct an error included in the read data (step S62).

If the first decoding process (C1 decoding) for the row ECC frame succeeds (YES in step S63), the process ends. Note that, in a case where a read process to read from the block data of block size is executed, steps S61 and S62 are repeated, and thereby, the first decoding process (C1 decoding) is executed with respect to each of row ECC frames.

If the first decoding process (C1 decoding) for the row ECC frame fails (NO in step S63), the memory controller 2 reads remaining data from the block such that all data stored in the block are read (step S64). Note that failing of decoding means that an error correction fails, and succeeding of decoding means an error correction succeeds.

The memory controller 2 reconstructs all diagonal ECC frames by combining data belonging to the same diagonal ECC frame (step S65).

The memory controller 2 executes a second decoding process (C2 decoding) of decoding reconstructed diagonal ECC frames to correct an error included in the row ECC frame in which the first decoding process (C1 decoding) has been failed (step S66). In step S66, the memory controller 2 corrects the error included in the row ECC frame in which the C1 decoding has been failed, using a result of decoding of each diagonal ECC frame.

If the second decoding process (C2 decoding) succeeds (YES in step S67), that is, if decoding of all diagonal ECC frames succeeds, all errors included in the row ECC frames in which the C1 decoding has been failed can be corrected. Thus, the process ends. On the other hand, if decoding (C2 decoding) of a certain diagonal ECC frame is failed (NO in step S67), in a state where a part of the errors of the row ECC frame is corrected using the decoding result from the suc-cessful C2 decoding of the diagonal ECC frame, the decoding process of this row ECC frame (C1 decoding) is again executed.

As can be understood from the above, in the second embodiment, the product code in which row ECC frames and diagonal ECC frames are combined is used, and if an error in read target data is corrected by the decoding of the row ECC frame, the memory controller 2 can return the read target data to the host 2 without decoding the column ECC frames (diagonal ECC frames). Thus, latency in the data read process can be decreased. Furthermore, if the decoding of the row ECC frame fails, the memory controller 2 reads all data stored in the block, performs decoding of each column ECC frame (diagonal ECC frame), and thus, corrects errors in the read target data. Thus, as in the first embodiment, the reliability of data stored in the magnetic domain wall memory 3 can be improved.

(Variation)

Now, a product code in which two types of diagonal ECC frames are combined will be explained as a variation of product code.

Figure 31:
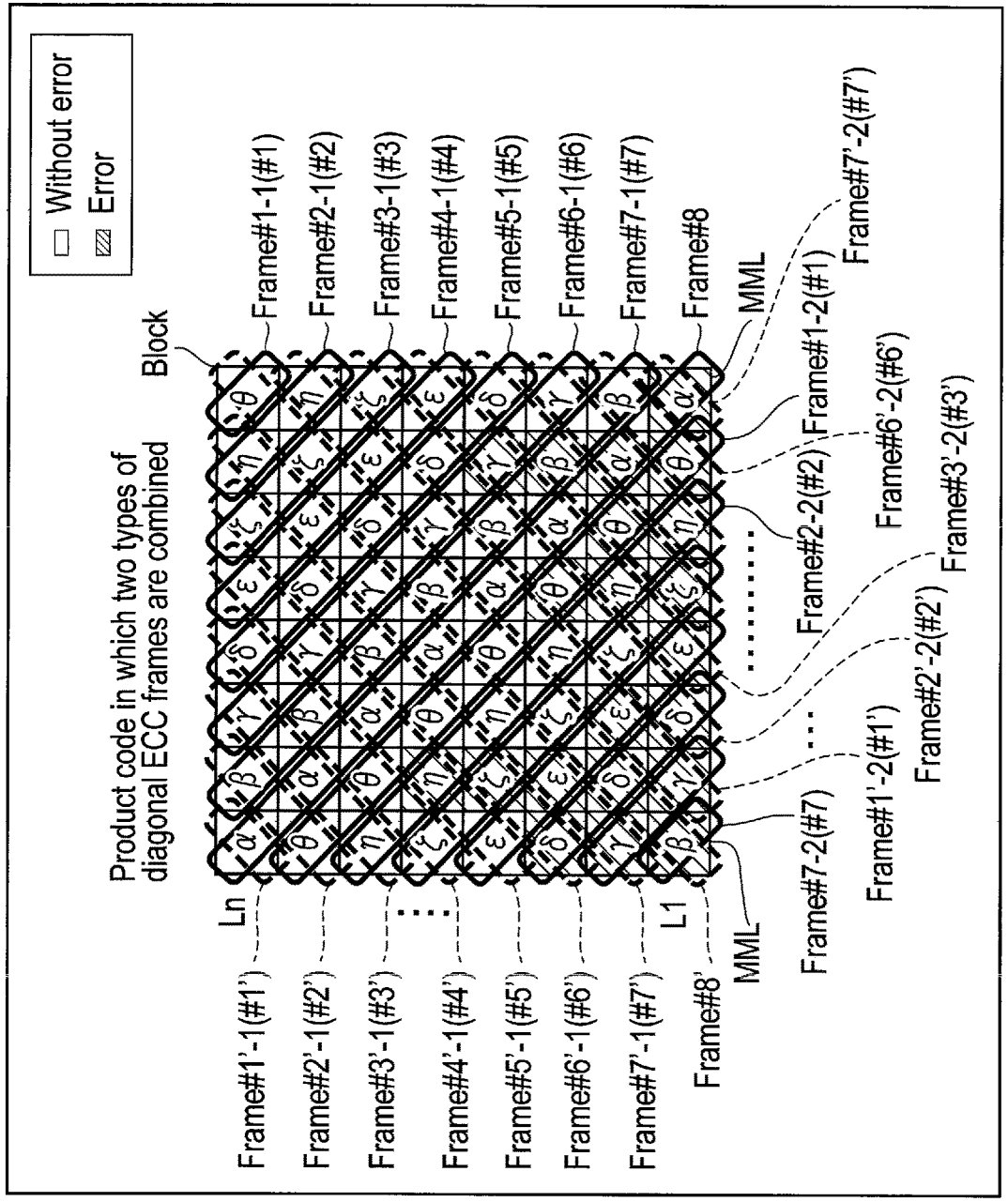
FIG. 31 is a diagram illustrating a structural example of a product code in which two types of diagonal ECC frames are combined.

FIG. 31 is a diagram illustrating a structural example of a product code in which two types of diagonal ECC frames are combined.

FIG. 31 illustrates an example where one block includes eight magnetic memory lines MML and eight layers. Similarly to the first embodiment, diagonal ECC frames (for example, frames #1 to #8) are each arranged diagonally in the physical storage region of the block of the magnetic domain wall memory 3.

That is, each of diagonal ECC frames (for example, frames #1 to #8) is arranged diagonally in the physical storage region of the block of the magnetic domain wall memory 3 such that upper layer side data and lower layer side data having different error rates are evenly included in each of diagonal ECC frames (for example, frames #1 to #8), and burst errors occurring along the magnetic memory lines MML are spread evenly over the diagonal ECC frames (for example, frames #1 to #8). The structure of each of the diagonal ECC frames (for example, frames #1 to #8) is the same as that of the first embodiment.

In FIG. 31, a set of data elements indicated by the same alphabet (same Greek character in this example) forms one diagonal ECC frame. For example, data elements indicated by "6" are a set of data elements forming frame #1.

In FIG. 31, in order to increase the performance of protection of data, diagonal ECC frames (frames #1' to #8') which are opposite to the diagonal ECC frames (frames #1 to #8) are further arranged. For example, diagonal ECC frames (frames #1 to #8) are arranged to be slanted to the right bottom and diagonal frames (frames #1' to #8') are arranged to be slanted to the left bottom. Similarly to the diagonal ECC frames (frames #1 to #8), diagonal ECC frames (frames #1' to #8') are arranged diagonally (opposite to the diagonal direction of the diagonal ECC frames #1 to #8) in the physical storage region of the block of the magnetic domain wall memory 3 such that upper layer side data and lower layer side data having different error rates are evenly included in each of the diagonal ECC frames (frames #1' to #8'), and burst errors occurring along the magnetic memory lines MML are spread evenly in the diagonal ECC frames (frames #1' to #8'). The frame size of each of the diagonal ECC frame #1' to #8' may be the same as that of each of the diagonal ECC frame (frames #1 to #8).

In FIG. 31, diagonal ECC frame #8' is formed of one frame element arranged diagonally along a diagonal line which is orthogonal to diagonal ECC frame #8. Other diagonal ECC frames #1' to #7' are each formed of a combination of two frame elements (may be referred to as diagonal frame elements) arranged diagonally in the physical storage region of the block.

Diagonal ECC frame #1' includes diagonal frame element #1'-1 and diagonal frame element #1'-2. Diagonal frame element #1'-1 is a frame element including many upper layer side data, and diagonal frame element #1'-2 is a frame element including many lower layer side data.

Similarly, diagonal ECC frame #2' includes diagonal frame element #2'-1 including many upper layer side data and diagonal frame element #2'-2 including many lower layer side data, diagonal ECC frame #3' includes diagonal frame element #3'-1 including many upper layer side data and diagonal frame element #3'-2 including many lower layer side data, diagonal ECC frame #4' includes diagonal frame element #4'-1 including many upper layer side data and diagonal frame element #4'-2 including many lower layer side data, diagonal ECC frame #5' includes diagonal frame element #5'-1 including many upper layer side data and diagonal frame element #5'-2 including many lower layer side data, diagonal ECC frame #6' includes diagonal frame element #6'-1 including many upper layer side data and diagonal frame element #6'-2 including many lower layer side data, and diagonal ECC frame #7' includes diagonal frame element #7'-1 including many upper layer side data and diagonal frame element #7'-2 including many lower layer side data.

In FIG. 31, each of diagonal ECC frame elements #1'-1 to #7'-2 is formed to include data elements represented by Greek characters of "α" to "θ" one by one.

Figure 32:
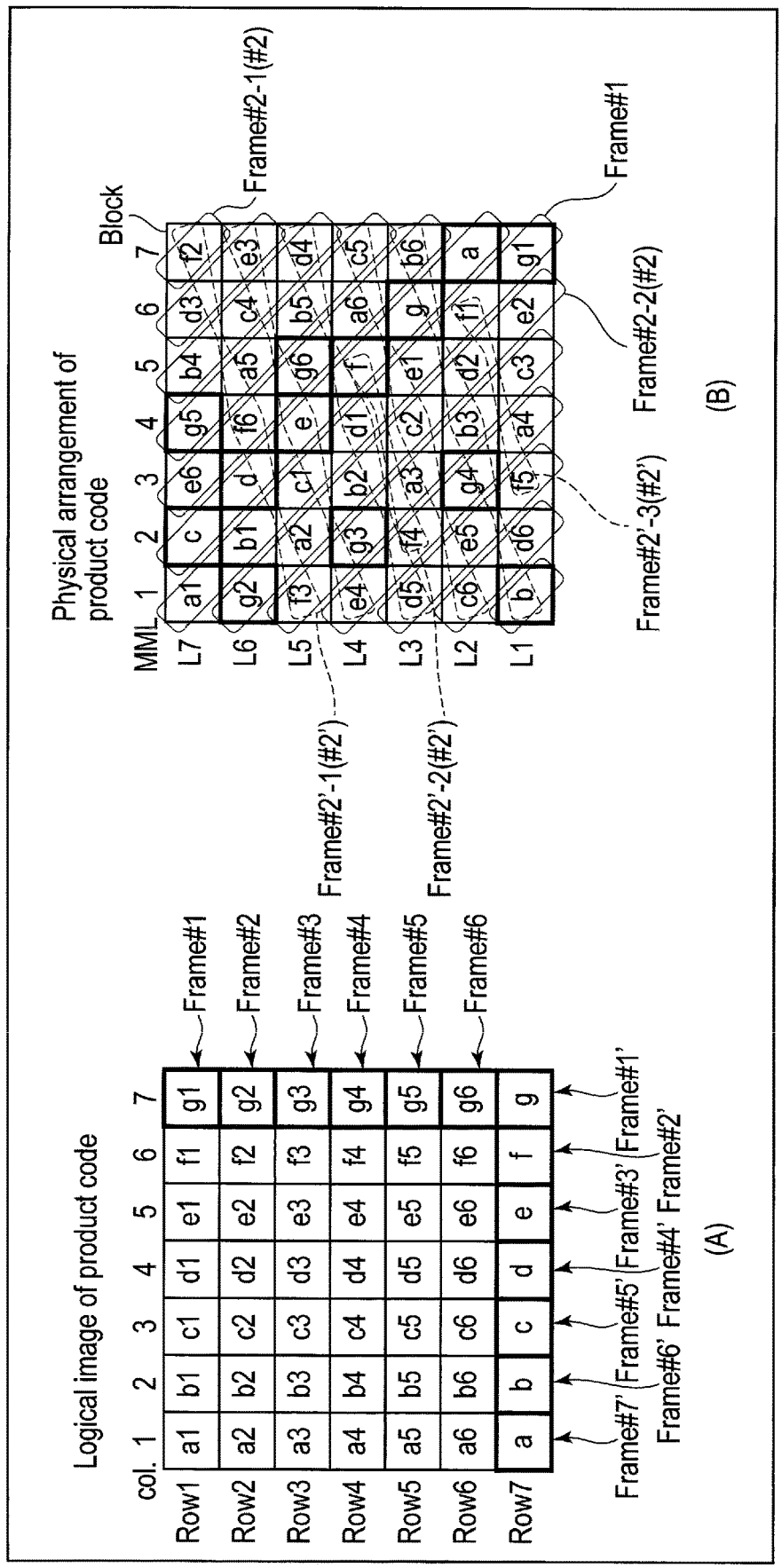
FIG. 32 is a diagram illustrating a relationship between a logical image of a product code in which two types of diagonal ECC frames are combined and a physical arrangement of the product code in the block of the magnetic domain wall memory.

FIG. 32 is a diagram illustrating FCC frames (diagonal ECC frames and diagonal ECC frames) of the product code in a case where the block of the magnetic domain wall memory 3 includes a structure of 7 MMLs×7 layers. In this example, the size (frame length) of all diagonal ECC frames is 7. In the following description, diagonal ECC frames which are arranged to be slanted to the left bottom will be referred to as reverse diagonal ECC frames.

(A) of FIG. 32 illustrates a logical image of six codewords corresponding to six diagonal ECC frames (frames #1 to #6) and a logical image of seven codewords corresponding to seven reverse diagonal ECC frames (#1' to #7').

(B) of FIG. 32 illustrates a physical arrangement of six diagonal ECC frames (frames #1 to #6) and seven reverse diagonal ECC frames (frames #1' to #7') in the physical storage region of the block. In both (A) and (B) of FIG. 32, a set of data elements represented by the same numeral indicates one diagonal ECC frame, and a set of data elements represented by the same alphabet indicates one reverse diagonal ECC frame. Furthermore, each data element indicated by the bold frame is a data element to store parity. In (B) of FIG. 32, reference numbers are added only to several diagonal ECC frames and several reverse diagonal ECC frames for easier understanding of the figure.

In (B) of FIG. 32, one column corresponds to one magnetic memory line MML in the block, and one row corresponds to one layer in the block. For example, when diagonal ECC frames #1 and #2 are focused, diagonal ECC frame #1 is formed of a set of data elements represented by numeral "1", diagonal ECC frame #2 is formed of two frame elements each including a set of data elements represented by numeral "2".

Furthermore, for example, when reverse diagonal ECC frame #2' is focused; it is formed of three frame elements each including a set of data elements represented by alphabet "f".

Six diagonal ECC frames (frames #1 to #6) are formed such that various columns (various magnetic memory lines MML) are evenly included in each diagonal ECC frame and rows (cells) of various depths are evenly included in each diagonal ECC frame. For example, in (B) of FIG. 32, diagonal ECC frame #1 including a set of data elements represented by numeral "1" is arranged to be slanted to the right bottom in the physical storage region of the block.

Similarly, seven reverse diagonal ECC frames (frames #1' to #7') are formed such that various columns (various magnetic memory lines MML) are evenly included in each reverse diagonal ECC frame and rows (cells) of various depths are evenly included in each reverse diagonal ECC frame. For example, in (B) of FIG. 32, reverse diagonal ECC frame #2' including a set of data elements represented by alphabet "f" is arranged to be slanted to the left bottom in the physical storage region of the block.

As shown in (A) of FIG. 32, initially, two dimensional array data are encoded row-by-row, and thus, six ECC frames (frames #1 to #6) are generated. ECC frames (frames #1 to #6) are ECC frames obtained by encoding data row-by-row (row ECC frames). However, since the ECC frames (frames #1 to #6) are used as ECC frames arranged diagonally (to be slanted to the right bottom) in the block, they will be referred to as diagonal ECC frames.

As shown in (A) of FIG. 32, diagonal ECC frame (frame #1) includes one codeword containing data (a1, b1, c1, d1, e1, and f1) and parity (g1). Diagonal ECC frame (frame #2) includes one codeword containing data (a2, b2, c2, d2, e2, and f2) and parity (g2). Diagonal ECC frame (frame #3) includes one codeword containing data (a3, b3, c3, d3, e3, and f3) and parity (g3). Diagonal ECC frame (frame #4) includes one codeword containing data (a4, b4, c4, d4, e4, and f4) and parity (g4). Diagonal ECC frame (frame #5) includes one codeword containing data (a5, b5, c5, d5, e5, and f5) and parity (g5). Diagonal ECC frame (frame #6) includes one codeword containing data (a6, b6, c6, d6, e6, and f6) and parity (g6).

Then, two dimensional array data are encoded column-by-column, and thus, as shown in (A) of FIG. 32, seven ECC frames (frames #1' to #7') are generated. ECC frames (frames #1' to #7') are ECC frames obtained by encoding data column-by-column (column ECC frames). However, the ECC frames are used as ECC frames arranged diagonally (to be slanted to the left bottom) in the block, they will be referred to as reverse diagonal ECC frames.

Reverse diagonal ECC frame (frame #1') includes one codeword containing data (g1, g2, g3, g4, g5, g6, and g7) and parity (g). Reverse diagonal ECC frame (frame #2') includes one codeword containing data (f1, f2, f3, f4, f5, f6, and f7) and parity (f). Reverse diagonal ECC frame (frame #3') includes one codeword containing data (e1, e2, e3, e4, e5, e6, and e7) and parity (e). Reverse diagonal ECC frame (frame #4') includes one codeword containing data (d1, d2, d3, d4, d5, d6, and d7) and parity (d). Reverse diagonal ECC frame (frame #5') includes one codeword containing data (c1, c2, c3, c4, c5, c6, and c7) and parity (c). Reverse diagonal ECC frame (frame #6') includes one codeword containing data (b1, b2, b3, b4, b5, b6, and b7) and parity (b). Reverse diagonal ECC frame (frame #7') includes one codeword containing data (a1, a2, a3, a4, a5, a6, and a7) and parity (a).

As shown in (B) of FIG. 32, it will be understandable that a set of data elements represented by the same numeral (each diagonal ECC frame) is arranged to be slanted to the right bottom in the physical storage region of the block, and a set of data elements represented by the same alphabet (each reverse diagonal ECC frame) is arranged to be slanted to the left bottom.

Figure 33:
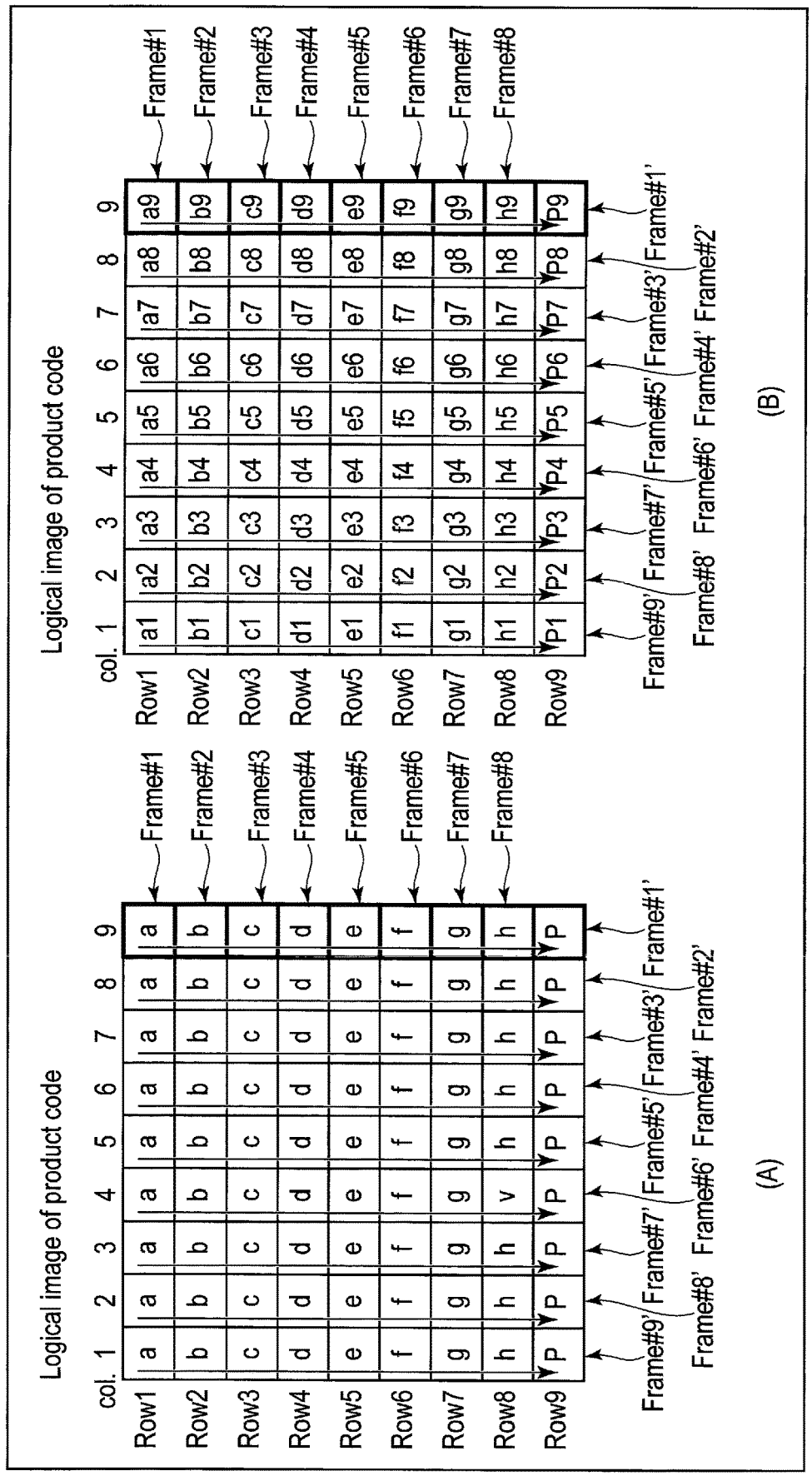
FIG. 33 is a diagram illustrating a logical image of a product code which achieves two types of diagonal ECC frames orthogonal to each other.

FIG. 33 is a diagram of a logical image of a product code which achieves two types of diagonal ECC frames orthogonal to each other. In this example, the block of the magnetic domain wall memory 3 includes a structure of 9 MMLs×9 layers.

(A) of FIG. 32 illustrates a logical image of the product code in which row ECC frames (frames #1 to #8) and column ECC frames (frames #1' to #9') are combined. In row ECC frames (frames #1 to #8), one data element indicated with a bold frame indicates parity of one row ECC frame. In column ECC frames (frames #1' to #9'), one data element represented by alphabet "P" indicates parity of one column ECC frame. A set of data elements represented by the same alphabet forms one row ECC frame.

(B) of FIG. 33 is a version of (A) of FIG. 33 in which numerals are written in each column ECC frame. A set of data elements represented by the same numeral forms one column ECC frame. For example, each row ECC frame represented by the same alphabet is used as a diagonal ECC frame which is slanted to the right bottom, and each column ECC frame represented by the same numeral is used as a reverse diagonal ECC frame which is slanted to the left bottom.

FIG. 34 is a diagram illustrating a physical arrangement of two types of diagonal ECC frames orthogonal to each other.

(A) of FIG. 34 illustrates a state where a set of data elements represented by the same alphabet is arranged to be slanted to the right bottom in the physical region of the block. For example, row ECC frame #1 including a set of data elements represented by alphabet "a" is arranged to be slanted to the right bottom of the physical region of the block as a diagonal ECC frame. Furthermore, row ECC frame #2 including a set of data elements represented by alphabet "b" is arranged to be slanted to the right bottom of the physical region of the block as two diagonal frame elements #2-1 and #2-2.

(B) of FIG. 34 illustrates a state where each of column ECC frames represented by the same numeral is arranged to be slanted to the left bottom of the physical region of the block. For example, column ECC frame #9' including a set of data elements represented by numeral "1" is arranged to be slanted to the left bottom of the physical region of the block as a reverse diagonal ECC frame. Furthermore, column ECC frame #8' including a set of data elements represented by numeral "2" is arranged to be slanted to the left bottom of the physical region of the block as two diagonal frame elements #8'-1 and #8'-2.

Locations of parities corresponding to the two types of diagonal ECC frames orthogonal to each other are not limited, and FIG. 35A illustrates an example of locations of parities of the two types of diagonal ECC frames orthogonal to each other.

In (A) of FIG. 35A, a set of data elements represented by numeral "9" indicates an example of locations of parities of row ECC frames (diagonal ECC frames). These parities are data elements of column ECC frames (reverse diagonal ECC frames) #1'. (B) of FIG. 35A illustrates an example of locations of parities (P1, P2, P3, P4, P5, P6, P7, P8, and P9) of column ECC frames (reverse diagonal ECC frames).

In FIG. 35A, parities (data elements represented by numeral "9") of diagonal ECC frames are included across all MMLs and all layers. Similarly, parities (P1, P2, P3, P4, P5, P6, P7, P8, and P9) of reverse diagonal ECC frames are also included across all MMLs and all layers.

FIG. 35B is a diagram illustrating another example of parity locations of two types of diagonal ECC frames orthogonal to each other.

(A) of FIG. 35B illustrates an example in which parities are arranged in two layers lastly written into the block. In (A) of FIG. 35B, L1 indicates a layer in which data written into the block first is stored (lowermost layer L1), and as the numeral of layer increases, the layer becomes upper. L9 indicates a layer in which data written into the block last is stored (uppermost layer L9).

A set of data elements including the same numeral indicates one reverse diagonal ECC frame, and a set of data elements including the same alphabet indicates one diagonal ECC frame. Initially, data portion (information symbol sequence) is sequentially written into the block. Then, when parities (9P, 1P, 2P, 3P, 4P, 5P, 6P, 7P, and 8P) of reverse diagonal ECC frames are calculated, the parities (9P, 1P, 2P, 3P, 4P, 5P, 6P, 7P, and 8P) are written into the block. Then, when parities (bP, cP, dP, eP, fP, gP, hP, iP, and aP) of diagonal ECC frames are calculated, the parities (bP, cP, dP, eP, fP, gP, hP, iP, and aP) are written into the block.

(B) of FIG. 35B illustrates a process of writing data received from the host 4 into the block while regularly assigning the data to ECC frames (diagonal ECC frames and reverse diagonal ECC frames) in the order of reception of the data.

First eight data received from the host 4 are, as indicated by the arrow in (B) of FIG. 35B, assigned as data element "a2", data element "b3", data element "c4", data element "d5", data element "e6", data element "f7", data element "g8", data element "h9", and data element "i1". For example, data element "a2" is an element of diagonal ECC frame corresponding to alphabet "a" and an element of reverse diagonal ECC frame corresponding to numeral "2". These eight data are written into the block first, as (A) of FIG. 35B.

Then, the following eight data received from the host 4 are assigned as data element "i3", data element "a4", data element "b5", data element "c6", data element "d7", data element "e8", data element "f9", data element "g1", and data element "h2", and then are written into the block, as (A) of FIG. 35B.

Then, when data having a size of seven layers are written into the block, calculation of the parities (9P, 1P, 2P, 3P, 4P, 5P, 6P, 7P, and 8P) of reverse diagonal ECC frames is completed. The parities (9P, 1P, 2P, 3P, 4P, 5P, 6P, 7P, and 8P) are assigned to diagonal ECC frames and are written into the block, as (A) of FIG. 35B. Then, when calculation of the parities (bP, cP, dP, eP, fP, gP, hP, iP, and aP) of diagonal ECC frames is completed, the parities (bP, cP, dP, eP, fP, gP, hP, iP, and aP) are written into the block, as (A) of FIG. 35B.

With the structure of arranging parities in the uppermost layer of the block as above, the following advantages can be achieved.

(1) A process to write data into the block can be start without waiting for completion of calculation of parities, and thus, a writing performance can be improved.

(2) A size of write buffer to be allocated can be reduced.

FIG. 36 is a diagram illustrating a structural example of two types of diagonal ECC frames orthogonal to each other in a case where the block of the magnetic domain wall memory 3 has a structure of 7 MMLs×7 layers.

(A) of FIG. 36 illustrates a state where each row ECC frame represented by the same alphabet is arranged in the physical region of the block to be slanted to the right bottom as a diagonal ECC frame. (B) of FIG. 36 illustrates a state where each column ECC frame represented by the same numeral is further arranged in the physical region of the block to be slanted to the left bottom as a reverse diagonal ECC frame.

Note that each row ECC frame may be arranged as a reverse diagonal ECC frame and each column ECC frame may be arranged as a diagonal frame.

Third Embodiment

Now, a structure of using a product code in which row ECC frames and column ECC frames are combined will be explained as a third embodiment.

The hardware structure of the memory system 1 of the third embodiment is the same as that of FIG. 1, and also, the structure of the magnetic domain wall memory 3 used in the memory system 1 of the third embodiment is the same as that of the first embodiment. In the following description, parts different from the first embodiment will be mainly explained.

Figure 37:
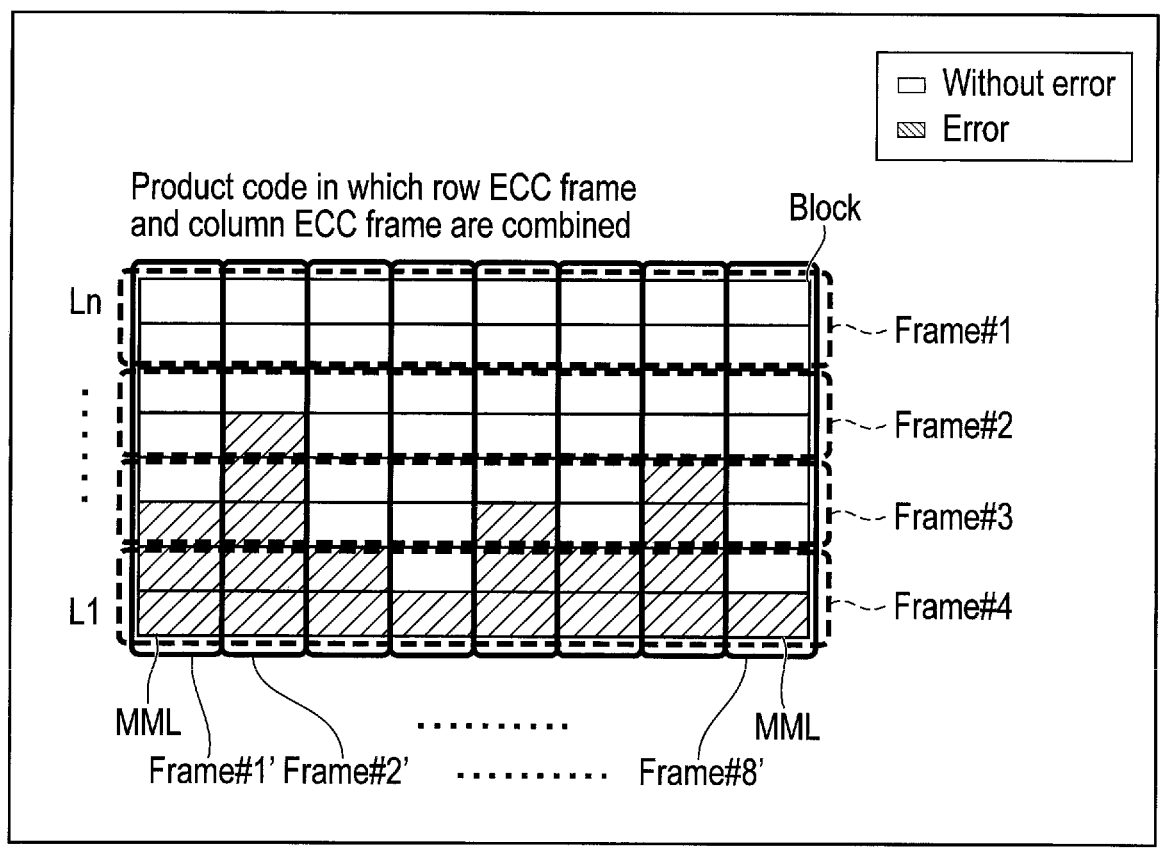
FIG. 37 is a diagram illustrating a structural example of a product code in which row ECC frames and column ECC frames are combined, which is used in a memory system of a third embodiment.

FIG. 37 is a diagram illustrating a structural example of a product code which is used in the memory system 1 of the third embodiment. The product code is a combination of row ECC frames and column ECC frames.

FIG. 37 illustrates an example where one block includes eight magnetic memory lines MML and eight layers.

A combination of the row ECC frames and the column ECC frames can spread burst errors occurring along the magnetic memory lines MML over the row ECC frames evenly and can spread the errors increasing in lower layers over the column ECC frames evenly, similarly to the diagonal ECC frames of the first embodiment.

The memory controller 2 encodes data to be written into the block using a product code which is a combination of a first code and a second code to generate encoded data, and writes the encoded data into the block such that row ECC frames each including a codeword of the first code are arranged in the row direction in the physical storage region of the block and column ECC frames each including a codeword of the second code are arranged in the column direction in the physical storage region of the block.

The first code is, for example, code #1 (C1 code) to encode data in the row direction, and the second code is, for example, code #2 (C2 code) to encode data in the column direction.

In that case, an encoding unit 26 of the memory controller 2 encodes data to be written into the block using the product code in which code #1 (C1 code) to encode the data in the row direction and code #2 (C2 code) to encode the data in the column direction are combined, and generates encoded data in which row ECC frames (frames #1 to #4) each including a codeword of the code #1 (C1 code) and column ECC frames (frames #1' to #8') each including a codeword of the code #2 (C2 code) are combined. The memory controller 2 writes the encoded data into the block. In that case, for example, encoding by C1 code may be performed first, and encoding by C2 code may be performed later. Through the encoding by C1 code, data corresponding to each layer is obtained first. Thus, write of data into the block can be started early.

As described in the second embodiment, the ECC frame of the C1 code and the ECC frame of the C2 code may be different from each other in frame size. For example, the frame size of one of the ECC frame of the C1 code and the ECC frame of the C2 code may be twice as large as the other one of these.

FIG. 37 illustrates an example where a row ECC frame is formed in units of two-layers and a column ECC frame is formed in units of one MML. In FIG. 37, each of row ECC frames (frames #1 to #4) is arranged in the row direction in the physical region of the block.

Row ECC frames #1 to #4 have the same frame size. Each of the row ECC frames #1 to #4 is obtained by encoding data to be written into the block of the magnetic domain wall memory 3 in units of one or more rows (in units of two rows in FIG. 37).

In FIG. 37, column ECC frames (frames #1' to #8') are each arranged in the column direction in the physical region of the block.

These column ECC frames #1' to #8' have the same frame size. Each of the column ECC frames #1' to #8' is obtained by encoding the data to be written into the block of the magnetic domain wall memory 3 in units of one or more columns (in units of one column in FIG. 37).

In the decoding process using the row ECC frames and the column ECC frames, initially, decoding using each row ECC frame (C1 decoding) is performed. When the number of errors in a row ECC frame is below the error correction capability of C1 code, C1 decoding of the row ECC frame succeeds and the errors in the row ECC frame are corrected. When the number of errors in a row ECC frame is above the error correction capability of C1 code, C1 decoding of the row ECC frame fails.

When C1 decoding of a certain row ECC frame fails, decoding using column ECC frames (C2 decoding) is performed.

When the number of errors in a column ECC frame is below the error correction capability of C2 code, the C2 decoding of the column ECC frame succeeds and the number of errors included in the row ECC frame in which C1 decoding has failed can be reduced. On the other hand, when the number of errors in a column ECC frame is above the error correction capability of C2 code, C2 decoding of the column ECC frame fails.

Thus, if the number of column ECC frames in which C2 decoding fails increases, the number of errors include in the row ECC frame in which C1 decoding has failed may not be reduced sufficiently.

As described above, in the magnetic domain wall memory 3, burst errors occur along the magnetic memory lines MML. Thus, it can be estimated that the number of errors which is not slightly above but is significantly above the error correction capability of C2 code occurs densely in the column in which C2 decoding has failed.

Thus, in the third embodiment, the memory controller 2 estimates that a column in which C2 decoding has failed, that is, a column including residual errors as a column corresponding to the magnetic memory line MML in which burst errors occurring, and generates likelihood information indicative of low reliability of data included in this column as a decoding result of C2 decoding.

Then, the memory controller 2 decodes, based on the decoding result of C2 decoding including the likelihood information, the row ECC frame in which C1 decoding has failed, by a soft decision decoding. In the soft decision decoding, it is understood that an error exists with high possibility in the column of low reliability indicated by the likelihood information, and thus, accuracy of C1 decoding can be increased as compared to a case where a location of low reliability is unknown.

Figure 38:
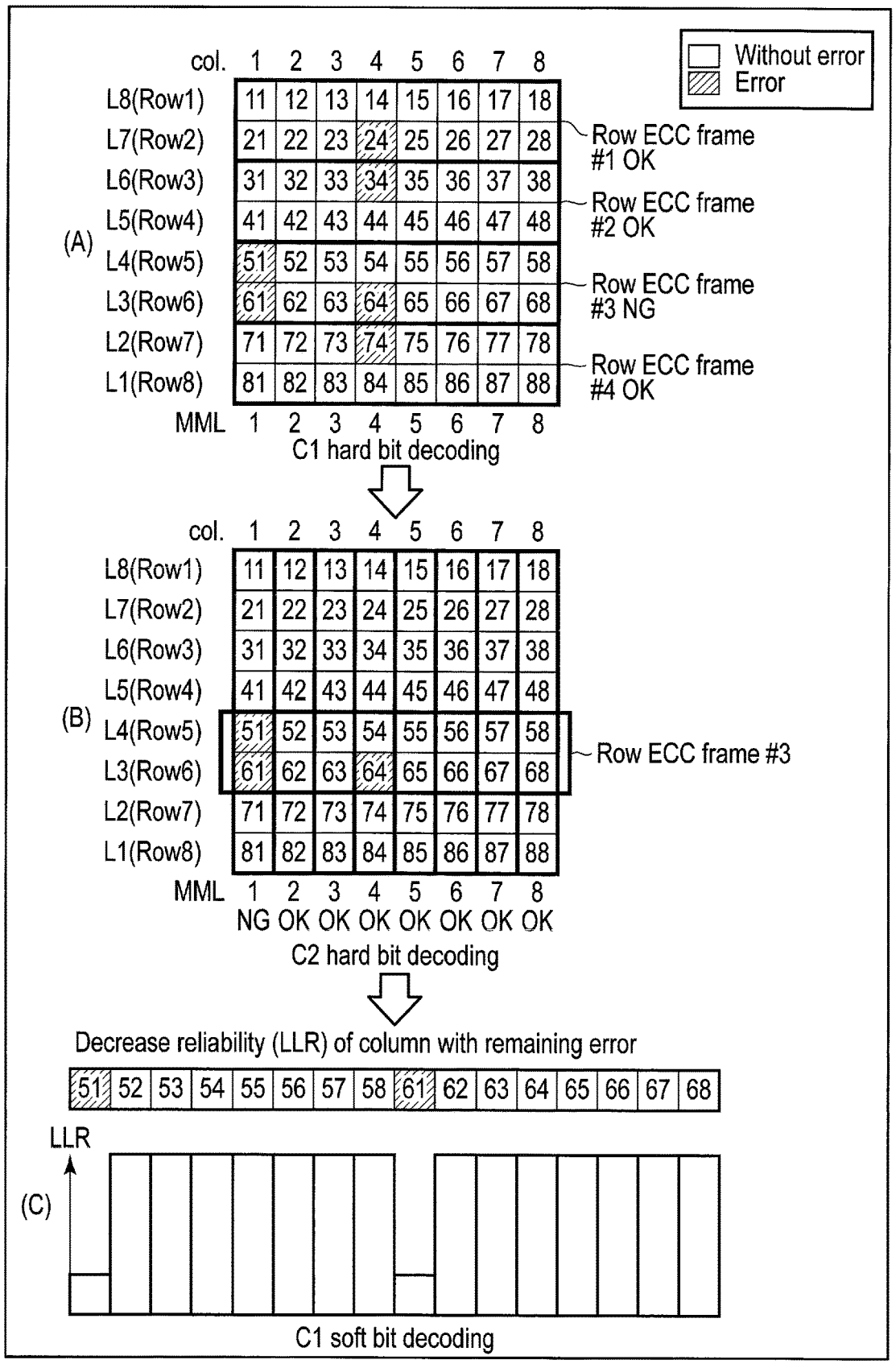
FIG. 38 is a diagram illustrating a process of decoding, by soft decision decoding, an ECC frame in which C1 decoding has failed, on the basis of likelihood information included in a decoding result of C2 decoding.

FIG. 38 is a diagram illustrating a process of decoding, by soft decision decoding, an ECC frame in which C1 decoding has failed, on the basis of likelihood information included in a decoding result of C2 decoding.

Initially, the memory controller 2 reads data stored in the block from the magnetic domain wall memory 3. Then, the memory controller 2 executes a decoding process (C1 decoding) of decoding row ECC frames corresponding to the read data and correcting errors in the read data. In that case, the memory controller 2 can start, each time when data having a size of one row ECC frame is read from the block, decoding of a row ECC frame corresponding to the read data.

(A) of FIG. 38 illustrates a decoding process using code #1 (01 code) (C1 hard decision decoding). In (A) of FIG. 38, Row1 to Row8 correspond to layers L8 to L1 of the block, and col.1 to col.8 correspond to magnetic memory lines MML1 to MML8 of the block. C1 hard decision decoding may be also referred to as C1 hard bit decoding. (A) of FIG. 38 illustrates a case where an error exists in a location corresponding to second row and fourth column (Row2 and col.4) (shown as "24"), an error exists in a location corresponding to third row and fourth column (Row3 and col.4) (shown as "34"), an error exists in a location corresponding to fifth row and first column (Row5 and col.1) (shown as "51"), an error exists in a location corresponding to sixth row and first column (Row6 and col.1) (shown as "61"), an error exists in a location corresponding to sixth row and fourth column (Row6 and col.4) (shown as "64"), and an error exists in a location corresponding to seventh row and fourth column (Row7 and col.4) (shown as "74").

For example, if C1 code is a code which can correct errors of 2-bit or less, decoding of row ECC frames #1, #2, and #4 succeeds, and the errors of these row ECC frames are corrected. Decoding of row ECC frame #3 fails, and the errors resides in row ECC frame #3.

In that case, the memory controller 2 execute a decoding process of decoding column FCC frames and collecting errors included in row ECC frame #3 in which C1 hard decision decoding has failed (C2 hard decision decoding). C2 hard decision decoding may be also referred to as C2 hard bit decoding.

(B) of FIG. 38 illustrates the decoding process using code #2 (C2 code) (C2 hard decision decoding). In (B) of FIG. 38, a case where each column ECC frame has a frame size of one column (one magnetic memory line MML) is exemplified. In that case, the number of column ECC frames is equal to the number of magnetic memory lines MML included in the block. Thus, if the number of magnetic memory lines MML included in the block is eight, a process to decode eight column ECC frames is performed. The decoding process of these column ECC frames (C2 hard decision decoding) can be executed using a decoding result from C1 hard decision decoding (that is, decoding result of row ECC frames #1 to #4).

If C2 hard decision decoding succeeds, that is, decoding of all-column ECC frames succeeds, all errors included in row ECC frame #3 can be corrected. Thus, the process ends.

As shown in (B) of FIG. 38, in the decoding result of C1 hard decision decoding, an error exists in location "51", an error exists in location "61", and an error exists in location "64". For example, if C2 code is a code which can correct an error of 1-bit or less, decoding of a column ECC frame corresponding to first column (col.1) fails, and 2-bit errors remain in first column (col.1) (error in location "51" and error in location "61").

Decoding of a column ECC frame corresponding to each of other columns (col.2 to col.8) succeeds, and the error in location "64" is corrected by the decoding of column ECC frame corresponding to fourth column (col.4).

In that case, based on the decoding result of the C2 hard decision decoding, the memory controller 2 decreases reliability corresponding to first column (col.1) in which the error remains, and generates likelihood information indicative of low reliability of first column (col.1) as the decoding result (soft output) of C2 hard decision decoding. Generally, the reliability is indicated by a log likelihood ratio (LLR).

Specifically, as shown in (C) of FIG. 38, the memory controller 2 generates, as a decoding result of C2 hard decision decoding, estimated values of data (bits) corresponding to locations "51" to "58" and "61" to "68" belonging to row ECC frame #3 in which C1 hard decision decoding has failed, and reliability (LLR) corresponding to each of these locations "51" to "58" and "61" to "68". The decoding result of the C2 hard decision decoding is used to perform soft decision decoding of row ECC frame #3 using C1 code. The soft decision decoding using C1 code may be also referred to as C1 soft bit decoding.

As shown in (C) of FIG. 38, based on the decoding result of C2 hard decision decoding, the memory controller 2 decreases LLR (LLR amplitude) indicative of the reliability of location "51" belonging to the first column (col.1) in which the error remains and LLR (LLR amplitude) indicative of the reliability of location "61" belonging to the first column (col.1) in which the error remains. Here, LLR of a certain location means a likelihood value indicative of reliability of an estimated value corresponding to the location.

In second column (col.2) to eighth column (col.8), there is no residual error. Thus, the memory controller 2 sets reliability (LLR) of each location in locations "52" to "58" and "62" to "68" to a great value.

Then, the memory controller 2 again executes the decoding process using code #1 (C1 code) to correct the error remaining in row ECC frame #3. In that case, the memory controller 2 decodes row ECC frame #3 by the soft decision decoding, using the decoder 27. From the likelihood information obtained as the decoding result of the C2 hard decision decoding, it is specified that an error exists in a region where first column (col.1) and row ECC frame #3 overlap (locations "51" and "61") with high possibility, and thus, in the soft decision decoding, for example, the C1 decoding process may be performed while executing a bit flipping decoding which reverses estimated values of several bits in the region.

Furthermore, iterative decoding which repeats operations of exchanging of decoding results as extrinsic values between C1 decoding and C2 decoding may be performed. In that case, the decoder 27 may include a decoder (component decoder) which corresponds to C1 code and a decoder (component decoder) which corresponds to C2 code. By repeating operations of exchanging of a decoding result of the decoder corresponding to C1 code and a decoding result of the decoder corresponding to C2 code between these decoders as extrinsic values, the iterative decoding can be executed.

Figures 39, 40:
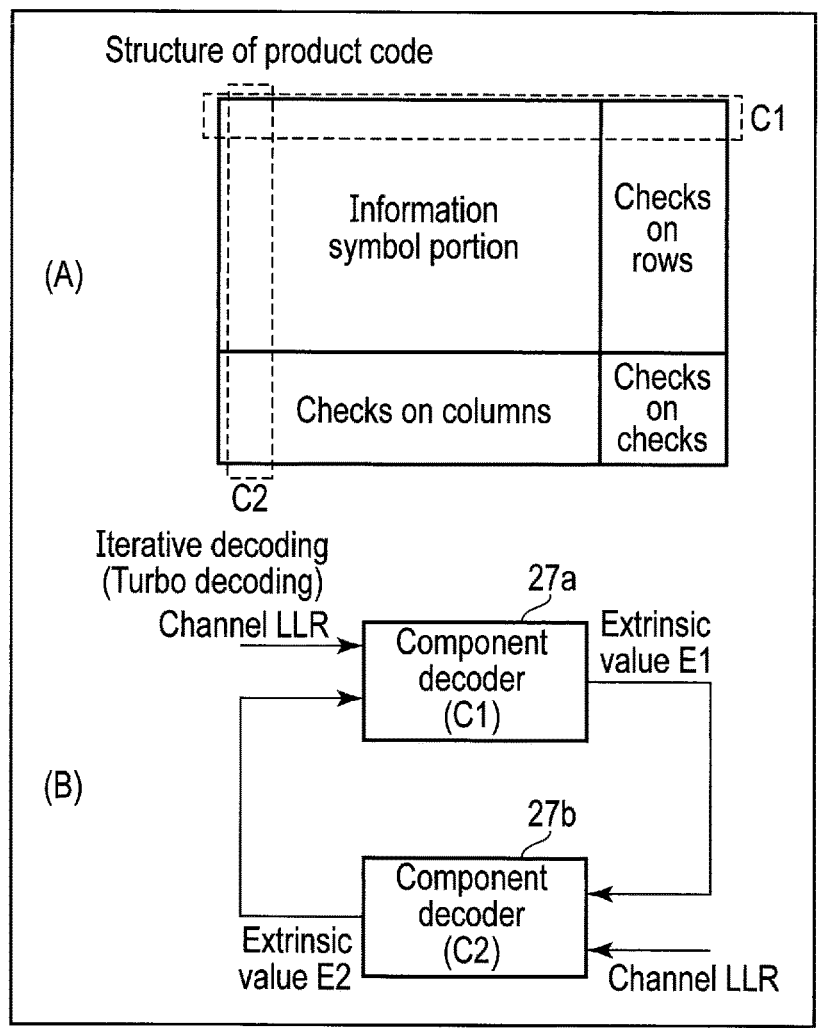
FIG. 39 is a diagram illustrating an example of a log likelihood ratio indicating reliability.
FIG. 40 is a diagram illustrating a structural example of iterative decoding.

FIG. 39 is a diagram illustrating an example of log likelihood ratio indicative of reliability.

It is now assumed that the memory controller 2 writes a value x which may be a binary {0, 1} into the block of the magnetic domain wall memory 3 (transmitting) and the memory controller 2 reads a value r from the block of the magnetic domain wall memory 3 (receiving).

Here, several terms will be defined to explain the log likelihood ratio.

Likelihood indicates the following two conditional probabilities.

P(x=0|r): Probability where x is 0 when r is received
P(x=1|r): Probability where x is 1 when r is received Likelihood ratio indicates a ratio of likelihood and is expressed as follows.

$$P(x=0|r)/P(x=1|r)$$

Log likelihood ratio (LLR) is a log of likelihood ratio and is expressed as follows.

$$\log(P(x=0|r)/P(x=1|r))$$

(A) of FIG. 39 illustrates an example of log likelihood ratio (LLR). In this example, indicated is a case where written value x is 0, and the number of readings of y=0 from the magnetic domain wall memory 3 is 9900 times, and the number of readings of y=1 from the magnetic domain wall memory 3 is 100 times. Furthermore, indicated is a case where written value x is 1, and the number of readings of y=0 from the magnetic domain wall memory 3 is 100 times, and the number of readings of y=1 from the magnetic domain wall motions memory 3 is 9900 times. The probability of proper reading of y is 99%. In that case, the log likelihood ratio (LLR(y)) is given 4.6.

(B) of FIG. 39 illustrates another example of log likelihood ratio (LLR). In this example, indicated is a case where written value x is 0, and the number of readings of y=0 from the magnetic domain wall memory 3 is 9999 times, and the number of readings of y=1 from the magnetic domain wall memory 3 is 1 time. Furthermore, indicated is a case where written value x is 1, and the number of readings of y=0 from the magnetic domain wall memory 3 is 1 time, and the number of readings of y=1 from the magnetic domain wall motions memory 3 is 9999 times. The probability of proper reading of y is 99.99%. In that case, the log likelihood ratio (LLR(y)) is given 9.2.

In the third embodiment, LLR indicative of reliability of data corresponding to a column in which C2 decoding is failed is set to a small value such as 4.6 or less. On the other hand, LLR indicative of reliability of data corresponding to a column in which C2 decoding succeeds is set to a great value such as 9.2.

FIG. 40 is a diagram illustrating a structural example of iterative decoding.

In this example, as shown in (A) of FIG. 40, it is assumed that a product code which includes (1) C1 code to encode two dimensional symbols in the row direction and (2) C2 code to encode the two dimensional data symbols in the column direction is used.

The component decoder 27a is configured to decode row ECC frames each including a codeword corresponding to C1 code, and the component decoder 27b is configured to decode column ECC frames each including a codeword corresponding to C2 code.

The component decoder 27a receives data which is read from the magnetic domain wall memory 3 as a channel LLR (hard decision value) and outputs the decoding result of C1 decoding as extrinsic value E1. The component decoder 27b receives data which is read from the magnetic domain wall memory 3 as a channel LLR (hard decision value), and receives the extrinsic value E1 from the component decoder 27a. Then, the component decoder 27b outputs the decoding result of C2 decoding as an extrinsic value E2. The component decoder 27a receives the extrinsic value E2 from the component decoder 27b. The extrinsic value E2 includes likelihood information indicative of reliability (LLR) of each information symbol (bit) value included in the decoding result of C2 decoding. Based on the likelihood information, the component decoder 27a decodes a row ECC frame in which C1 decoding has failed, by soft decision decoding.

As decoding method for soft decision decoding, for example, Sum-Product decoding, and Min-Sum decoding are known as soft decision decoding for LDPC code. Furthermore, as a soft decision decoding for BCH code (ordinarily, code to perform hard decision decoding), Chase decoding, and Ordered Statistics decoding are known. Such soft decision decoding methods can be applied to the soft decision decoding by the component decoder 27a.

Figure 41:
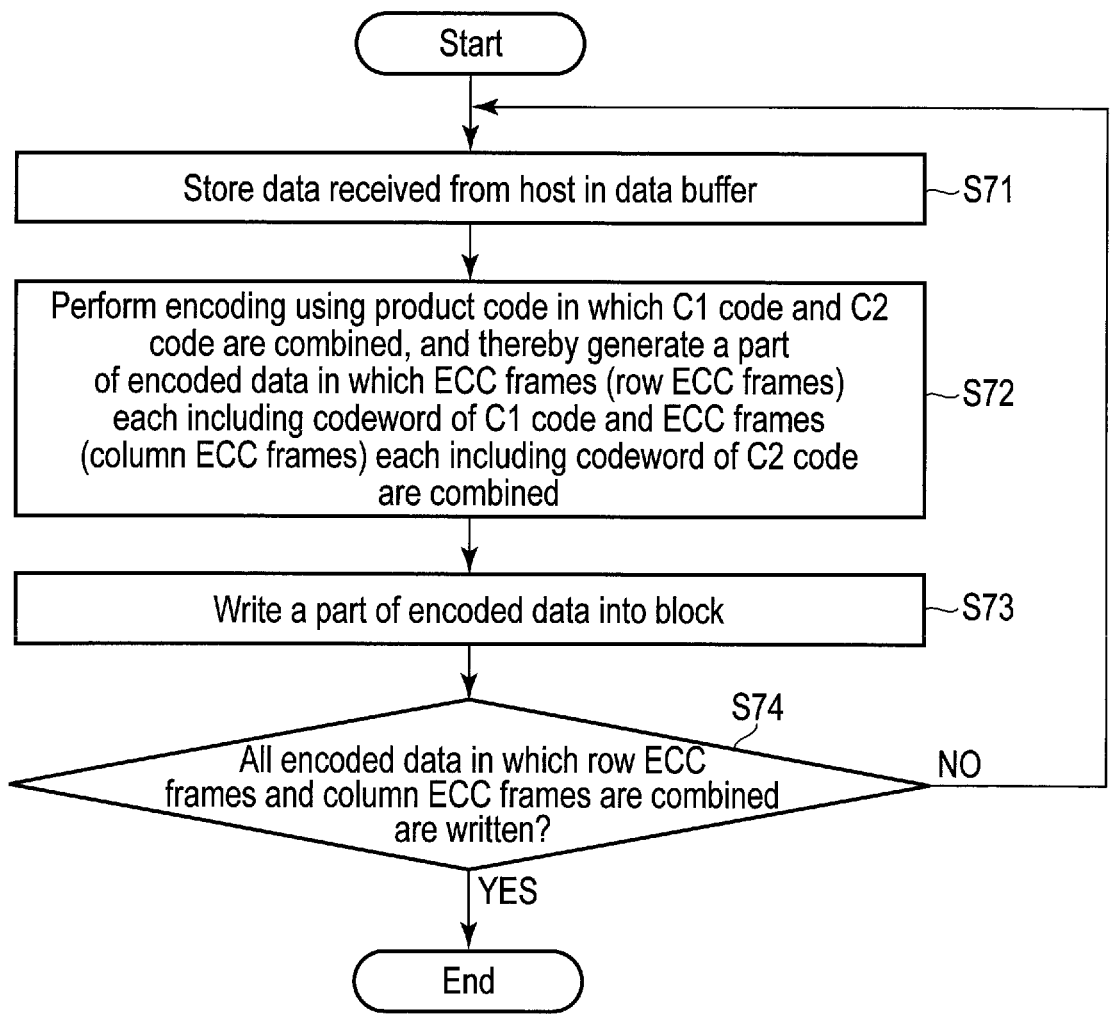
FIG. 41 is a flowchart illustrating a procedure of a write process executed by the memory system of the third embodiment.

FIG. 41 is a flowchart illustrating a procedure of a write process executed by the memory system 1.

When the memory controller 2 receives a write request from the host 4, the memory controller 2 starts a write process indicated in the flowchart of FIG. 41.

The memory controller 2 receives, from the host 4, data associated with the write request received from the host 4, and stores the received data into the data buffer 25 (step S71).

The memory controller 2 encodes the data stored in the data buffer 25 using the product code which is a combination of C1 code and C2 code and generates a part of encoded data (encoded data of the product code) including ECC frames (row ECC frames) each including a codeword of C1 code and ECC frames (column ECC frames) each including a codeword of C2 code (step S72). In step S72, encoding by C1 code may be performed first, and encoding by C2 code may be performed later. Thus, encoded data corresponding to each of layers of the block (codeword of C1 code) is generated first as a part of the encoded data of the product code. Since the parities of codewords corresponding to the column ECC frames may be written into the block lastly, write of data into the block can be started without waiting for the completion of calculation of parities by C2 code.

Thus, the memory controller 2 writes a part of the encoded data of the product code (i.e., codeword of C1 code in this example) into the block in parallel to the encoding process (step S73). In step S73, the memory controller 2 writes the generated part of the encoded data into the block such that each row ECC frame is arranged in the row direction in the physical storage region and each column ECC frame is arranged in the column direction in the physical storage region of the block.

The memory controller 2 determines whether or not all encoded data of the product code in which the row ECC frames and the column ECC frames are combined are written into the block (step S74). Steps S71 to S73 are repeated until all encoded data of the product code are written into the block.

When the parity of C2 codeword corresponding to each column ECC frame is calculated by the encoding unit 26, in step S72, the parities of C2 codewords are generated as a part of the encoded data of product code. Then, in step S73, the memory controller 2 writes the parities into the block.

When all encoded data of the product code are written into the block (YES in step S74), the write process ends.

Figure 42:
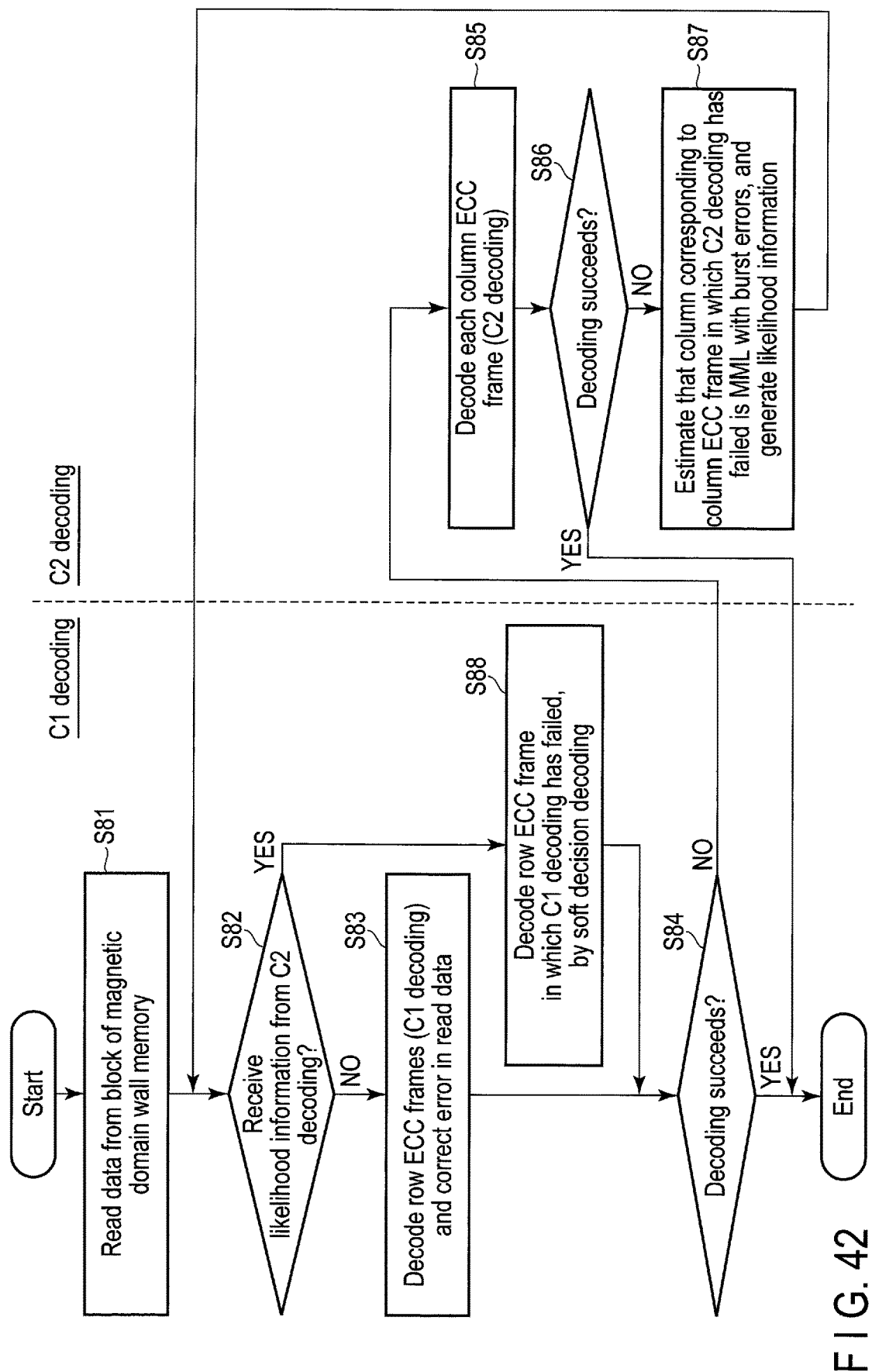
FIG. 42 is a flowchart illustrating a procedure of a decoding process executed by the memory system of the third embodiment.

FIG. 42 is a flowchart illustrating a procedure of a decoding process executed by the memory system 1.

The memory controller 2 reads data stored in the block from the magnetic domain wall memory 3 (step S81). The memory controller 2 starts a process to decode the read data by C1 decoding. In that case, the memory controller 2 determines whether or not the likelihood information is obtained from C2 decoding (step S82). In this stage, likelihood information from C2 decoding is not obtained yet (NO in step S82).

Thus, the memory controller 2 decodes row ECC frames by the hard decision decoding to correct errors in the read data (C1 decoding process) (step S83). In step S83, each time when data of frame size of one row ECC frame is read, decoding of the row ECC frame is executed.

In the C1 decoding process, C1 decoding of each row ECC frame in which the number of errors is less than the error correction capability of C1 code succeeds. Thus, the errors included in such row ECC frame are corrected. C1 decoding of row ECC frame in which the number of errors is above the error correction capability of C1 code fails. Thus, the errors included in such row ECC frame are not corrected.

If the C1 decoding process succeeds, that is, decoding of all row ECC frames which are read from the block succeeds (YES in step S84), the memory controller 2 ends the process.

On the other hand, if C1 decoding of at least one row ECC frame which is read from the block fails (NO in step S84), the memory controller 2 executes a decoding process (C2 decoding process) of decoding column ECC frames and correcting errors included in the row ECC frame in which C1 decoding has failed (step S85). In the C2 decoding process, decoding of each column ECC frame in which the number of errors is less than the error correction capability of C2 code (C2 decoding) succeeds. Since the errors included in these column ECC frames are corrected, each error included in the regions where the row ECC frame in which C1 decoding has failed and these column ECC frames overlap can be corrected. C2 decoding of column ECC frames in which the number of errors is above the error correction capability of C2 code fails. Thus, the errors included in these column ECC frames are not corrected. Thus, each error included in the regions where the row ECC frame in which C1 decoding has failed and these column ECC frames overlap cannot be corrected.

If the C2 decoding process succeeds, that is, decoding of all-column ECC frames succeeds (YES in step S86), the memory controller 2 ends the process.

On the other hand, if C2 decoding of at least one column ECC frame fails (NO in step S86), the memory controller 2 estimates that columns corresponding to column ECC frames in which C2 decoding has failed are columns corresponding to magnetic memory lines MML with burst errors, and generates likelihood information in which reliability (LLR) corresponding to such columns is set low as a decoding result of C2 decoding (step S87). Then, the memory controller 2 executes the C1 decoding process again, using the C2 decoding result including the likelihood information.

Since the likelihood information is obtained from the C2 decoding (YES in step S82), the memory controller 2 decodes, based on the C2 decoding result including the likelihood information, the row ECC frame in which C1 decoding has failed, by the soft decision decoding (step S88). In the likelihood information, in consideration of the characteristics of the magnetic domain wall memory 3 where burst errors occur along magnetic memory lines MML, the reliability (LLR) of each column in which C2 decoding has failed is set low.

Thus, it is highly possible that the errors are gathered in the region where the row ECC frames in which C1 decoding has failed and the column with low reliability (LLR) overlap. With the likelihood information indicative of columns with low reliability, accuracy of C1 decoding can be increased and the errors existing with high possibility in the locations with low reliability can be corrected.

Note that, in this example, the reliability (LLR) corresponding to the columns in which the decoding of column ECC frames succeeds is set to a great value, and the reliability (LLR) corresponding to the columns in which the decoding of column ECC frames fail is set to a small value. Instead thereof, whether or not there is an error in the data stored in each column may be determined using an error detection code such as cyclic redundancy check code (CRC), reliability (LLR) corresponding to columns in which an error is not detected may be set to a great value, and reliability (LLR) corresponding to columns in which an error is detected may be set to a small value.

As explained above, in the third embodiment, a product code in which C1 code and C2 code are combined is used, and similarly to the diagonal ECC frames of the first embodiment, burst errors which occur along magnetic memory lines MML can be spread over ECC frames (row ECC frames) evenly, and errors which increase in lower layers can be spread over ECC frames (column ECC frames) evenly.

Furthermore, in the C2 decoding, in consideration of the characteristics of the magnetic domain wall memory 3 in which burst errors occur at magnetic memory lines MML, the likelihood information is generated. In the likelihood information, a likelihood value (LLR) indicative of the reliability of columns in which C2 decoding has failed (or columns in which an error is detected by the error detection code) is set to a small value. Based on the likelihood information, C1 decoding of the row ECC frame in which C1 decoding has failed is executed by the soft decision decoding to increase the accuracy of C1 decoding.

Note that, in this example, a structure using the product code in which row ECC frames and column ECC frames are combined is used; however, ECC frames to be combined with the column ECC frames (or error detection frames to detect an error in each column) are not limited to the row ECC frames, and may be, for example, diagonal ECC frames, instead.

That is, the memory controller 2 encodes data to be written into the block using a product code which is a combination of a first code and a second code, and writes, into the block, encoded data which is a combination of first ECC frames each including a codeword of the first code and second error detection or error correction code frames each including a codeword of the second code.

Here, the second code is, for example, either ECC or an error detection code such as CRC. Each of the second error detection or error correction code frames is arranged in the column direction of the physical storage region of the block such that each second error detection or error correction code frame is formed of one magnetic memory line MML.

The memory controller 2 decodes the second error detection or error correction code frames, and increases the likelihood value (LLR) indicative of reliability of columns corresponding to the magnetic memory lines MML which are determined that an error correction has succeeded therein or there is no error. Furthermore, the memory controller 2 decreases the likelihood value (LLR) indicative of reliability of columns corresponding to the magnetic memory line MML which is determined that an error correction has failed therein or there is an error.

Then, the memory controller 2 decodes, based on the likelihood value of each column obtained by the decoding of the second error detection or error correction code frames, first ECC frames through the soft decision decoding. In that case, accuracy of the decoding of the first ECC frames can be increased by using the characteristics of the magnetic domain wall memory 3 in which burst errors occur at magnetic memory lines MML.

(Other Structural Example)

Figure 43:
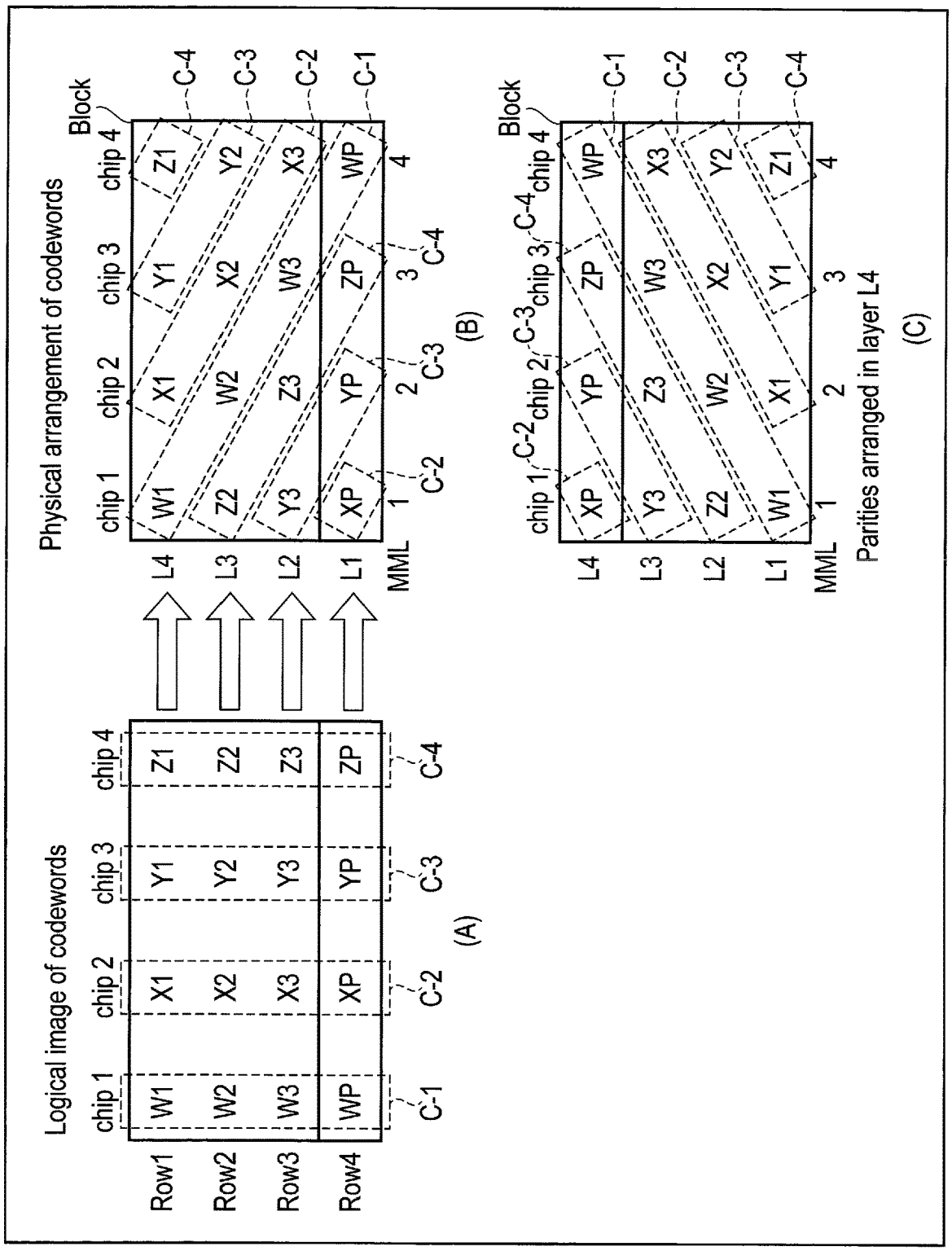
FIG. 43 is a diagram illustrating a relationship between a logical image of a plurality of codewords which form a plurality of diagonal ECC frames and a physical arrangement of these codewords on the magnetic domain wall memory chips.

FIG. 43 is a diagram illustrating a relationship between a logical image of codewords structuring diagonal ECC frames and a physical arrangement of the codewords on magnetic domain wall memory chips.

In the above description, each of diagonal ECC frames is stored in magnetic memory lines MML included in the same block. In a case where the magnetic domain wall memory 3 is formed of magnetic domain wall memory chips, however, each diagonal ECC frame may be stored in a storage region including plural magnetic memory lines MML which are included in different magnetic domain wall memory chips, respectively.

(A) of FIG. 43 illustrates a logical image of codewords each forming a diagonal ECC frame arranged diagonally in the storage region, the storage region being formed of a set of magnetic memory lines MML which are included in different magnetic domain wall memory chips, respectively.

Two dimensional array data is encoded in the column direction, encoded data including column ECC frames C-1, C-2, C-3, and C-4 is generated. WP, XP, YP, and ZP are parities of column ECC frames C-1, C-2, C-3, and C-4. That is, codeword included in ECC frame C-1 includes data (W1, W2, and W3) and parity (WP), codeword included in ECC frame C-2 includes data (X1, X2, and X3) and parity (XP), codeword included in ECC frame C-3 includes data (Y1, Y2, and Y3) and parity (YP), and codeword included in ECC frame C-4 includes data (Z1, Z2, and Z3) and parity (ZP). In the encoded data, the order of data elements is changed with respect to each of the rows, and as shown in (B) of FIG. 43, column ECC frames C-1, C-2, C-3, and C-4 are written into the magnetic domain wall memory chips such that column ECC frames C-1, C-2, C-3, and C-4 are arranged diagonally in the storage region formed of a magnetic memory line MML (MML1 in this example) in first magnetic domain wall memory chip (chip1), magnetic memory line MML (MML2 in this example) in second magnetic domain wall memory chip (chip2), magnetic memory line MML (MML3 in this example) in third magnetic domain wall memory chip (chip3), and magnetic memory line MML (MML4 in this example) in fourth magnetic domain wall memory chip (chip4).

Furthermore, as shown in (C) of FIG. 43, parities (WP, XP, YP, and ZP) of column ECC frames C-1, C-2, C-3, and C-4 may be stored in the uppermost layers of these magnetic memory lines MML.

Figure 44:
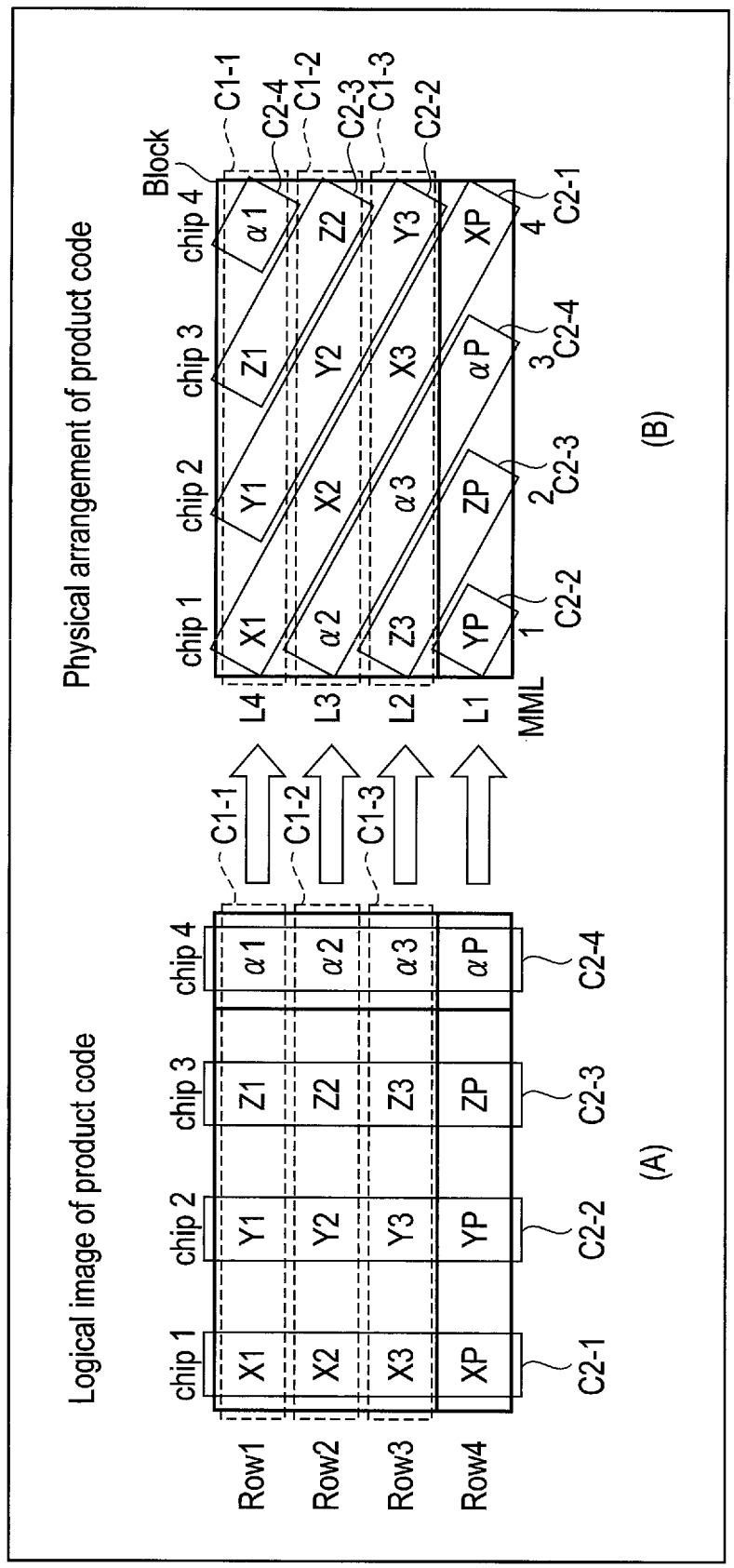
FIG. 44 is a diagram illustrating a relationship between a logical image of a product code and a physical arrangement of the product code on magnetic domain wall memory chips.

FIG. 44 is a diagram illustrating a relationship between a logical image of a product code and a physical arrangement of the product code on magnetic domain wall memory chips.

As shown in (A) of FIG. 44, two dimensional array data is encoded using a first code (C1 code) to encode two dimensional array data row-by-row and a second code (C2 code) to encode two dimensional array data column-by-column, and thus, encoded data in which ECC frames C1-1, C1-2, and C1-3 each including a codeword of C1 code and ECC frames C2-1, C2-2, C2-3, and C2-4 each including a codeword of C2 code are combined is generated. Note that a1, a2, and a3 are parities of ECC frames C1-1, C1-2, and C1-3, respectively, and XP, YP, ZP, and aP are parities of ECC frames C2-1, C2-2, C2-3, and C2-4.

That is, the codeword included in ECC frame C1-1 includes data (X1, Y1, and Z1) and parity (a1), the codeword included in ECC frame C1-2 includes data (X2, Y2, and Z2) and parity (a2), and the codeword included in ECC frame C1-3 includes data (X3, Y3, and Z3) and parity (a3). The codeword included in ECC frame C2-1 includes data (X1, X2, and X3) and parity (XP), the codeword included in ECC frame C2-2 includes data (Y1, Y2, and Y3) and parity (YP), and codeword included in ECC frame C2-3 includes data (Z1, Z2, and Z3) and parity (ZP). The codeword included in ECC frame C2-4 is a codeword obtained by encoding parities ($\alpha$1, $\alpha$2, and $\alpha$3), and includes these parities ($\alpha$1, $\alpha$2, and $\alpha$3) and a parity ($\alpha$P) corresponding to these parities ($\alpha$1, $\alpha$2, and $\alpha$3).

In the encoded data, the order of data elements is changed with respect to each of rows, and as shown in (B) of FIG. 44, ECC frames C1-1, C1-2, and C1-3 are written into the magnetic domain wall memory chips such that the ECC frames C-1, C-2, and C-3 are arranged in the row direction of the storage region formed of a magnetic memory line MML (MML1 in this example) in first magnetic domain wall memory chip (chip1), a magnetic memory line MML (MML2 in this example) in second magnetic domain wall memory chip (chip2), a magnetic memory line MML (MML3 in this example) in third magnetic domain wall memory chip (chip3), and a magnetic memory line MML (MML4 in this example) in fourth magnetic domain wall memory chip (chip4), and each of ECC frames C2-1, C202, C203, and C204 is arranged diagonally in the storage region.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a shift register memory including a block including a plurality of data storing shift strings each including a plurality of storage portions, the shift register memory being configured to execute a write operation and a read operation in a last-in first-out method or a first-in first-out method by shifting data stored in each of a plurality of layers of the block in units of layer, the plurality of layers being organized by a set of the storage portions included in the data storing shift strings; and
   a controller configured to control the shift register memory, to encode data to be written into the block, and to write encoded data into the block, the encoded data including a plurality of error correction code frames each including a codeword, wherein
   the controller is configured to store, into a location corresponding to a first layer in a first data storing shift string of the data storing shift strings, first data included in a first error correction code frame of the error correction code frames, to store, into a location corresponding to a second layer in the first data storing shift string, second data included in a second error correction code frame of the error correction code frames, and to store, into a location corresponding to the second layer in a second data storing shift string of the data storing shift strings, third data included in the first error correction code frame.

2. The memory system of claim 1, wherein
a number of data stored in the first layer among a plurality of data included in the first error correction code frame matches a number of data stored in the first layer among a plurality of data included in the second error correction code frame, and
a number of data stored in the second layer among the plurality of data included in the first error correction code frame matches a number of data stored in the second layer among the plurality of data included in the second error correction code frame.

3. The memory system of claim 1, wherein
a number of data stored in the first data storing shift string among the plurality of data included in the first error correction code frame matches a number of data stored in the first data storing shift string among the plurality of data included in the second error correction code frame, and
a number of data stored in the second data storing shift string among the plurality of data included in the first error correction code frame matches a number of data stored in the second data storing shift string amongst the plurality of data included in the second error correction code frame.

4. The memory system of claim 1, wherein at least one error correction code frame of the error correction code frames includes at least one in each group of first data elements of a head layer side of the plurality of layers and second data elements of a last layer side of the plurality of layers.

5. The memory system of claim 1, wherein
the controller is configured to:
generate the error correction code frames by encoding two dimensional array data in a column direction, the two dimensional array data being obtained by arranging data portions forming the data to be written into the block in a column direction; and
write each of the error correction code frames into the block by regularly changing an order of data elements included in each of the data portions such that the data storing shift strings in which data elements belonging to a same error correction code frame are stored are shifted between the data portions.

6. The memory system of claim 1, wherein
the controller is configured to:
read data which has a size corresponding to the plurality of layers, from the shift register memory;
restructure the error correction code frames by combining data belonging to a same error correction code frame; and
decode the restructured error correction code frames to correct errors in the read data.

7. A memory system comprising:
a shift register memory including a block including a plurality of data storing shift strings each including a plurality of storage portions, the shift register memory being configured to execute a write operation and a read operation in a last-in first-out method or a first-in first-out method by shifting data stored in each of a plurality of layers of the block in units of layer, the plurality of layers being organized by set of the storage portions included in the data storing shift strings; and
a controller configured to control the shift register memory, to encode data to be written into the block using a product code of a combination of a first code and a second code, and to write encoded data into the block, the encoded data including a plurality of first type error correction code frames each including a codeword of the first code and a plurality of second type error correction code frames each including a codeword of the second code, wherein
the controller is configured to store, into a location corresponding to a first layer in a first data storing shift string of the data storing shift strings, first data included in both a first error correction code frame among the first type error correction code frames and a second error correction code frame among the second type error correction code frames, to store, into a location corresponding to a second layer in the first data storing shift string, second data included in both a third error correction code frame among the first type error correction code frames and a fourth error correction code frame among time second type error correction code frame, to store, into a location corresponding to the second layer in a second data storing shift string of the data storing shift strings, third data included in both the second error correction code frame and the third error correction code frame, and to store, into a location corresponding to the first layer in the second data storing shift string, fourth data included in the first error correction code frame, or
the controller is configured to store, into the location corresponding to the first layer in the first data storing shift string, fifth data commonly included in both the first error correction code frame and the second error correction code frame, to store, into the location corresponding to the second layer in the first data storing shift string, sixth data commonly included in both the first error correction code frame and the fourth error correction code frame, to store, into the location corresponding to the second layer in the first data storing shift string, seventh data commonly included in both the first error correction code frame and the second error correction code frame, and to store, into the location corresponding to the first layer in the second data storing shift string, eighth data included in the first error correction code frame.

8. The memory system of claim 7, wherein
a number of data stored in the first layer among a plurality of data included in the third error correction code frame matches a number of data stored in the first layer among a plurality of data included in the fourth error correction code frame, and
a number of data stored in the second layer among a plurality of data included in the third error correction code frame matches a number of data stored in the second layer among a plurality of data included in the fourth error correction code frame.

9. The memory system of claim 7, wherein
a number of data stored in the first data storing shift string among a plurality of data stored in the third error correction code frame matches a number of data included in the first data storing shift string among a plurality of data stored in the fourth error correction code frame, and
a number of data stored in the second data storing shift string among the plurality of data included in the third error correction code frame matches a number of data included in the second data storing shift string among the plurality of data stored in the fourth error correction code frame.

10. The memory system of claim 7, wherein
the controller is configured to:
read data stored in the block from the shift register memory;
execute a first decoding process of decoding one error correction code frame of the first type error correction code frames and collecting errors in the read data, the one error correction code frame corresponding to the read data,
read, when the first decoding process of the one error correction code frame is failed, remaining data stored in the block from the shift register memory, and
execute a second decoding process of decoding the second type error correction code frames and collecting errors included in the one error correction code frame in which the first decoding process is failed.

11. A memory system comprising:
a shift register memory including a block including a plurality of data storing shift strings extending in a column direction, each data storing shift string including a plurality of storage portions, and a set of the storage portions included in the data storing shift strings being organized as a plurality of layers extending in a row direction; and
a controller configured to control the shift register memory, to encode data to be written into the block using a product code of a combination of a first code and a second code, and to write, into the block, encoded data of a combination of a plurality of first error correction code frames each including a codeword of the first code and a plurality of second error detection or error correction code frames each including a codeword of the second code, wherein
the shift register memory executes a write operation and a read operation in a last-in first-out method or a first-in first-out method by shifting data stored in each of the layers in units of layer,
the second code is an error detection code or an error correction code, and
each of the plurality of second error detection or error correction code frames is arranged in the column direction in a physical storage region of the block formed of a set of the storage portions such that each of the plurality of second error detection or error correction code frames is formed of one data storing shift string, wherein
the controller is configured to:
increase a likelihood value indicative of reliability of a column corresponding to a data storing shift string which is determined that an error correction is succeeded or there is no error through decoding of the second error detection or error correction code frames;
decrease a likelihood value indicative of reliability of a column corresponding to a data storing shift string which is determined that an error correction is failed or there is an error through the decoding of the second error detection or error correction code frames; and
decode, based on the likelihood value of each column obtained by decoding of the second error detection or error correction code frames, the first error correction code frames by soft decision decoding.

12. The memory system of claim 11, wherein
each of the first error correction code frames is arranged in the row direction in the physical storage region of the block.

13. The memory system of claim 11, wherein
the second code is an error correction code,
the second error detection or error correction code frames are a plurality of second error correction code frames, and
each of the first error correction code frames is arranged in the row direction in the physical storage region of the block, wherein
the controller is configured to:
read data stored in the block from the shift register memory;
execute a first decoding process of decoding the first error correction code frames and correcting errors in the read data;
execute a second decoding process of decoding the second error correction code frames and correcting errors included in a first error correction code frame in which the first decoding process is failed;
increase a likelihood value indicative of reliability of a column corresponding to a data storing shift string which is determined that an error correction is succeeded in the second decoding process, and decrease a likelihood value indicative of reliability of a data storing shift string which is determined that an error correction is failed in the second decoding process; and
decode, based on a decode result of the second decoding process including the likelihood value of each column obtained by the decoding of the second error correction code frames, the first error correction code frame in which the first decoding process is failed, by soft decision decoding.

14. The memory system of claim 13, wherein
the controller is configured to execute iterative decoding which repeats exchanging a decode result obtained by decoding executed by a first decoder corresponding to the first code and a decode result obtained by decoding executed by a second decoder corresponding to the second code between the first and second decoders as extrinsic values.

* * * * *